US011265182B2

(12) United States Patent
Lucco et al.

(10) Patent No.: US 11,265,182 B2
(45) Date of Patent: *Mar. 1, 2022

(54) MESSAGING TO ENFORCE OPERATION SERIALIZATION FOR CONSISTENCY OF A DISTRIBUTED DATA STRUCTURE

(71) Applicant: Microsoft Technology Licensing, LLC, Redmond, WA (US)

(72) Inventors: Steven Edward Lucco, Bellevue, WA (US); Kurt W. Berglund, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/186,508

(22) Filed: Feb. 26, 2021

(65) Prior Publication Data

US 2021/0184878 A1  Jun. 17, 2021

Related U.S. Application Data

(63) Continuation of application No. 16/402,799, filed on May 3, 2019, now Pat. No. 10,972,296.

(51) Int. Cl.
| | |
|---|---|
| *G06F 15/16* | (2006.01) |
| *H04L 12/18* | (2006.01) |
| *G06F 16/22* | (2019.01) |
| *H04L 1/16* | (2006.01) |
| *H04L 67/10* | (2022.01) |

(52) U.S. Cl.
CPC ...... *H04L 12/1827* (2013.01); *G06F 16/2246* (2019.01); *H04L 1/1621* (2013.01); *H04L 67/10* (2013.01)

(58) Field of Classification Search
CPC ... H04L 12/1827; H04L 1/1621; H04L 67/10; G06F 16/2246
See application file for complete search history.

(56) References Cited

U.S. PATENT DOCUMENTS

| | | | | |
|---|---|---|---|---|
| 2014/0280463 | A1* | 9/2014 | Hunter | H04L 67/10 709/203 |
| 2015/0193404 | A1* | 7/2015 | Danziger | G06F 40/166 715/229 |
| 2016/0357720 | A1* | 12/2016 | Thimbleby | G06F 3/0484 |

* cited by examiner

*Primary Examiner* — Padma Mundur
(74) *Attorney, Agent, or Firm* — Schwegman Lundberg & Woessner, P.A.

(57) ABSTRACT

Disclosed embodiments provide for collaborative access to a distributed data structure. Operations such as inserting, deleting, and annotating are performed by various clients participating in the collaboration. A serialization service enforcing a single order of these operations and ensures the operations and order are communicated to all of the clients participating in the collaboration. Once all clients have acknowledged particular operations, this information is also communicated to all of the clients, such that the clients may perform maintenance activities on the collaboration data structures. The result is a rolling collaboration window shared by all of the clients of the collaboration, with a bottom of the collaboration window defined by a lowest ordered operation not yet acknowledged by all clients of the collaboration, and a highest ordered operation as assigned by the serialization service.

20 Claims, 29 Drawing Sheets

MESSAGING TO ENFORCE OPERATION SERIALIZATION FOR CONSISTENCY OF A DISTRIBUTED DATA STRUCTURE

CROSS REFERENCE TO RELATED APPLICATIONS

This application is a continuation of and claims priority to U.S. application Ser. No. 16/402,799, filed May 3, 2019 and entitled "Messaging to Enforce Operation Serialization for Consistency of a Distributed Data Structure." The contents of this prior application is considered part of this application, and is hereby incorporated by reference in its entirety.

BACKGROUND

An atomic broadcast or "total order broadcast" may be used in fault tolerant distributed systems to ensure that multiple distributed processes receive operations in an equivalent sequence, regardless of which node in the distributed system initiates each of the operations. The operations may be propagated to each node in the distributed system such that either each operation completes at each node, or the operation is rolled back at each node.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
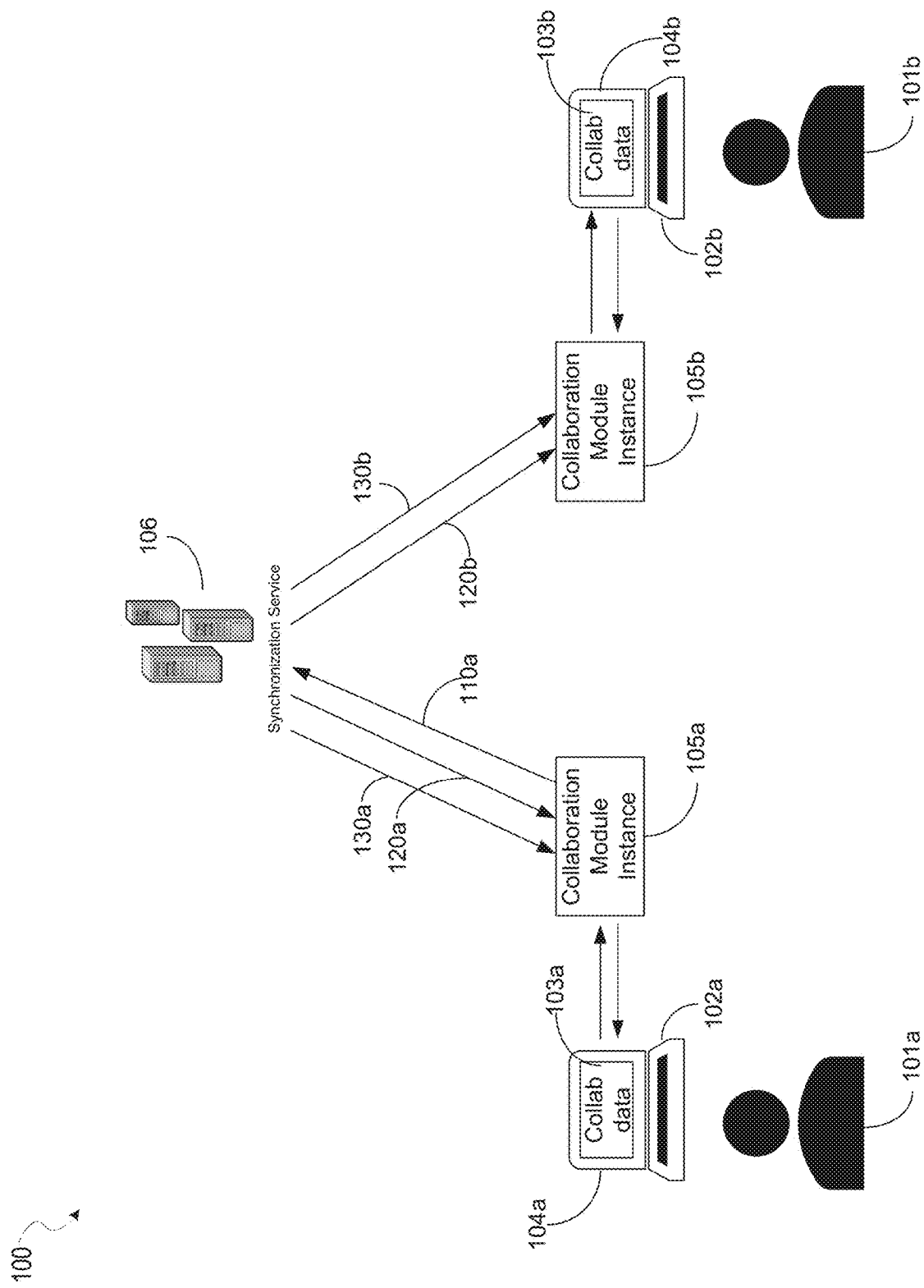
FIG. 1A is an overview diagram of an example collaboration messaging architecture.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, total order broadcast is a technique for ensuring operations complete across each node in a distributed system or are not performed by any of the nodes. The disclosed embodiments utilize a total order broadcast architecture to provide a collaborative environment for accessing a distributed data structure (DDS). A centralized serialization process defines an order of operations initiated by multiple participants of the collaboration. The order may be represented, in at least some aspects, by a sequence number assigned by the centralized serialization process to each operation. Once a sequence number is assigned to an operation, information defining the operation and its assigned sequence number are distributed to all participants of the collaboration.

The disclosed embodiments also provide for an indication of which operations have been acknowledged by all participants in a collaboration and which operations have not yet been so acknowledged. Operations acknowledged by all participants form a lower bound (exclusively) of a "collaboration window." representing pending or otherwise not fully acknowledged operations across the participants. A top of the collaboration window is represented by a most recent or highest ordered operation.

As the disclosed embodiments operate, the "top" end advances through higher order sequence numbers, and, over time, the lower end also advances as acknowledgment of operations are individually received from each participant. Thus, the collaboration window represents a "rolling" window of serialized operations on a distributed data structure.

In the disclosed embodiments, each participant (e.g., a computing device that is part of the collaboration, or an instance of a collaboration module, as discussed further below) is individually responsible for applying each serialized operation to its own copy of the distributed data structure. Thus, if an operation is initiated by a first participant on a distributed data structure accessed by a collaboration session that includes twenty participants, that operation will be physically performed on twenty local copies of the distributed data structure twenty times, once for each collaboration participant.

The disclosed embodiments are implemented in part, by instructions that configure hardware processing circuitry to perform operations implementing the disclosed embodiments. For ease of discussion, these instructions are referred to collectively as a collaboration module. The instructions may be instantiated to provide a running software program, which has access to the instructions and data necessary to perform the instructions and functions described herein. This instantiated program is referred to throughout this disclosure as a collaboration module instance. Each collaboration module instance operates to configure appropriate hardware processing circuitry to perform one or more of the functions discussed herein and attributed to it. While a particular function may be attributed to a collaboration module instance, there is no requirement express or implied that a collaboration module instance include instructions to implement all of the functions described herein. Instead, when a particular function is attributed to a collaboration module instance, the collaboration module instance need only include instructions necessary to implement that particular function.

Some of the disclosed embodiments provide a next generation architecture for collaborative text editing. To succeed, these improvements should provide fast load times, low latency in change propagation, provide a smooth user experience, and be highly scalable at a reasonable cost. This next generation architecture also should provide an extensible background while also providing a relatively simple implementation, for example, by providing a stateless mode of operation. The next generation architecture should integrate intelligent services with online collaboration, and support document branching.

The disclosed text editing process is comprised of at least three operations, insert, delete, and annotate. Because multiple participants of the collaboration may be editing the same portion of text simultaneously, conflict rules are established to determine how conflicting edits across collaboration module instances are resolved when detected. The disclosed embodiments distribute changes occurring at each collaboration module instance to every other collaboration module instance via a single serialization service, which may be implemented via a centralized service, such as a synchronization service discussed below, or via a peer to peer protocol.

The serialization service assigns a sequence number to each operation, and distributes each of the operations to all participants of a collaboration. The serialization service also notifies all of the collaboration module instances when a particular operation has been successfully distributed to each collaboration module instance, such that all the collaboration module instances can fully incorporate that operation into their permanent copy of the distributed data structure (e.g. move the bottom of the collaboration window forward in the operational order). In appropriate instances, messages between collaboration module instances participating in the collaboration and the serialization service may be encrypted to ensure secure communications.

The disclosed embodiments may be implemented using a publish/subscribe data pattern. For example, Syphon is a highly available and reliable distributed pub/sub system built using Apache Kafka, and may be used in some of the disclosed embodiments. The disclosed embodiments may provide for a number of different types of distributed data structures, including a list, a map, sequence, and a stream. These data structures may be implemented, in some aspects, via a merge tree.

The disclosed embodiments provide for a collaboration model that results in a consistent state across all collaboration module instances. Changes are optimistically replicated, in that as changes occur, they are distributed to collaboration module instances and then reversed in the rare event that the operation is unable to be distributed to all of the collaboration module instances participating in the collaboration. The disclosed embodiments provide for local application of local changes immediately, resulting in low latency for interactive environments. Furthermore, the operation primitives provided by the disclosed embodiments may provide for building more complex distributed data structures, such as rich strings, tables, counters, graphs, and other types of distributed data structures.

Some implementations provide for the use of merge trees to represent shared document structures. The disclosed merge tree implementation delegates integration of changes from all of the collaboration module instances participating in the collaboration to each individual collaboration module instance. While this causes replication of each operation across each collaboration module instance, it also reduces processing demands on the synchronization service. The merge trees support hierarchical rich text constructions such as nested tables and enable multi-stream text with cross references such as footnotes. Some of the disclosed embodiments provide for intelligent services that can efficiently cache information in merge trees and reference merge tree location both in space (position in text) and time (position in revision history).

The disclosed merge trees provide for branching, merging, and continuous integration from another branch of the tree. The merge trees may efficient use of storage and provide for retrieval of points in a history of the shared merge tree structure. Joining of collaboration sessions is facilitated by providing the joining collaboration module instance with a copy of the document of record and any pending changes. The disclosed implementations may provide for local garbage collection, which leads to stable memory use and compact storage. The disclosed merge trees provide for constant time and space requirements for operation processing in the synchronization service, which leads to cost effective synchronization service deployment.

The disclosed implementations further provide for improved performance of local operations, as the local operations consider a total length of the data structure under collaboration. These implementations may provide an equivalent representation between a local model and a collaboration model, which contrasts with implementations of Google's operational transform (OT) and conflict tree replicated data types (CRDT) which provide for split representations. This simplifies implementation relative to OT and CRDT. The disclosed embodiments further provide for a simplified undo/redo architecture. Information to support undo/redo operations can be read directly from segments of the merge tree by traversing up the tree to identify correct positions/ranges. Change tracking is also inherent in the disclosed merge trees as the merge tree segments map directly to each change made to the underlying collaborative data structure. Furthermore, given that the merge trees have few internal nodes, cloning of trees is relatively fast. A final observation is that the disclosed embodiments provide improved performance for common operations such as insert, remove, and annotate, while having no worse performance than other methods for more complex, and less common, operations.

FIG. 1A is an overview diagram of a collaboration messaging architecture. The collaboration 100 shows two users 101a-b collaborating via individual computing devices 102a-b respectively. Distributed data structure views 103a-b are shown on display screens 104a-b to the two users 101a-b respectively. The collaboration messaging architecture shown in FIG. 1A facilitates propagation of edits by either one of the users 101a-b to the distributed data structure (at least a portion of which is shown by the views 103a-b) to the other participants (e.g. devices and/or collaboration module instances) in the collaboration. While FIG. 1A shows only two users, the disclosed embodiments contemplate collaboration by any number of users/devices/collaboration module instances.

FIG. 1A also shows two collaboration module instances 105a-b. Each of the collaboration module instances 105a-b represents a grouping of instructions and data stored on a non-transitory computer readable storage medium. The instructions in the collaboration module instances 105a-b configures each of the client devices 102a-b respectively to perform one or more of the functions described herein. In some aspects, each collaboration module instance participating in a particular collaboration will run on a different physical device. In some cases, multiple collaboration module instances may run on a single physical device. In some aspects, one or more of the collaboration module instances 105a-b may execute on devices other than the client devices 102a-b (the other devices not shown in FIG. 1A), but may still receive input from and provide output to the client devices 102a-b. In some aspects, a collaboration module instance 105a may run, for example, on a computer that is also running a synchronization service 106.

The term collaboration module is not intended to limit in any way the features disclosed herein, but instead to only serve as a notational convenience for referencing those collective features. For example, there is no intent to require that all instructions implementing claimed features reside on a single storage device or single computing device, or to be physically contiguous, for example.

In a hypothetical example of the collaboration 100, user 101a may edit the distributed data structure view 103a. The locally edited data is immediately displayed on the user 101a display screen 104a by the collaboration module instance 105a. Additionally, the collaboration module instance 105a sends a message 110a to the synchronization service 106. The message 110a indicates the nature of the edit operation performed by the user 101a. For example, the message 110a may indicate whether the operation is an insert operation, a remove operation, or an annotation operation. The message 110a may further indicate an insertion point for insertion operations. In other words, a position within the distributed data structure view 103a that data is being inserted. If the operation is a remove operation, the message 110a indicates a range of distributed data structure data being removed. The message 110a also indicates a reference sequence number for the operation. The reference sequence number is a sequence number that identifies a version of the distributed data structure upon which the user 101a (and the device 102a) was operating on when it performed the subject operation.

Upon receiving the message 110a, the synchronization service 106 generates a sequence number for the operation defined by the message 110a. The synchronization service 106 then broadcasts a message identifying the operation performed by the user 101a (and computing device 102a) to each of the collaboration modules 105a-b participating in the collaboration. In the example of FIG. 1, this includes both collaboration modules 105a-b. The broadcast may be, in some embodiments, an actual broadcast network message using a broadcast destination address. In other embodiments, the broadcast may include two or more unicast or multicast messages addressing, collectively, every collaboration module participating in the collaboration 100. The broadcast message is shown as message 120a and 120b. In some situations, the broadcast message (e.g. collectively 120a and 120b in the example of FIG. 1A) may also indicate that each collaboration module participating in the collaboration has been notified of the operation originated by the device 102a. Alternatively, as shown in FIG. 1A, a separate broadcast message, collectively shown as messages 130a and 130b may indicate that the operation initiated by the user 101a (and computing device 102a) has been successfully propagated to all collaboration modules participating in the collaboration.

In the embodiment shown in FIG. 1A, the synchronization service 106 enforces a common order of operations across all operations occurring on the distributed data structure, no matter which collaboration module initiated the operation. Thus, in some cases, a local order of operations may be different than an order of operations enforced by the synchronization service. To resolve differences between a local order of operations and an order of operations common across all collaboration modules participating in the collaboration, the disclosed embodiments provide conflict rules to resolve these differences. For example, in some embodiments that maintain string oriented distributed data structures, an insertion operation having a larger sequence number (occurring later in the common order than a second insertion) is placed earlier in the string than the second insertion. In other cases, two deletions initiated by two different collaboration modules may overlap. Some embodiments resolve overlapping deletions by determining that a deletion with an earlier (e.g. smaller) sequence number operates to perform the deletion, while an overlapping portion of a later deletion has essentially no effect.

While the collaboration system 100 is discussed above with reference to the synchronization service 106, in some other embodiments, a peer to peer protocol to enforce an order of operations may be used. For example, some embodiments may assign sequence numbers to data based on open source libraries such as orbitDB.

The collaboration system described above causes each edit to the distributed data structure view 103a-b to transition through up to three different states as maintained by at least one of the collaboration modules 105a-b.

Figure 1B:
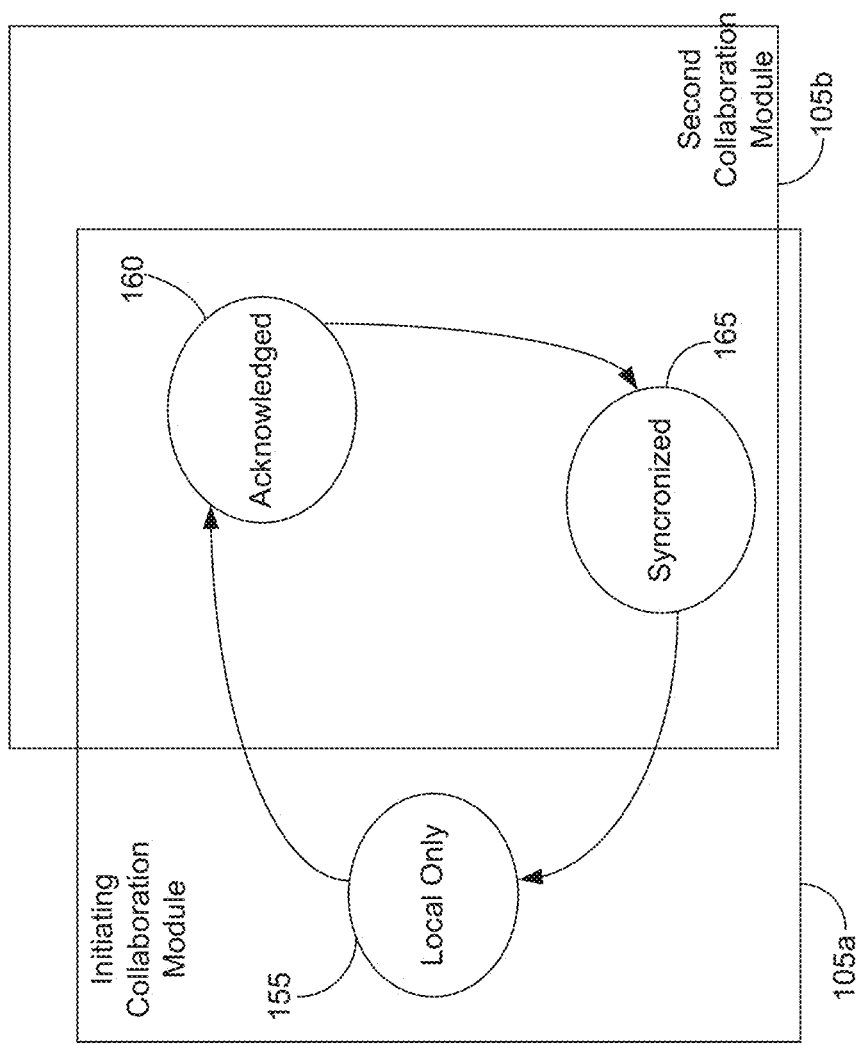
FIG. 1B is an example state transition diagram illustrating how an operation moves between three states.

FIG. 1B is a state transition diagram illustrating how an operation moves between the three states. A first state 155 named "local only" in FIG. 1B represents a state of an operation after a collaboration module (e.g. 102a) has performed a local edit, but that edit has not yet been acknowledged by the synchronization service 106 (e.g. via message 120a). An operation only exists in the first state 155 on the collaboration module initiating the operation. The operation will initialize on a second collaboration module in a second state and not in the first state.

The operation exists in a second state 160 when the operation/edit has been acknowledged by the synchronization service 106 (e.g. via message 120a and/or 120b). This second state of the edit may exist at collaboration modules other than the collaboration module performing or causing the edit. A third state 165 of the edit, named the "synchronized" state in FIG. 1B, exists on a collaboration module when all collaboration modules have acknowledged the edit and an indication of same has been propagated to the collaboration module via the synchronization service 106 (e.g. via message 130a or 130b). This third state may be considered a "synchronized" state, in that the operation has been synchronized across the collaboration modules, and information tracking the edit may no longer be needed since the edited data is considered "of record" within the distributed data structure.

The disclosed embodiments process edits or operations on a distributed data structure by collaboration modules in an explicitly defined order. The synchronization service 106 defines the order of the operations by assigning each operation a unique sequence number. While each edit or operation is assigned a sequence number identifying the operation itself, the edit operates on a particular version of the distributed data structure. This particular version may be identified by a second sequence number different from the sequence number assigned to the edit or operation. This second sequence number may be referred to as a reference sequence number for the edit/operation throughout this disclosure.

What follows is one operative example of the distinction between an operation's sequence number and a reference sequence number. Specifically, after a first operation identified by a first sequence number is applied to a distributed data structure, a resulting version of the distributed data structure may be identified by the first sequence number. The first sequence number defines a first "version" of the distributed data structure. A second operation defined by a second sequence number will modify the first "version" of the distributed data structure that includes modifications caused by (e.g. results of) the first operation. A result of this second modification is a second version of the distributed data structure. Further subsequent operations defined by additional sequence numbers will further modify the distributed data structure to form additional new "versions" defined by those sequence numbers.

Based on an operation's sequence number and the version of the distributed data structure upon which it operated, each collaboration module can properly apply operations initiated at other collaboration modules to its own copy of the distributed data structure. This is possible even when multiple collaboration modules may be modifying the distributed data structure "simultaneously," and even when some collaboration modules may be lagging behind in synchronizing with the evolving versions of the distributed data structure.

This is accomplished via two rules. First, if an operation is initiated by a local collaboration module, subsequent operations initiated by the local collaboration module operate on a version of the distributed data structure that includes modifications caused by the first operation. In other words, collaboration module operations execute in sequential order with no exceptions. Further, local operations apply all remote operations, regardless of sequence number.

With respect to application of a particular remotely initiated modification at a local device, the local device may consider only some of the operations for which it has received notifications. Operations (both local and remotely initiated) having lower reference sequence numbers when compared to the remotely initiated operations' operation sequence number are relevant when applying the particular operation to the distributed data structure. Operations having higher operation sequence numbers were not visible at the originating device when it initiated the particular operation, and are thus not relevant when determining how to apply the particular operation to the distributed data structure.

Figure 2A:
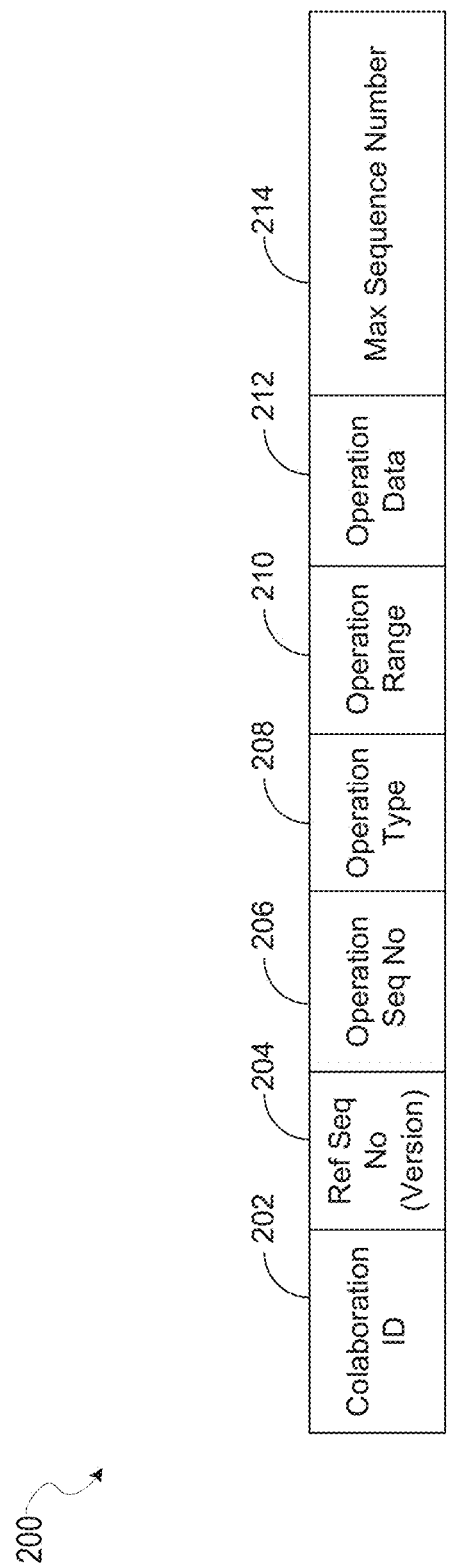
FIG. 2A shows an example message format for messages exchanged between collaborating module instances and the synchronization service in one or more of the disclosed embodiments.

FIG. 2A shows an example message format for messages exchanged between collaborating module instances (e.g. 105a-b) and the synchronization service 106 in one or more of the disclosed embodiments. In some aspects, any of the messages 100a, 120a-b, and 130a-b may include one or more of the fields discussed below with respect to FIG. 2A.

The message 200 includes a collaboration identifier field 202, reference sequence number field 204, operation sequence number field 206, an operation type field 208, operation range field 210, operation data field 212, and a maximum sequence number field 214. The collaboration identifier 202 uniquely identifies a collaboration module participating in the collaboration. The collaboration identifier 202 identifies a collaboration module that initiated an operation identified by the message 200. In some aspects, the distribution server 106 assigns each collaboration module an identification number when the collaboration module joins the collaboration. The reference sequence number field 204 identifies a version of the distributed data structure to which the operation identified by the message 200 (via field 206) was applied. Thus, each version of a distributed data structure maintained by a collaboration module is identified via a different reference sequence number. The reference sequence number 204 identifies the data segments that are synchronized at the collaboration module (identified via field 202) when the modification was made.

The operations sequence number field 206 identifies a sequence number of the operation identified by the message 206. When a collaboration module initiating an operation sends a message including the operations sequence number field 206, the operations sequence number field 206 may be set to a predetermined value that indicates no sequence number is assigned (such as −1). The predetermined value indicates to the synchronization service that the operation identified by the message is new, and thus the operation is assigned a sequence number by the synchronization service. Such an operation may be considered to be in a "local only" state as described above with respect to FIG. 1B before the sequence number is assigned by the synchronization service 106.

The synchronization service 106 may assign incremental sequence numbers to new operations consistent with an order in which messages identifying those new operations are received by the synchronization service. After the synchronization service 106 assigns a sequence number to a particular operation, a message pertaining to that operation may include the assigned sequence number in the operation sequence number field 206.

The operation type field 208 indicates a type of operation indicated by the message 200. The operation type may indicate an operation type of one of insert, remove, or annotate in some embodiments, although operations contemplated by the present disclosure are not limited to only these types of operations.

The operation range field 210 indicates a data range of a distributed data structure operated on by the operation. In some aspects, the range is a single value, such as a position of an insert operation in a stream. In some aspects, a range of data may be indicated, for example, when a range of data in the distributed data structure is deleted.

The operation data field 212 indicates data to be applied as part of the operation. For example, if the operation type is an insertion, the operation data field 212 indicates data to be inserted.

The maximum sequence number field 214 may have two different meanings depending on a role of the transmitter of the field. When the field 214 is transmitted by a collaboration module, the field 214 indicates a maximum sequence number received by the collaboration module from either the synchronization service 106, or a peer device when a peer to peer protocol is used to provide serialization of operations. When the field 214 is transmitted by the synchronization service 106 or to a collaboration module from another collaboration module utilizing a peer to peer protocol for serialization, then the field 214 indicates a maximum sequence number that has been acknowledged by all collaboration modules participating in the collaboration.

Figure 2B:
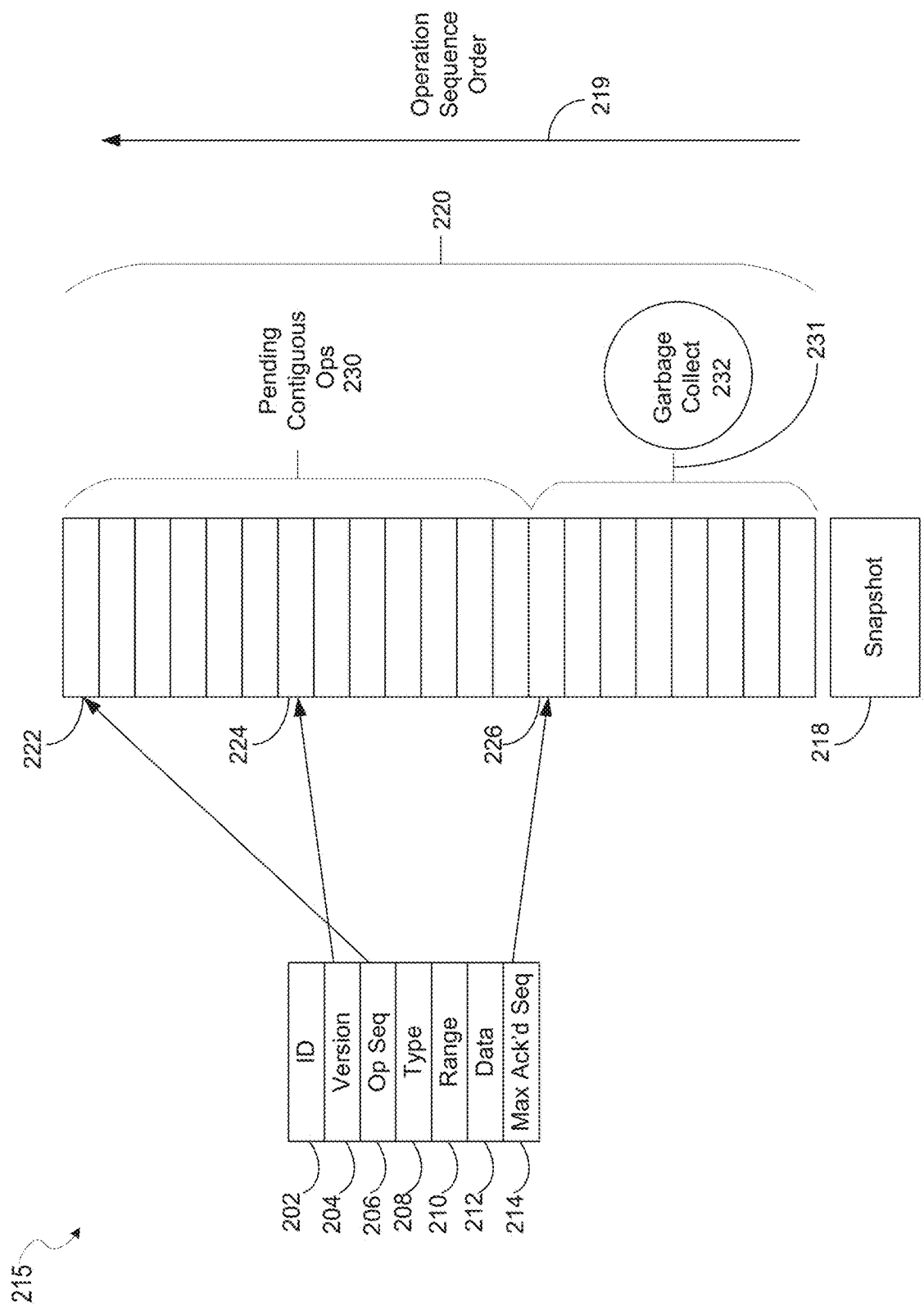
FIG. 2B is an overview diagram showing a relationship between a message and a contiguously ordered set of operations.

FIG. 2B is an overview diagram showing a relationship between the message 200 of FIG. 2A and a contiguously ordered set of operations 220. FIG. 2B shows snapshot 218 of a distributed data structure. The snapshot 218 represents data values of the distributed data structure at a particular version. FIG. 2B also shows a contiguously ordered set of operations 220 that are performed on a version of the distributed data structure derived from the snapshot 218.

The message 200 is also shown in FIG. 2B, including each of the fields discussed above with respect to FIG. 2A. FIG. 2B shows that the operation sequence number field 206 of the message 200 may identify a highest ordered operation 222 in the contiguously ordered set of operation 220. Note that the field 206 identifies a highest sequenced operation 222 when the message 200 is received by a collaboration module (e.g. 105a-b), because the message 200 indicates a sequence number has been assigned to the operation. As discussed above, when a collaboration module initiates an operation, it may set the sequence number field 206 to a predetermined number (e.g. 206), indicating the operation needs to have a sequence number assigned to it. In this scenario, the field 206 may not necessarily identify a highest ordered operation, contrary to the example shown in FIG. 2B.

The message 200 also includes a version field 204, which identifies an operation 224 on the distributed data structure. Note the version field 204 identifies a version of the distributed data structure that includes results of the operation 224 and all of the operations sequenced below the operation 224. In other words, if a value of the version field 204 is 950, that version of the distributed data structure includes results of operations having sequence numbers 950, 949, 948, 947, etc. This example assumes operations are sequenced such that higher sequence numbered operations occur after lower sequence numbered operations. Some embodiments may order operations using alternate schemes (e.g. numerically lower sequence number indicates later order than numerically higher sequence numbers).

When transmitted by the synchronization service 106 (or received from a peer to peer network by a collaboration module), the message 200 also identifies a maximum sequence number for operations acknowledged by all collaboration modules participating in the collaboration. This maximum sequence number is indicated by field 214. Some implementations may perform a garbage collection process 232 on operations below and including the operation 226. Operations sequenced after the operation 226 (e.g. operations 230) have at least one pending acknowledgement. The pending contiguous operations 230 shown in FIG. 2B may be referred to throughout this disclosure as a collaboration window. The collaboration window defines operations that have been assigned sequence numbers by the synchronization service 106 (or a peer to peer protocol for serialization) but not yet acknowledged by all collaboration modules participating in the collaboration. As the disclosed embodiments operate, the collaboration window represents a rolling window in the sense that it advances through the sequential operations ordered by the synchronization service 106 (or peer to peer protocol), with a top of the collaboration window defined by a most recently assigned, or highest ordered sequence number, and the bottom of the collaboration window defined (exclusively) by a maximum sequence number acknowledged by all collaboration modules participating in the collaboration.

Figure 2C:
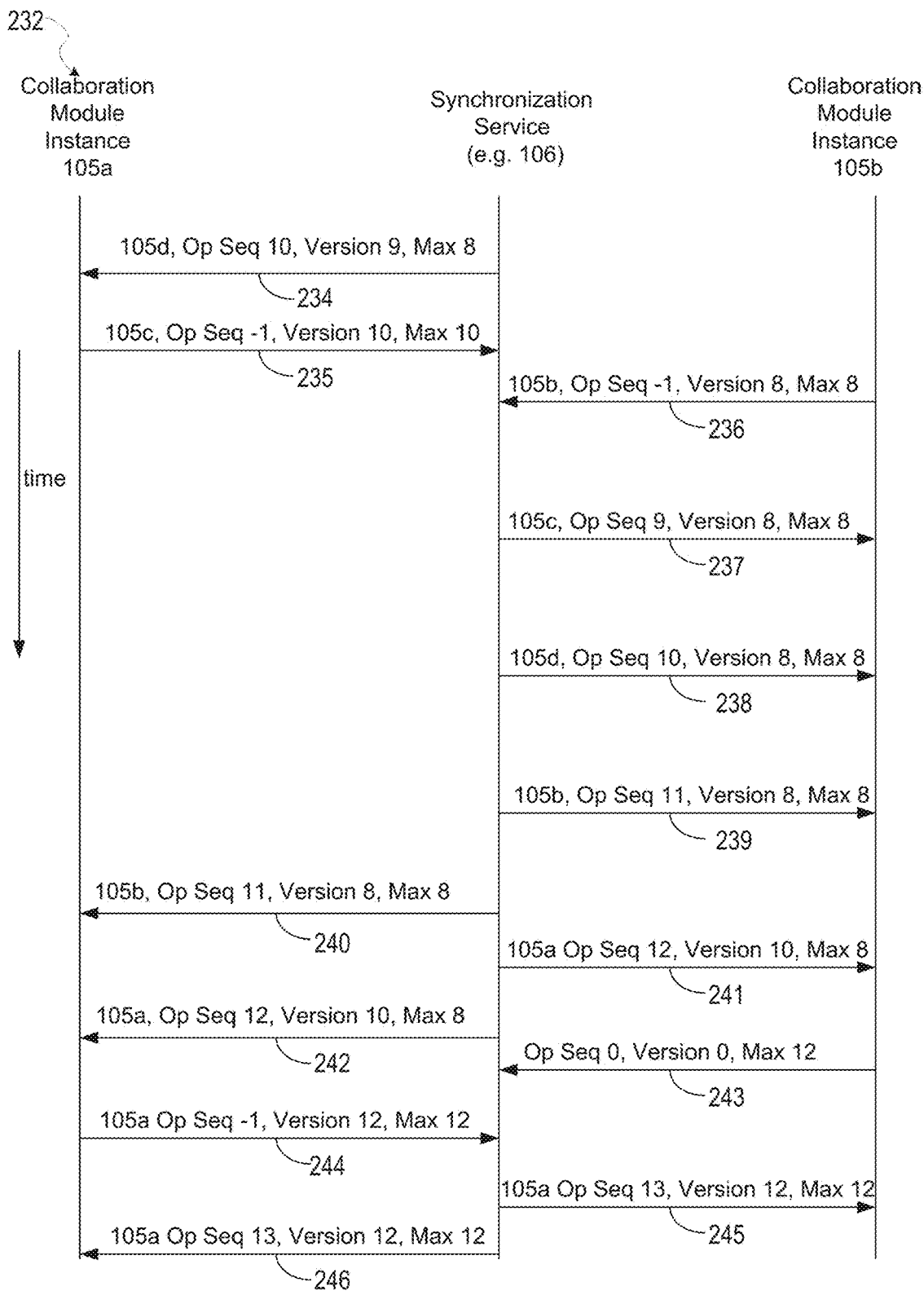
FIG. 2C shows example message communication between two collaboration clients and a synchronization service.

FIG. 2C shows example message communication between the two collaboration clients 105a-b and the synchronization service 106. While the synchronization service 106 is an example of a synchronization service, other embodiments may use a peer to peer protocol to facilitate serialization of operations between collaboration module instances.

FIG. 2C shows a message 234 transmitted by the synchronization service (e.g. 106) to the collaboration module instance 105a. The message 234 may include one or more of the fields discussed above with respect to FIG. 2A. In particular, the message 234 is shown communicating an operation sequence number value of ten (10) (e.g. via field 204), a version of nine (9) (e.g. via field 206), and a maximum sequence number of eight (8) (e.g. via field 214). Since the message 234 is transmitted by the synchronization service 106 to the collaboration module instance 105a, the maximum sequence number value eight (8) of message 234 indicates a maximum sequence number of operations acknowledged by all collaboration modules participating in the collaboration. Thus, at the time the message 234 is transmitted by the synchronization service 106, the synchronization service has received acknowledgements from all collaboration modules participating in the collaboration up to and including an operation assigned a sequence number of eight (8).

Next, the collaboration module instance 105a performs a new operation on the distribution data structure and transmits the message 235. The message 235 may include one or more of the fields discussed above with respect to the message 200 and FIG. 2A. In particular, the message 235 is shown indicating the collaboration module instance 105a initiated a first operation with an initial sequence number of −1. "−1" is an example of a first predetermined (sequence) number that is defined by some of the disclosed embodiments to indicate that no sequence number is yet assigned to the first operation defined in the message 235 (e.g. via one or more of the fields 208, 210, and 212). Message 235 also indicates this first operation was performed by the collaboration module instance 105a on version 10 of the distributed data structure. This indicates that all operations up to and including the operation assigned a sequence number of ten (10) were applied to the distributed data structure before the operation defined by message 235 was performed. In other words, any results deriving from the operations up to and including operation ten (10) were considered when the first operation defined by the message 235 was performed. Thus, if the first operation depended on a portion of the distributed data structure modified by any of those operations, the result of the first operation is based on those modifications.

The message 235 also indicates the maximum operation sequence number received by the collaboration module instance 105*a* is ten (10) (as provided by the message 234). The maximum operation sequence number illustrated in message 235 may be included in the field 214 in some aspects. The message 235 functions as an acknowledgement, by the collaboration module instance 105*a* to the synchronization service 106, of all operations up to the sequence number ten (10).

Next FIG. 2C shows a message 236 transmitted by the collaboration module instance 105*b* to the synchronization service 106. The message 236 may include one or more of the fields discussed above with respect to message 200. The message 236 identifies the collaboration module instance 105*b* (e.g. via the field 202), and indicates that the collaboration module instance 105*b* has initiated a new operation, which may be defined in the message (e.g. via fields 208, 210, 212, not shown). The message 236 further indicates that the second operation operated on version eight (8) of the distributed data structure. In other words, collaboration module instance 105*b* included any results of operations having sequence numbers up to and include sequence number eight (8) when the second operation was performed on the distributed data structure. The message 235 further indicates that collaboration module instance 105*b* has received a maximum operational sequence number of eight (8). Thus, collaboration module instance 105*b* is somewhat behind in notifications of operations when compared to collaboration module instance 105*a*. Collaboration module instance 105*a* has been notified of two additional operations (operations nine (9) and ten (10)) when compared to collaboration module instance 105*b*.

Note that immediately after message 236 is received by the synchronization service 106, two operations need to have sequence numbers assigned, the first operation initiated by collaboration module instance 105*a* and the second operation initiated by collaboration module instance 105*b*. Note also, as discussed above, that collaboration module instance 105*b* is somewhat behind, in that it is still unaware of operations sequenced as nine (9) and ten (10). To that end, the synchronization service transmits messages 237 and 238 to the collaboration module instance 105*b*.

One or more of the messages 238 and 238 may include one or more of the fields described above with respect to message 200 and FIG. 2A. In some aspects, the messages 237 and 238 may be broadcast or multicast to more collaboration modules than just the collaboration module instance 105*b*. The messages 237 and 238 notify at least the collaboration module instance 105*b* of the operations assigned sequence numbers nine (9) and ten (10) respectively. The messages 237 and 238 may provide additional information defining the operations identified by sequence numbers nine (9) and ten (10) (e.g. via fields 208, 210, and 212).

The transmission of the messages 237 and 238 by the synchronization service 106 demonstrate at least one design parameter of several of the disclosed embodiments, that of enforcing a single order of operation across all collaboration modules, and of ensuring that each collaboration module receives notifications of operations in order. Thus, since collaboration module instance 105*b* is indicating its maximum received sequence number is eight (8) via message 236, the distribution server responds by communicating operations nine (9) and ten (10) to the collaboration module instance 105*b* (via the messages 236 and 237 respectively) such that the distribution module can also communicate a subsequent operation assigned sequence number eleven (11) via message 239. As shown, the message 239 indicates the second operation, originally indicated by the message 236, has been assigned a sequence number of eleven (11) by the synchronization service 106. A similar message 240 notifies the collaboration module 240 of the second operation, and its assignment of sequence number 11, along with a version of the distributed data structure upon which the second operation was performed (as indicated in the message 236).

FIG. 2C further shows message 241, transmitted from the synchronization service 106 to the collaboration module instance 105*b*. The message 241 shows that the first operation, originated by the collaboration module instance 105*a* and indicated by the message 234, has been assigned a sequence number of twelve (12) by the synchronization service. The message 241 may provide additional information defining the first operation (e.g. via fields 208, 210, and 212). Note that the version indication in the message 241 is equivalent to that provided in the message 235, since both messages define the same operation. The maximum sequence number indication of message 241 is eight (8), indicating a lower bound of all collaboration modules participating in the collaboration (set in this example by collaboration module instance 105*b*). The synchronization service sends a message 242 to the collaboration module instance 105*a*. In some aspects, the message 241 and 242 may be the same message that is broadcast or multicast to both the collaboration modules 105*a* and 105*b*.

FIG. 2C also shows an example heartbeat message 243. The heartbeat message 243 may include one or more of the fields discussed above with respect to FIG. 2A and message 200. The heartbeat message 243 may be transmitted by the collaboration module instance 105*b* after a predetermined or configured period of inactivity. The inactivity may be defined by messages transmitted by the collaboration module instance 105*b* to the synchronization service 106. Messages received by the collaboration module instance 105*b* may not be considered in the inactivity determination. Since the message 243 is a heartbeat message, the sequence number field (e.g. 206) is set to a second predetermined value to distinguish from the first predetermined value for an operation with an unassigned sequence number (e.g. in messages 235 and 236). The heartbeat message 243 indicates (e.g. via the field 214) that a maximum sequence number received by the collaboration module 243 is twelve (12).

The message 244 indicates the collaboration module instance 105*a* has initiated a third operation on version twelve (12) of the distributed data structure (all operations sequenced by a number 12 and lower were considered when the third operation was applied to the distributed data structure by collaboration module instance 105*a*). In response to receiving the message 244, the synchronization service 106 distributes a notification of the third operation to all collaboration modules participating in the collaboration. To that end, FIG. 2C shows the synchronization service transmitting the messages 245 and 246 to the collaboration modules 105*b* and 105*a* respectively. In some aspects, messages 245 and 246 may be the same physical message that is broadcast or multicast to at least the two collaboration modules 105*a*-*b* simultaneously. Note the messages 245 and 246 indicate the same version information (12) and collaboration module identification (105*a*) as originally indicated in the message 244. Note also that the heartbeat message 241 updated the maximum sequence number received by the collaboration module instance 105*b*. Since collaboration module instance 105*b* was previously representing a lower bound of the collaboration window, the messages 245 and 246 indicate an update to the bottom end of the collaboration window by indicating a maximum sequence number value of twelve (12) (which is consistent with the heartbeat message 243).

Figure 2D:
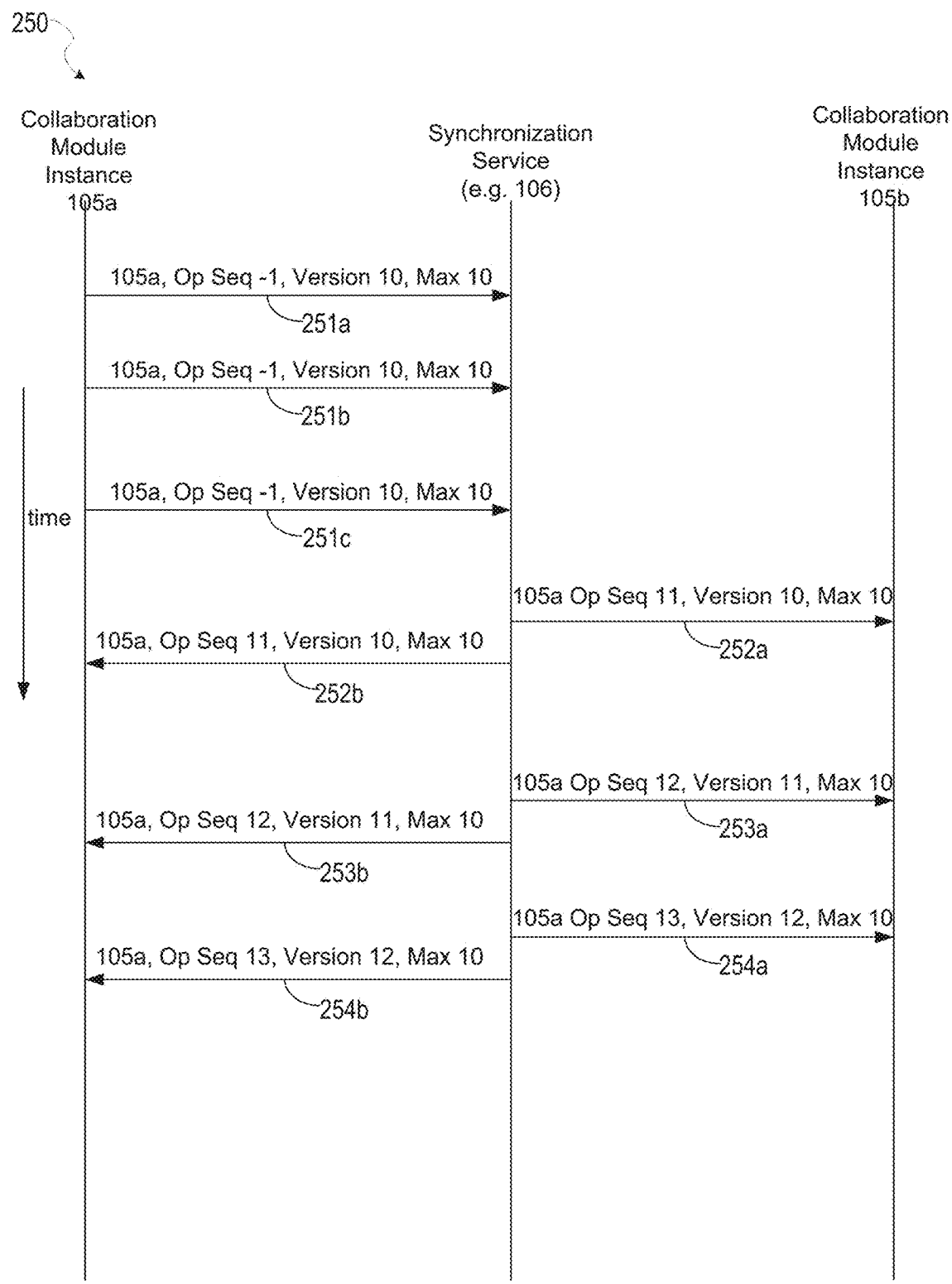
FIG. 2D shows example message exchanges between collaboration module instances and a synchronization service.

FIG. 2D shows example message exchanges between the collaboration module instances 105*a-b* and a synchronization service, in this case, the synchronization service 106. One or more of the messages discussed below with respect to FIG. 2D may include one or more of the fields discussed above with respect to message 200 in FIG. 2A.

The message exchanges illustrated in FIG. 2D are intended to demonstrate how a synchronization service, such as the synchronization service 106, adjusts reference sequence numbers for operations as they are distributed to collaboration module instances (or devices) participating in a collaboration. These adjustments provide for a collaboration module instance to execute operations on a distributed data structure without blocking or otherwise waiting for the synchronization service before continuing. In particular, these adjustments may be appropriate when a collaboration module instance performs multiple operations before any of those operations are assigned a sequence number by the synchronization service.

FIG. 2D shows a series of three messages 251*a-c*, indicating a first, second, and third operation respectively initiated by the collaboration module instance 105*a*. The messages 251*a-c* all indicate that no sequence number has been assigned to any of the first, second, or third operations (e.g. via the example predetermined value of −1 for a sequence number). Each of the messages 251*a-c* also shows a reference sequence number for their respective operation of ten (10). Note the reference sequence number does not change as each of the three messages 251*a-c* are sent. This is a result of the collaboration module instance 105*a* not receiving any messages from the synchronization service (e.g. 106) between the initiates of the three operations.

Next FIG. 2D shows the synchronization service sending a pair of messages 252*a-b*. In some aspects, the two messages 252*a-b* shown in FIG. 2D may be a single physical message that is broadcast or multicast to both of the collaboration module instances 105*a-b*. The messages 252*a-b* indicate that a sequence number of 11 has been assigned to the first operation defined by message 251*a*. The version of the distributed data structure operated on by the first operation is identified as version ten (10) by the message(s) 252*a-b*.

Next, FIG. 2D shows the synchronization service 106 transmitting messages 253*a-b* to the collaboration client instances 105*b* and 105*a* respectively. As was the case for messages 252*a-b*, messages 253*a-b* may be a single physical message that is broadcast or multicast to the collaboration module instances 253*b* and 253*a* respectively. The messages 253*a-b* indicate a sequence number has been assigned to the second operation initiated by the collaboration module instance 105*a* (and indicated by the message 251*b*). Note while the collaboration module instance 105*a* indicated the reference sequence number for the second operation was 10 (see message 251*b*), when the second operation is assigned a sequence number, the synchronization service indicates the reference sequence number for the second operation (having a sequence number of twelve (12)) is eleven (11). Note this reference sequence number is equivalent to the sequence number assigned to the operation indicated in the message(s) 252*a-b*. Thus, the synchronization service updates the reference sequence number for the second operation based on its knowledge of a sequence of multiple operations performed by the collaboration module instance 105*a*.

In particular, the synchronization service 106 is notified that the collaboration module instance 105*a* performed the first operation and then followed this with the second operation and then the third operation. This notification is provided by the sequence of messages 251*a-c*. Thus, the synchronization service is provided an indication that the second operation was performed on a version of the distributed data structure that includes results of the first operation, which was assigned a sequence number of 11 via message(s) 252*a-b*. As a result, the synchronization service indicates in the message(s) 253*a-b* that the second operation (sequence number twelve (12) was performed on version eleven (11) of the distributed data structure, which includes the results of the first operation.

Similarly, the synchronization service 106 updates the reference sequence number for the third operation in a similar manner. As shown in FIG. 2D, the synchronization service 106 transmits messages 254*a-b* (which may be the same message as 252*a-b* and 253*a-b*) notifying collaboration module instances participating in the collaboration of the third operation initiated by collaboration client instance 105*a*. The third operation was originally indicated in the message 251*c*. The third operation is assigned a sequence number of thirteen (13). The second operation was assigned a sequence number of twelve (12). Since the third operation was performed on a version of the distributed data structure that included results of the second operation, the synchronization service 106 indicates a reference sequence number of twelve (12) for the third operation in the message(s) 254*a-b*.

Figure 2E:
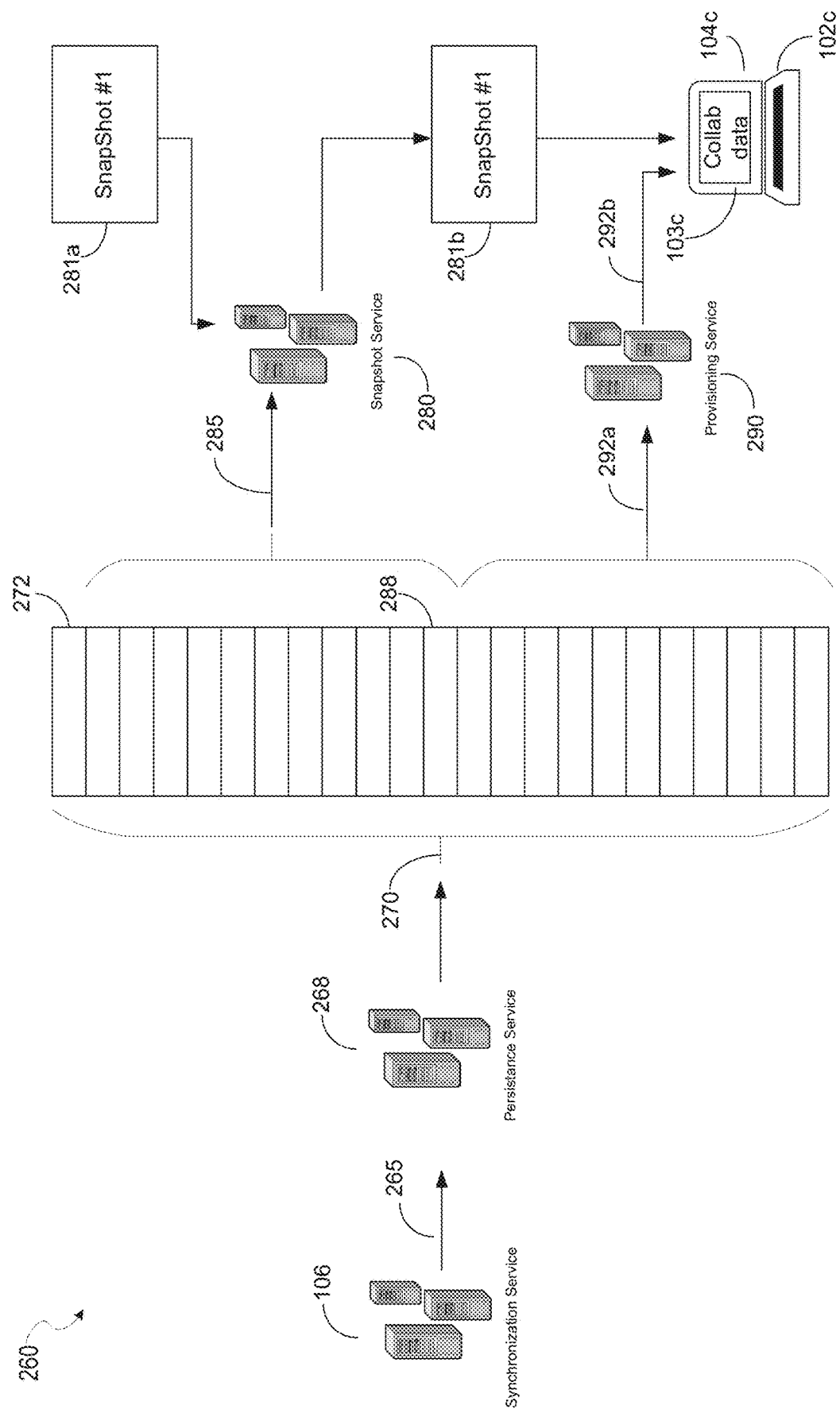
FIG. 2E is an overview diagram of a snapshot process.

FIG. 2E is an overview diagram of a snapshot process. The snapshot process 260 shows the synchronization service 106 of FIG. 1A providing operations records 265 to a persistence service 268. The persistence service 268 feeds the operations records 265 to an operations log 270. In some aspects, the persistence service 268 is integrated with the synchronization service.

The operations log 270 includes individual records 272, each individual record defining an operation. The individual records 272 included in the operations log 270 may be included in an order defined by operation sequence numbers assigned to each operation by the synchronization service 106.

In some aspects, each individual record of the operations log 270 may be comprised of one or more of the values included in the fields of message 200, discussed above. The operations log 270 is read by a snapshot service 280. The snapshot service 280 generates snapshots, such as the snapshots 281*a* and 281*b* shown in FIG. 2E. A snapshot represents a state of a distributed data structure at a particular point in time. For example, the snapshot 281*a* may represent a state of the distributed data structure after all operations up to and including the operation represented by operation record 272 is applied to the data structure. The snapshot service 280 may receive as input a first snapshot, such as the snapshot 281*a*, and an additional set of operations records for operations having sequence numbers greater than the largest sequence number operation included in the first snapshot. These operations records are represented as 285 in FIG. 2E. The snapshot service 280 then applies the additional operations 285 to the first snapshot 281*a* to generate a second snapshot 281b, which represents a second state of the distributed data structure up to and including the operations record 288.

FIG. 2E also shows a provisioning service 290. The provisioning service 290 is responsible for bringing a new collaboration module on line into an existing collaboration. To that end, the provisioning service 290 supplies the new collaboration module (102c in FIG. 2E) with the latest snapshot, 281b in FIG. 2E. The provisioning service 290 also supplies the new collaboration module instance 105c with the operations records with sequence numbers greater than those operations included in the previous snapshot 281b. FIG. 2E shows these operations records as 292a, which are read from the operations log 270 as 292a and provided to the new collaboration module instance 105c as records 292b. The collaboration module instance 105c then applies the operations records 292b to the snapshot 281b to obtain a "current" or up to date version of a distributed data structure managed by the collaboration.

Figure 3:
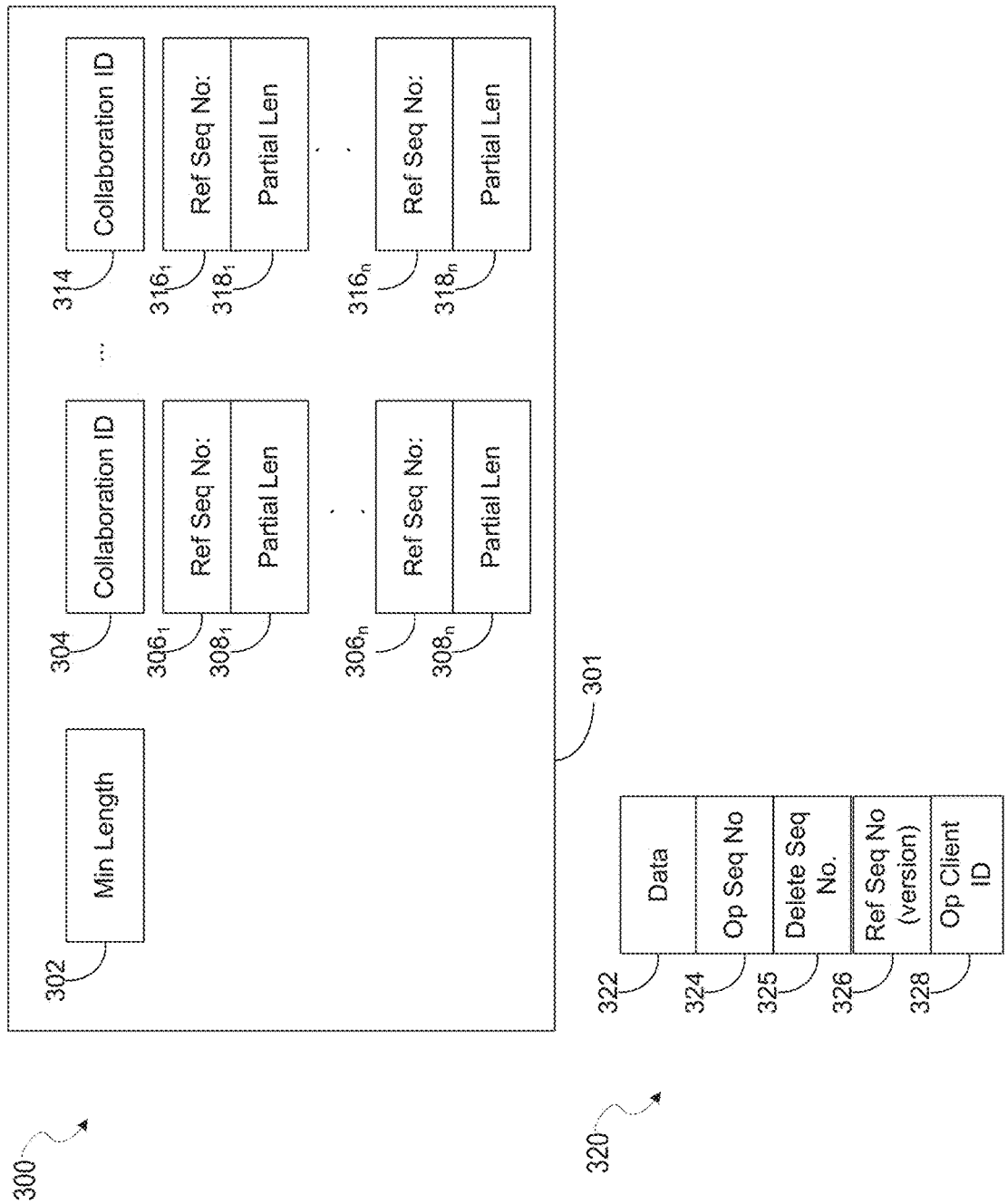
FIG. 3 shows two data structures that may be used to build a tree in some of the disclosed embodiments.

FIG. 3 shows two data structures that may be used to build a tree in some of the disclosed embodiments. In some of these embodiments, a tree data structure is generated and maintained to include one or more block data structures 300 and one or more element data structures 320. All levels of the tree except the leaf level of the tree include one or more of the fields described below with respect to the block data structure 300, while leaf nodes of the tree may include one or more fields described below with respect to the leaf/element data structure. The example merge tree data structures (leaf, node, block, tree, element, etc) as described below represent an example format of data values provided in a physical hardware memory. For example, each of the fields described below may store one or more values in hardware memory. These values may be stored in the memory by hardware processing circuitry, such as one or more hardware processors. These values may also be read from the hardware memory by the one or more hardware processors as necessary to perform one or more of the functions discussed herein. In some embodiments, the values may be written or read by the hardware processing circuitry via memory addresses identifying each of the data values. In some aspects, the memory addresses may be word based addresses, and data values may not necessarily be stored in word aligned physical locations within the memory. In these cases, as is known in the art, the hardware processing circuitry may be configured to read a word of data including the particular value and then perform additional processing on the word value within the hardware processing circuitry in order to isolate the non-word aligned value. The disclosed embodiments may utilize any existing methods of accessing, by hardware processing circuitry, one or more data structures stored in hardware memory.

The example merge tree block 300 discussed below with respect to FIG. 3 is of variable length. In other words, the block 300 may be stored in a variable number of portions of a hardware memory (such as a variable number of bytes, words, etc). The length varies based on both a number of collaboration modules participating in a collaboration, and a size of a current collaboration window of the collaboration. The collaboration window may be considered a number of edits or operations to the distributed data structure that have been initiated but not yet finalized ("synchronized") across all collaboration modules participating in the collaboration. To track edits to the distributed data structure that have not yet been fully synchronized/acknowledged, the merge tree block 300 includes a minimum length field 302. The minimum length field of a block 300 represents a length of the distributed data structure represented by elements of the tree below the block that are common or synchronized across all collaboration modules. In other words, at least in some aspects, the minimum length field 302 represents a length of data represented by elements below the block and associated with sequence numbers less than or equal to a maximum sequence number received in the field 214, discussed above.

The block 300 also includes a variable number of collaboration module identifier fields, such as field 304. Field 314 is shown as another example of a collaboration module identifier field, although the number of collaboration module identifier fields in the merge tree block 300 may vary from zero to potentially any upper bound, limited only by a number of collaboration modules participating in a collaboration.

For each collaboration module instance identifier included in the merge tree block 300, a variable number of data pairs are also included in the merge tree block 300. Each pair of data associates a reference sequence number (e.g. $306_{1 \ldots n}$) and a length value (e.g. stored in fields $308_{1 \ldots n}$). Sequence number values stored in fields $316_{1 \ldots n}$ and length values stored in fields $318_{1 \ldots n}$ are shown as associated with a different collaboration module instance identifier 314 to show that the number of associations per collaboration module instance identifier may vary.

The fields of block 300 introduced above track which portion of a distributed data structure represented by a merge tree is visible to each collaboration module instance participating in the collaboration. Information provided by these fields is maintained for each version of the distributed data structure identified by the reference sequence numbers (e.g. $306_{1 \ldots n}$ and $316_{1 \ldots n}$). This information is used when determining how to apply an operation originating at a local or remote collaboration module instance to a particular merge tree. This information may be necessary because a version of the distributed data structure at the remote collaboration module when an operation was initiated by that collaboration module may not be equivalent to a second version of the distributed data structure at a second collaboration module. In some of the disclosed embodiments, the second collaboration module needs to apply the operation to this second version of the distributed data structure in a manner that replicates the results obtained by the remote collaboration module. The partial length information supports these operations.

Partial length information for a particular block and for a particular collaboration module may be defined by Equation 1 below, where the summation is performed for all leaf node elements represented by the block and meeting defined conditions:

$$pLen(op\ client, op\ ref\ seq, block) = minLen(block) + \Sigma len(leaf.op\ seq \leq op\ ref\ seq) + len(leaf.client = op\ client\ and\ leaf.op\ seq > op\ ref\ seq) \quad (1)$$

where:
  minLen( ) returns the minimum length of data represented by the block (length of synchronized data represented by the block),
  len( ) returns a length of data in the distributed data structure represented by an element matching the identified condition(s),
  op client is an identifier of a collaboration module initiating the operation,
  op ref seq is a reference sequence number for the operation,
  leaf node.client identifies a collaboration module initiating an operation represented by a leaf node, leaf node.op seq is an operation sequence number for a second operation represented by the leaf node The example element data structure 320 includes a data field 322, operation sequence number field 324, a delete sequence number field 325, reference sequence number field 326, and an identifier of a collaboration module that initiated the operation 328. The data field 322 includes data representing a portion of collaboration data (e.g. a distributed data structure) represented by the particular element. The operation sequence number 324 identifies a sequence number assigned to the operation represented by the element. The delete sequence number 325 identifies a sequence number for an operation that deletes data represented by the element data structure 320. In other words, the operation sequence number 324 may indicate a sequence number for an operation that inserted or annotated the data, and if that data is subsequently deleted, the delete sequence number 325 will indicate the sequence number of that (subsequent) operation.

The reference sequence number 326 indicates a maximum sequence number of synchronized operations received by a collaboration module when that collaboration module executed the operation defined by the element 320. Synchronized operations may be those operations that have been acknowledged by all collaboration modules participating in a collaboration. The operation collaboration module identifier field 328 identifies a collaboration module initiating the operation.

The following FIGS. 4-13 represent data structures supporting a collaboration between two collaboration modules, for simplicity referred to as collaboration module instance 105a and collaboration module instance 105b. The two collaboration modules are each editing a string structure, and the merge tree data structures are supporting synchronization of these edits across both of the collaboration modules 102a-b.

Figure 4:
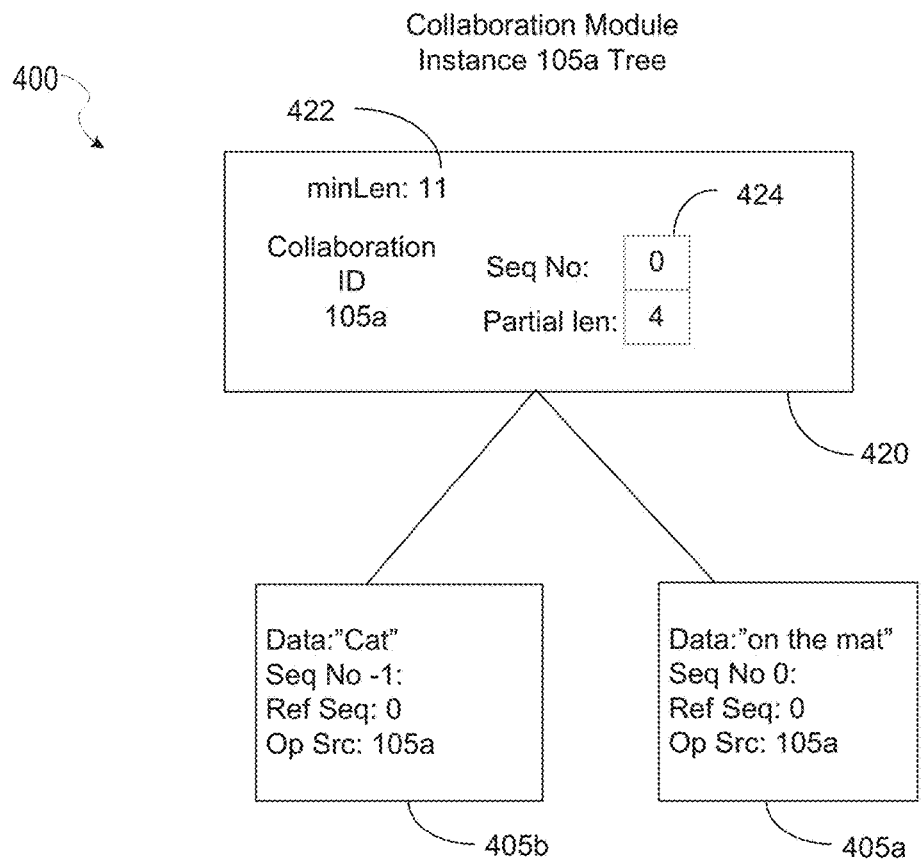
FIG. 4 shows an example of a merge tree portion stored by a collaboration module instance.

FIG. 4 shows an example of a merge tree portion 400 maintained by the collaboration module instance 105a. The merge tree portion 400 represents a string "Cat on the mat." The string is a result of a concatenation of two sub-strings. A first sub-string "on the mat," is represented by a merge tree block 405a of the merge tree portion 400, along with a second string "Cat" which was inserted at position zero (0) of the string "on the mat" by the collaboration module instance 105a. The insertion operation is represented by block 405b. Each of the blocks 405a-b may utilize one or more of the fields discussed above with respect to merge tree node/block 300.

The insertion operation represented by block 405b has not yet been acknowledged by a server, and thus is assigned a sequence number of −1, as shown. The reference sequence number for the insert of "Cat" represented by block 405a is zero (0), since the insertion occurred on a version of the distributed data structure (the string "on the mat") with a highest order operation assigned a sequence number of zero (0).

FIG. 4 also shows a block 420 of the tree portion 400. The block 420 of the tree stores a minimum length value 422 (e.g. stored in the field 302 in some aspects). The minimum length value 422 corresponds to the length of the data "on the mat," represented by segment 405a. The data represented by the segment 405a is acknowledged data, in that all collaboration module instances participating in the collaboration have acknowledged operations that resulted in the string "on the mat." Since results of operations assigned sequence numbers less than or equal to a current reference sequence number (e.g. as provided in the field 214 from the distribution server in some aspects), are visible to all collaboration module instances participating in the collaboration. As such, the length of this data can be included in the minimum length value 422.

The block 420 also includes partial length information for the collaboration module instance 105a shown as 424. The partial length information 424 indicates that segments below the block 420 include four (4) additional characters of data (beyond the minimum length) when the collaboration module instance 105a accesses those segments with a sequence number of zero or more. This corresponds to the insertion of "Cat" by the collaboration module instance 105a. The block 420 does not include any partial length information for the collaboration module instance 105b, indicating that no additional data is available to the collaboration module instance 105b under any circumstances (since the insert of "Cat" has not yet been assigned a sequence number by the distribution server and is thus not visible to the instance 105b).

Figure 5:
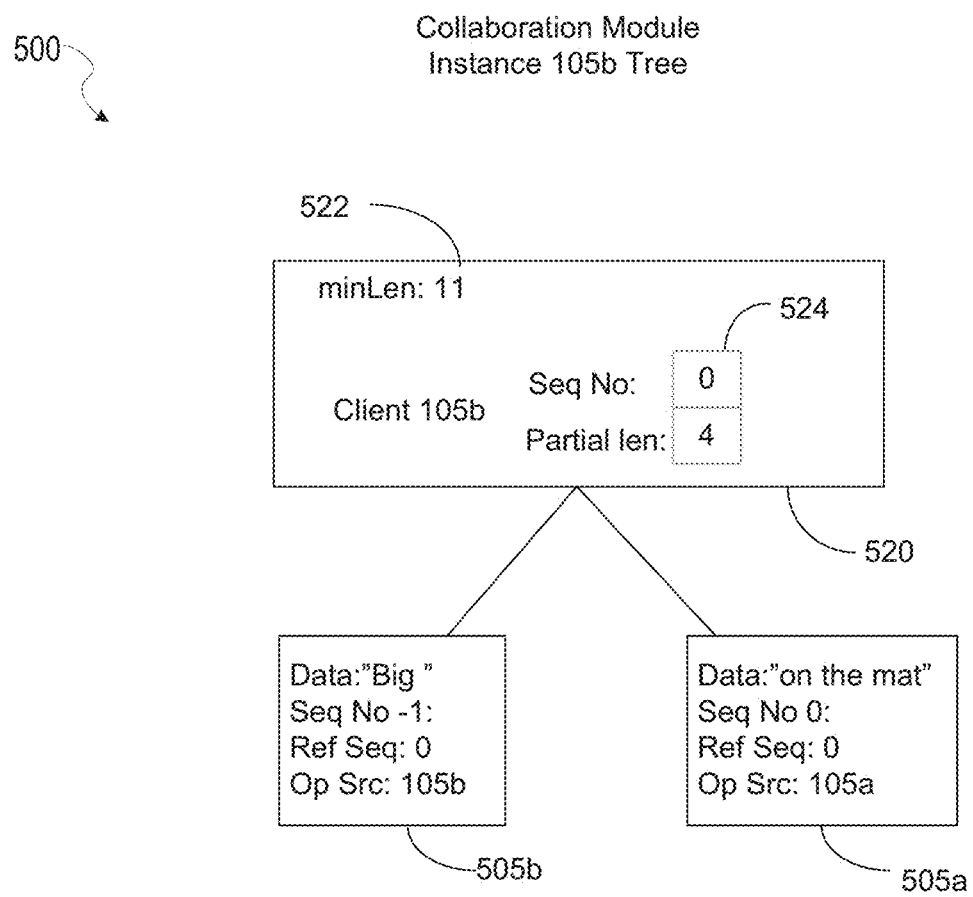
FIG. 5 shows an example merge tree portion stored by a collaboration module instance.

FIG. 5 shows an example merge tree portion 500 on the collaboration module instance 105b. The example merge tree portion 500 of FIG. 5 represents a string "Big on the mat." The merge tree portion 500 includes a string portion "on the mat." represented by element 505a, which is synchronized with the "on the mat" string portion represented by element 405a discussed above with respect to collaboration module instance 105a and merge tree portion 400.

The tree portion 500 also includes a second element 502b, which represents an insert operation of the string "Big" at position zero (0) of the string "on the mat." The insert operation was initiated by the collaboration module instance 105b. The collaboration module instance 105b assigned a sequence number of −1 to the insert "Big" operation until the insert is acknowledged by the synchronization service. The reference sequence number/distributed data structure version of the insert represented by element 505b is zero. This indicates that results of operations having lower ordered or equivalent sequence numbers to zero were considered when the operation to insert "Big" was performed on the distributed data structure.

FIG. 5 also shows a block 520 of the tree portion 500. The block 520 indicates a minimum length value 522 for the leaf elements below the block 520. The minimum length value 522 represents a length of the synchronized data represented by the element 505a. In other words, the length value 522 indicates a length of data represented by the node 520 that has passed out the bottom end of the collaboration window (e.g. 230).

The block 520 also includes partial length information 524 for the collaboration module instance 105b. The partial length information 524 indicates that for reference sequence numbers of zero or above, the leaf elements below the block 520 include four additional characters of data in addition to the minimum length value 522. The block 520 does not include any partial length information for the collaboration module instance 105a. This indicates there is no additional data visible to the collaboration module instance 105a in the tree portion 500 except that represented by the minimum length value 522.

Figure 6:
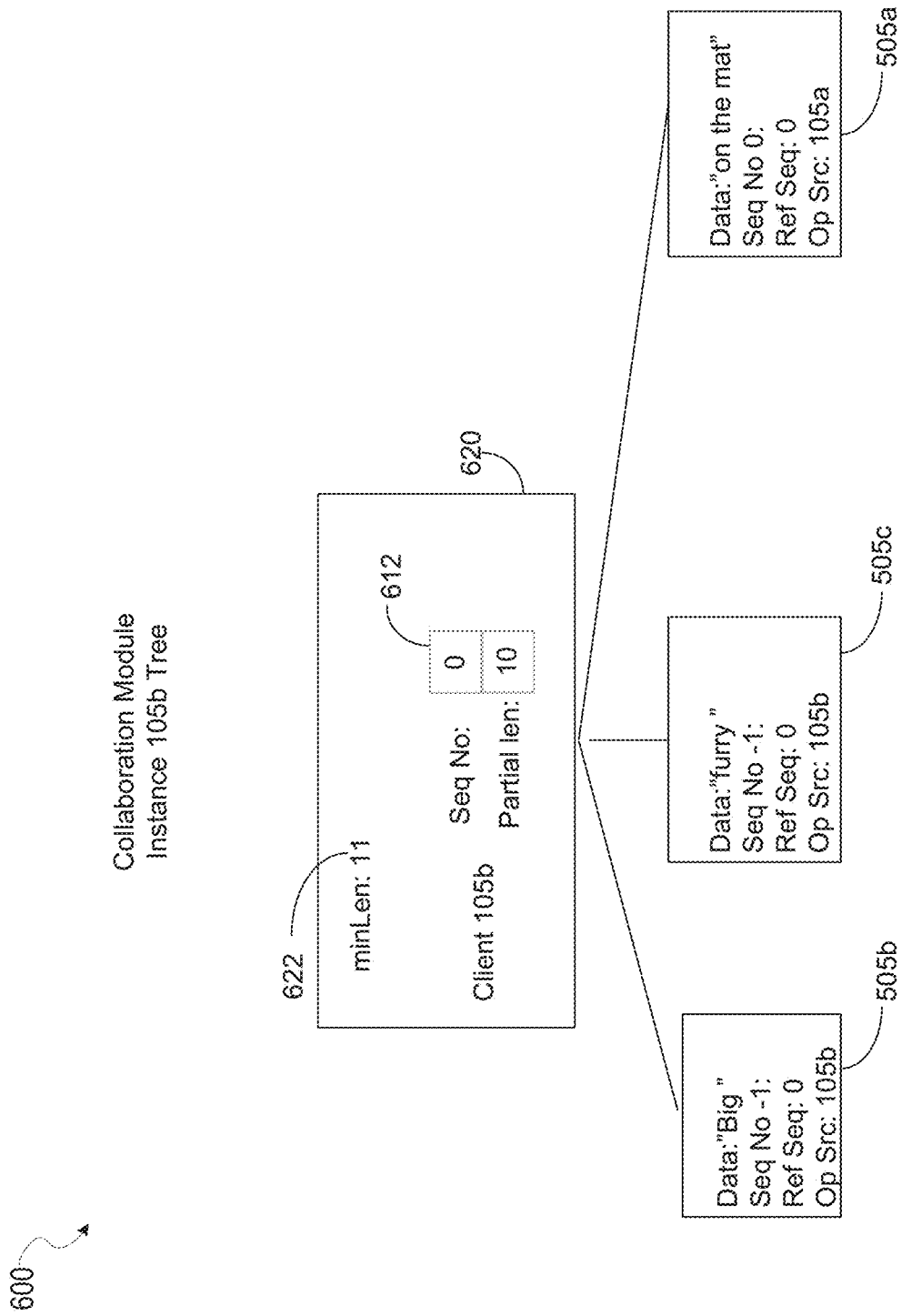
FIG. 6 shows an updated version of a merge tree portion stored by a collaboration module instance.

FIG. 6 shows an updated version of a merge tree portion on collaboration module instance 105b. The merge tree portion 600 of FIG. 6 reflects an additional insert operation that occurred on collaboration module instance 105b, and thus a modification of the merge tree portion 500. The second insert operation inserts the word "furry" at position four (4) in the string and is represented by an element 505c. The word "furry" occurs after the word "big" in the string, which is represented by element 505b. The insert operation represented by the element 505c is assigned a sequence number of −1, since the operation has not been assigned a sequence number yet by the server, and a reference sequence number of zero is assigned, since the insert of the word "furry" occurs before any operations are received from the server.

A block of the tree portion 600 is shown as 620. The block 620 indicates a minimum length value 622 of eleven, again representing the data represented by element 505a. The minimum length value 622 does not include a length of data represented by elements 505b and 505c since this data is not acknowledged by all collaboration module instances participating in the collaboration. The block also includes partial length information 612. Since the collaboration module instance 105b initiated both of the insertion operations represented by elements 505b and 505c, and both of those operations have a reference sequence number of zero, the partial length information 612 indicates that access to the tree portion 600 by collaboration module instance 105b having reference sequence numbers of zero or greater reference ten (10) characters of data beyond the minimum length value 622. These ten characters represents six characters represented by element 505c and four (4) characters from element 505b (each string includes a space at the end).

Figure 7:
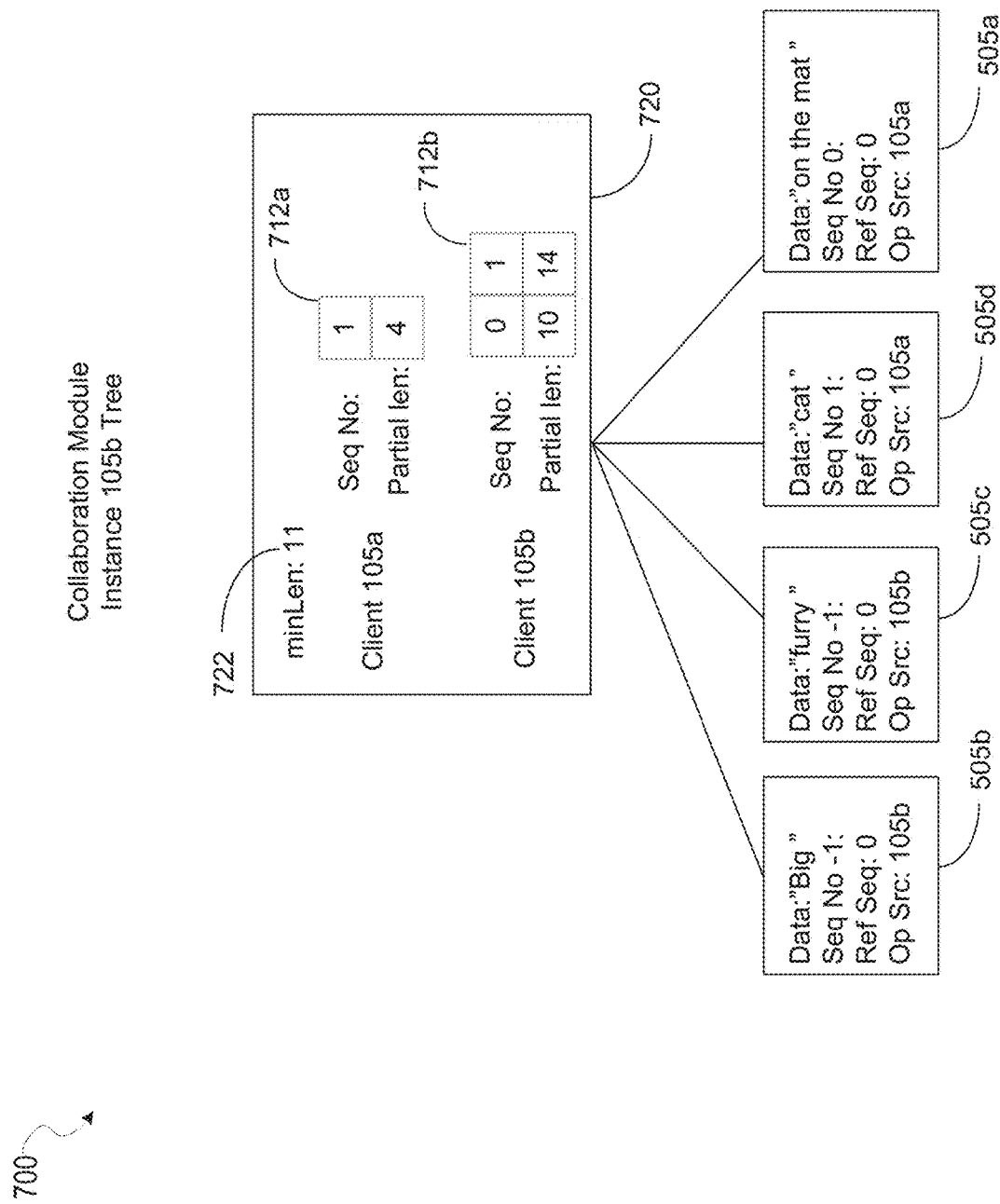
FIG. 7 shows an updated version of a merge tree portion stored by a collaboration module instance.

FIG. 7 shows an updated version of the merge tree portion 600 stored at the collaboration module instance 105b. The updated portion is labeled 700. Tree portion 700 shows that the insert operation "cat" from FIG. 4, that was initiated by the collaboration module instance 105a, has been propagated (e.g. via the synchronization service 106) to the collaboration module instance 105b. This insert operation is represented in tree portion 700 as element 505d.

The insertion of "cat" by the collaboration module instance 105a conflicts with the insertion of "big" and "furry" by the collaboration module instance 105b because all of these insertions were to position zero of the string. Conflict rules determine that the position of element 505d in the tree portion 700 is thus determined based on the insert operation's reference sequence number. The reference sequence number for the collaboration module instance 105a's insert of "Cat" is zero. Under the conflict rules discussed above, the "big" and "furry" insertion operations are shifted to the left because they will be assigned sequence numbers greater than the sequence number of the "cat" insertion (one (1)).

FIG. 7 also shows a block 720 of the tree portion 700. The block indicates the minimum length value 722. The block 720 also indicates partial length information 712a-b for collaboration module instance 105a and 102b respectively. The partial length information 712a indicates a partial length of four (4) characters for reference sequence numbers of one (1) or larger. This corresponds to the length of the data represented by element 505d. The data represented by elements 505b and 505c are not yet visible to the collaboration module instance 105a, and thus no partial length information for this data is provided for the collaboration module instance 105a. The partial length information 712b for the collaboration module instance 105b indicates that for reference sequence numbers greater than or equal to zero (0) ten characters of data are included in elements below the block 720. The ten characters include the data represented by the segments 505b and 505c. The partial length information 712b also includes an indication that for reference sequence numbers of one (1) or greater, the elements below the block 720 include 14 characters of data. The additional four (4) characters of data for reference sequence number one (1) compared to reference sequence number zero (0) in partial information 712b is the data represented by block 505d. The data represented by block 505d is assigned a sequence number of one (1) and was initiated by the collaboration module instance 105a.

After receiving notification from the synchronization service 106 of the insertion of "Cat", the collaboration module instance 105b may receive acknowledgment from the synchronization service 106 of the insertion of "Big." The synchronization service assigns the insertion of "big" operation, represented by element 505b a sequence number of two. This will be shown in subsequent examples below.

Figure 8:
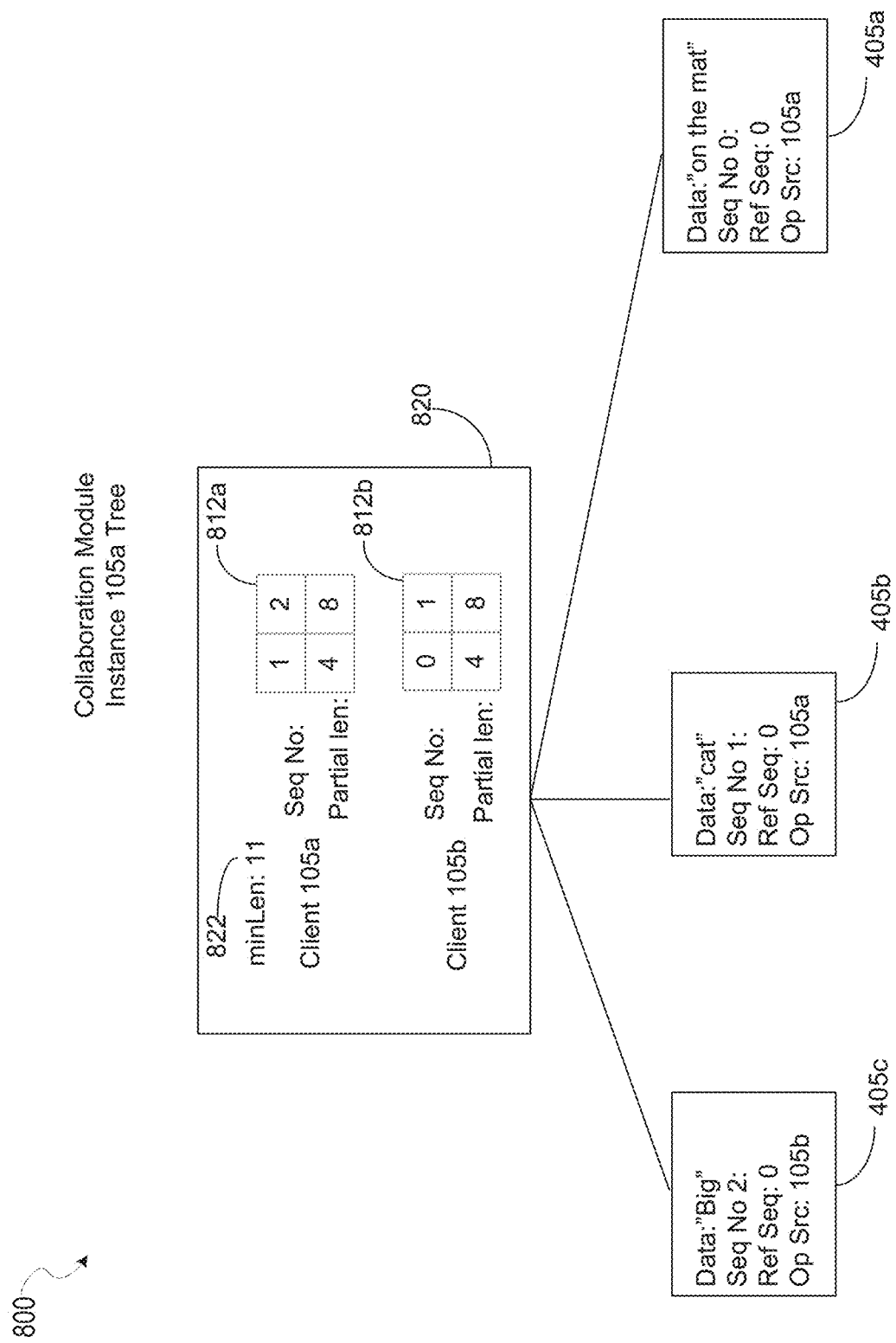
FIG. 8 shows an updated version of the merge tree portion from FIG. 4.

FIG. 8 shows an updated version of the merge tree portion 400 from FIG. 4 as tree portion 800. Tree portion 800 shows that the collaboration module instance 105a has been notified of the insertion of "Big" into the string by the collaboration module instance 105b. This insertion operation is represented as element 405c. The insertion of "Big" used a reference sequence number of zero (0), which conflicts with the reference sequence number of the insertion of "Cat" represented by element 405b. "Big" is placed before "Cat" under the conflict rules because it has a later sequence number (two (2)) than "Cat" (which is one (1)).

The tree portion 800 includes a block 820. The block 820 indicates a minimum length value 822. The block 820 and includes partial length information 812a-b for each of the collaboration modules 102a-b respectively. The partial length information 812 indicates that for the collaboration module instance 105a, elements below the block 820 represent four characters of data (that represented by block 405b) for a reference sequence number of zero. The partial length information 812a further indicates that for the collaboration module instance 105a, elements below the block 820 represent eight (8) characters of additional data (in addition to minimum length value 822) when the reference sequence number is two or greater. These eight characters of data are represented by the elements 405b and 405c. With respect to the collaboration module instance 105b, the partial length information 812b indicates that the elements below the block 822 represent four (4) additional characters of data (beyond minimum length value 822) when the reference sequence number is zero. This four (4) additional characters are represented by the block 405c, which was initiated by the collaboration module instance 105b and has a reference sequence number of zero. When the reference sequence number of collaboration module instance 105b is one (1), the partial length information 812b indicates the elements below block 820 represent a total of eight (8) characters of additional data, as the "Cat" insertion becomes visible to collaboration module instance 105b when the reference sequence number is one.

Figure 9:
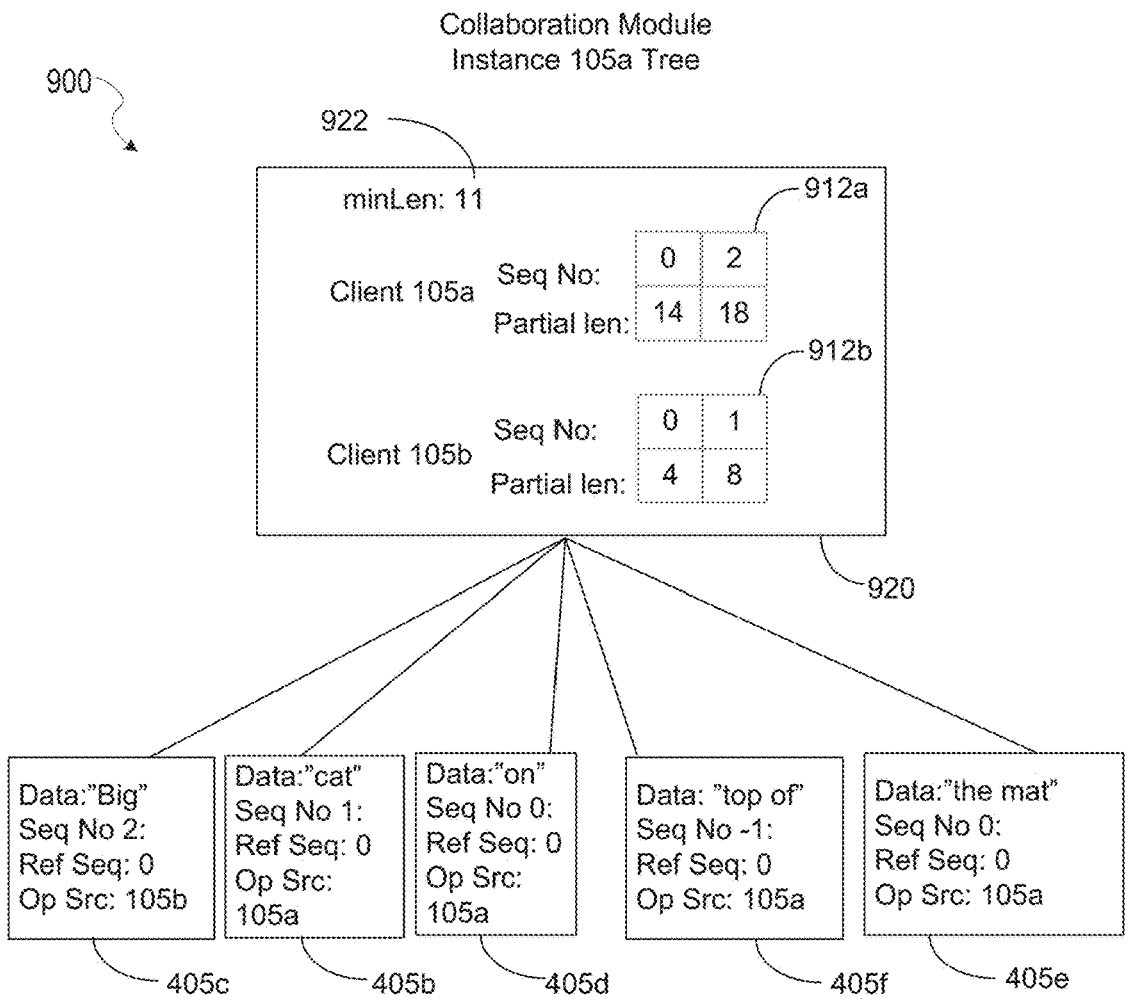
FIG. 9 shows an updated version of a merge tree portion stored by a collaboration module instance.

FIG. 9 shows an updated version of the collaboration module instance 105a merge tree portion as tree portion 900. The tree portion 900 shows an additional insert operation has occurred on collaboration module instance 105a. The insert operation inserts the string "top of" at position 11 of the previous string "big cat on the mat." Since the insert occurs in the middle of the string "on the mat" represented by element 405a in the previous collaboration module instance 105a merge tree, element 405a is split into two elements, labeled as elements 405d and 405e. The new characters "top of" are represented by element 405f. As both the characters "on", represented by element 405d, and the characters "the mat" represented by element 405e, originate from the original string "on the mat" having a sequence number of zero (0), the sequence number of zero is also assigned to each of the elements 405d and 405e representing "on" "the mat" respectively. When collaboration module instance 105a inserts the "top of." string, it also sends a message to the server indicating the insertion operation, the characters inserted, and the position of insertion. The sequence number of this insert operation is assigned to −1 (as shown in FIG. 9) until the distribution server 106 provides a confirmed sequence number for the insertion operation.

A block 920 included in the tree portion 900 indicates minimum length information 922. Partial length information for the merge tree portion 900 is shown in block 920 as 922a-b for collaboration modules 105a-b respectively. The partial length information 922a indicates that, for collaboration module instance 105a, a reference sequence number of zero includes fourteen (14) additional characters of data in the elements below the block 920. This fourteen (14) additional characters include data represented by the elements 405b, 405d, and 405f. When the reference number reaches two (2) or more on the collaboration module instance 105a, the insertion of "Big" by the collaboration module instance 105b becomes visible to the collaboration module instance 105a, and thus the partial length information increases by four (4) relative to sequence number zero, as shown by partial length information 912a.

With respect to collaboration module instance 105b, the partial length information 912b indicates that four (4) additional characters are provided by elements below the block 920 when a reference sequence number is zero. These four (4) additional characters are represented by the block 405c. The partial length information 912b further indicates that four (4) additional characters are provided by elements below the block 920 when a reference sequence number is one (1). These four (4) additional characters are represented by the block 405b, when collaboration module instance 105a's insertion of "Cat" becomes visible to the collaboration module instance 105b.

Figure 10:
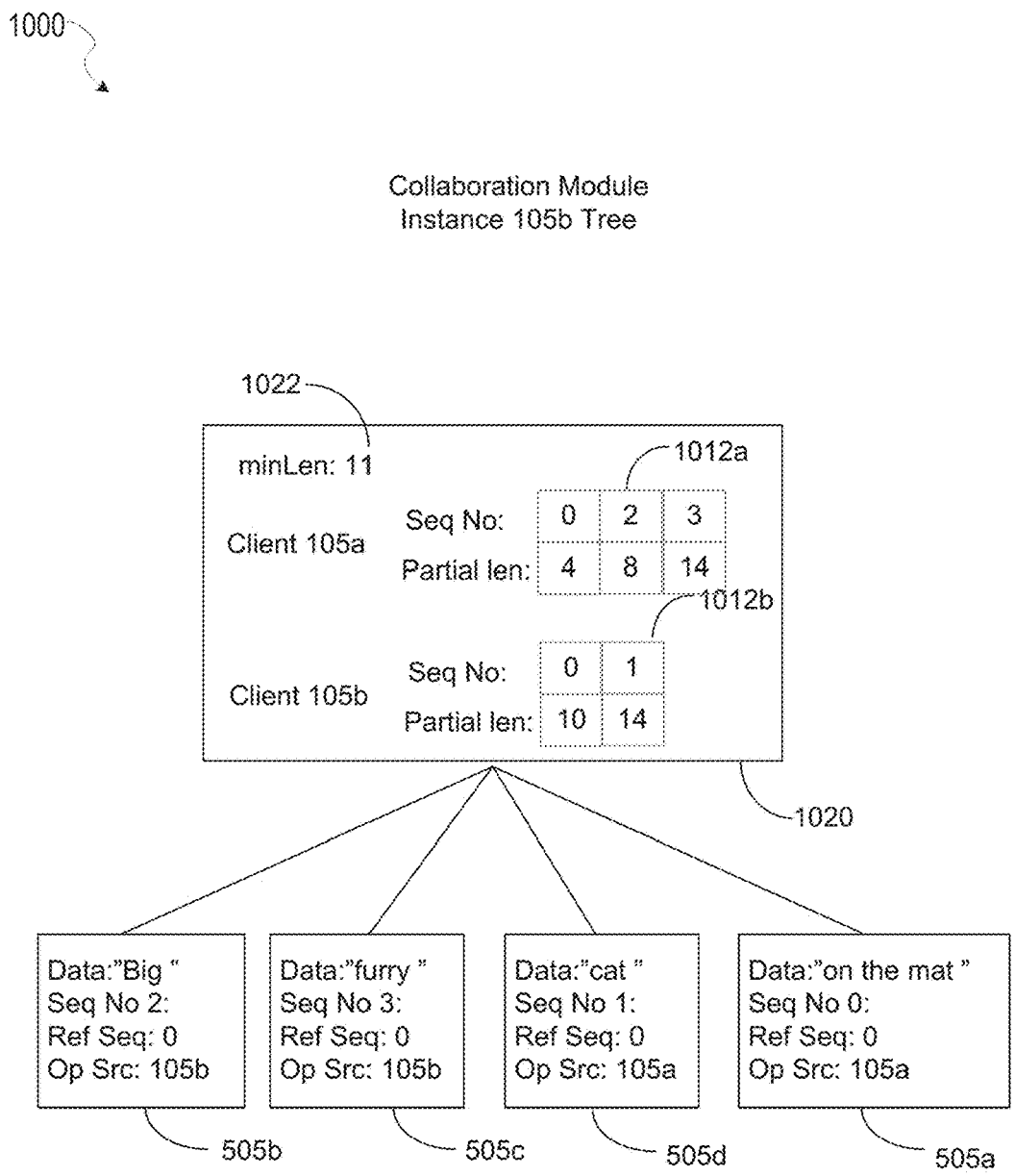
FIG. 10 shows an updated tree portion stored by a collaboration module instance.

FIG. 10 shows an updated tree portion 1000 on collaboration module instance 105b. The tree portion 1000 reflects a state after collaboration module instance 105b receives an acknowledgment of the insertion of "furry" from the server. The update assigns a sequence number to "furry" as shown.

The block 1020 also indicates partial length information 1012a-b for collaboration module instance 105a and 102b respectively. The partial length information 1012a indicates a partial length of four (4) characters for reference sequence numbers of zero (0) or larger. This corresponds to the length of the data represented by element 505d, which was initiated by collaboration module instance 105a. The data represented by elements 505a and 505c are not yet visible to the collaboration module instance 105a when the reference sequence number is zero, and thus no partial length information for this data is provided for the collaboration module instance 105a when the reference sequence number is zero.

The partial length information 1012a further indicates that when the reference sequence number for collaboration module instance 105a is two, the four additional characters represented by element 505b become visible to the collaboration module instance 105a. When the reference sequence number is three, partial length information 1012a indicates that the elements below the block 1020 include an additional fourteen (14) characters of information, including data represented by both elements 505b and 505c (and 505d).

The partial length information 1012b for the collaboration module instance 105b indicates that for reference sequence numbers greater than or equal to zero (0) ten characters of data are included in elements below the block 1020. The ten characters include the data represented by the segments 505b and 505c. The partial length information 1012b also includes an indication that for reference sequence numbers of one (1) or greater, the elements below the block 1020 include 14 characters of data. The additional four (4) characters of data for reference sequence number one (1) compared to reference sequence number zero (0) in partial information 1012b is the data represented by block 505d. The data represented by block 505d is assigned a sequence number of one (1) and was initiated by the collaboration module instance 105a.

Figure 11:
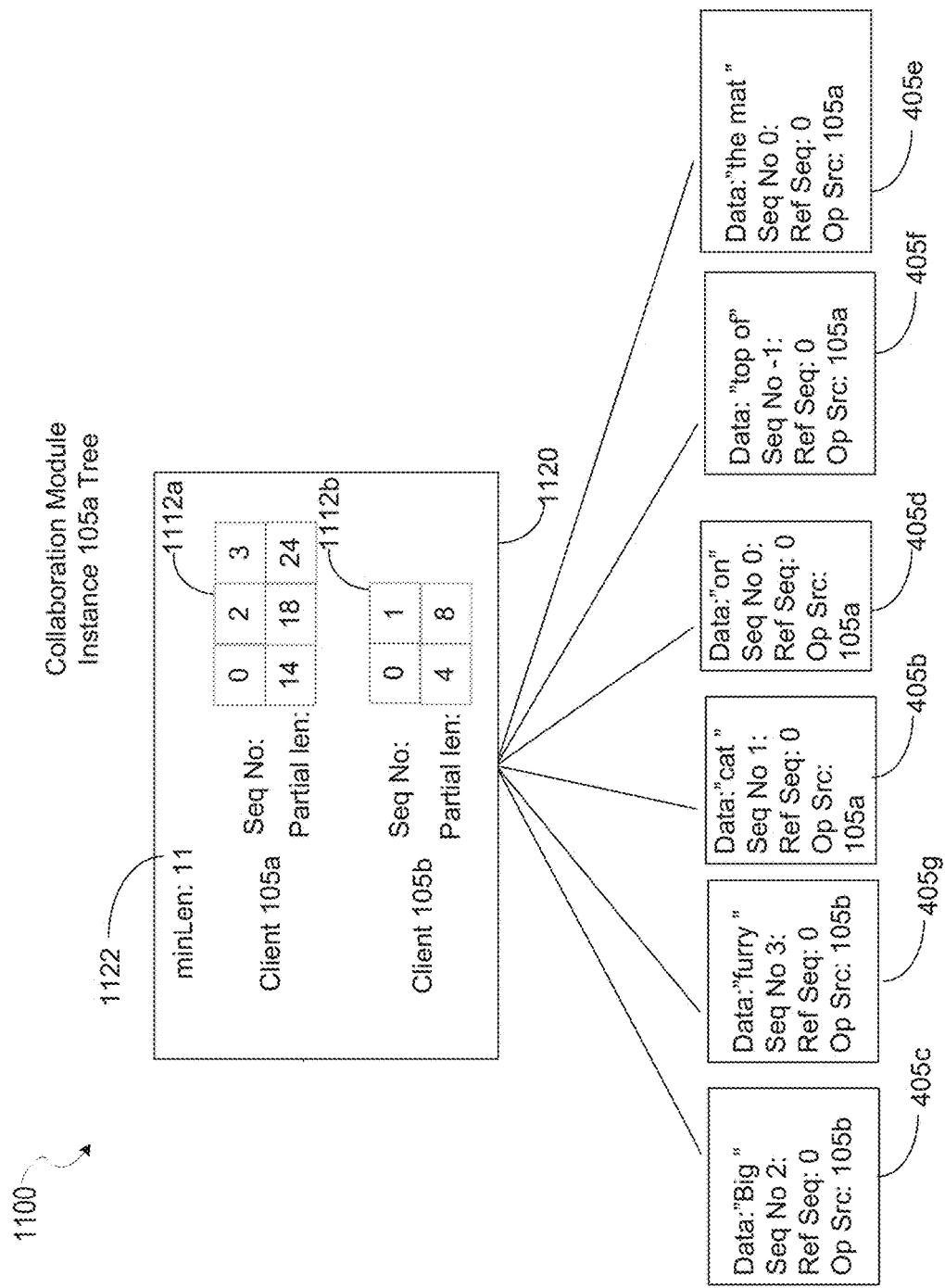
FIG. 11 shows an example merge tree portion stored by a collaboration module instance.

FIG. 11 shows an example merge tree portion 1100 on the collaboration module instance 105a after collaboration module instance 105a has been notified of the insertion of "Furry" by the distribution server 106. The insertion is represented by the element 405g. The notification from the server indicates to collaboration module instance 105a that the Furry insertion is assigned a sequence number of three (3).

A block 1120 included in the tree portion 1100 indicates minimum length information 1122. Partial length information for the merge tree portion 1100 is shown in block 1120 as 1122a-b for collaboration modules 105a-b respectively. The partial length information 1122a indicates that, for collaboration module instance 105a, a reference sequence number of zero includes fourteen (14) additional characters of data in the elements below the block 1120. This fourteen (14) additional characters include data represented by the elements 405b, 405d, and 405f. When the reference number reaches two (2) or more on the collaboration module instance 105a, the insertion of "Big" by the collaboration module instance 105b becomes visible to the collaboration module instance 105a, and thus the partial length information increases by four (4) relative to sequence number zero to a total of eighteen (18), as shown by partial length information 1112a. When the reference number reaches three (3) or more on the collaboration module instance 105a, the insertion by the collaboration module instance 105b of "furry" becomes visible, and thus the partial length information 1112a indicates an additional six (6) characters of data for a reference number of three (3) as shown.

With respect to collaboration module instance 105b, the partial length information 1112b indicates that four (4) additional characters are provided by elements below the block 1120 when a reference sequence number is zero. These four (4) additional characters are represented by the block 405c. The partial length information 1112b further indicates that four (4) additional characters are provided by elements below the block 1120 when a reference sequence number is one (1). These four (4) additional characters are represented by the block 405b, when collaboration module instance 105a's insertion of "Cat" becomes visible to the collaboration module instance 105b.

Figure 12:
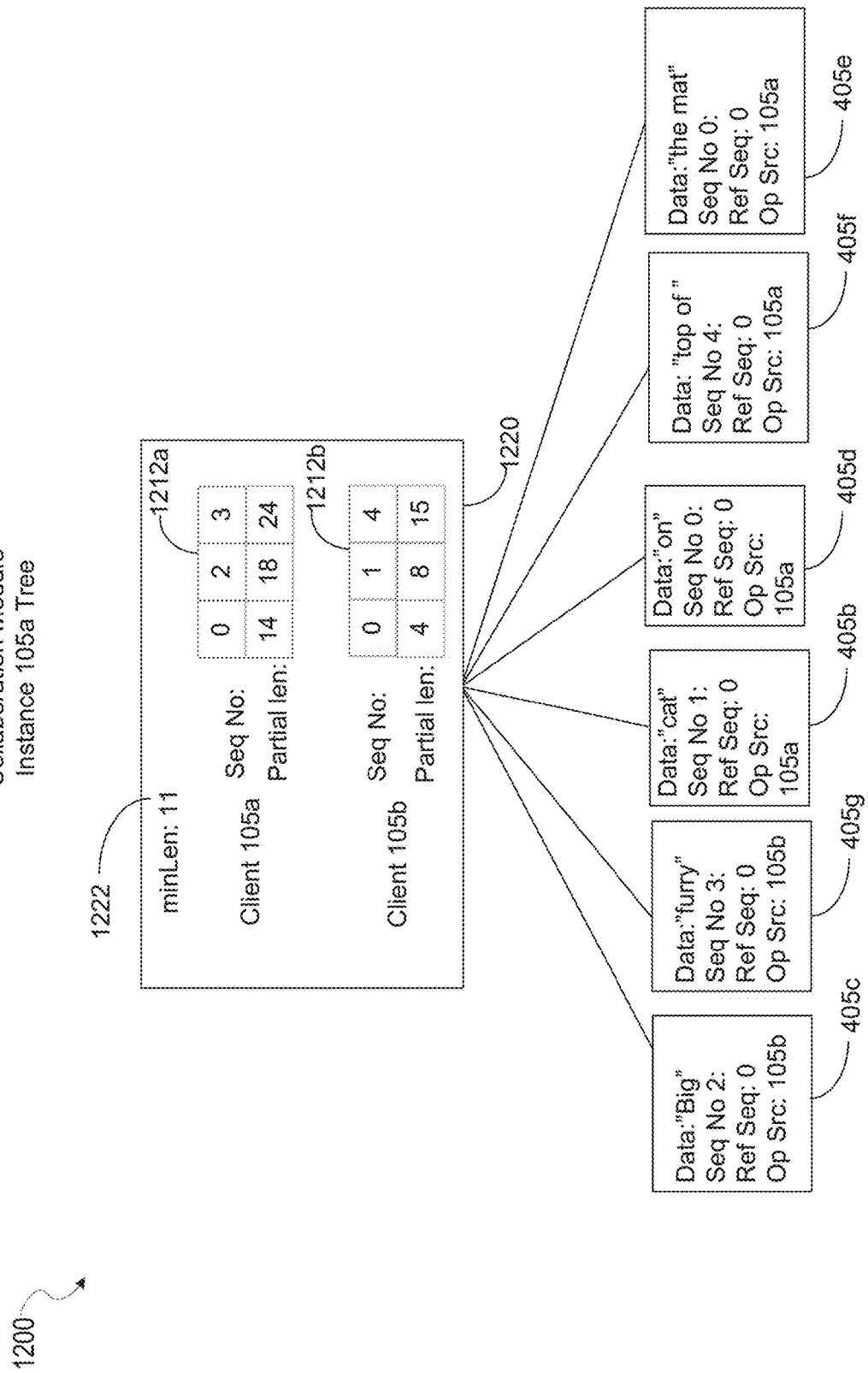
FIG. 12 shows a merge tree portion that indicates an acknowledgement of an insertion.

FIG. 12 shows a merge tree portion 1200 that indicates an acknowledgement of the insertion of "top of" has been received from the synchronization service 106 by collaboration module instance 105a. The synchronization service 106 assigned a sequence number of four (4) to the insert operation for "top of." Which is shown in element 405f.

A block 1220 included in the tree portion 1200 indicates minimum length information 1222. Partial length information for the merge tree portion 1200 is shown in block 1220 as 1222a-b for collaboration modules 105a-b respectively. The partial length information 1222a indicates that, for collaboration module instance 105a, a reference sequence number of zero includes fourteen (14) additional characters of data in the elements below the block 1220. This fourteen (14) additional characters include data represented by the elements 405b, 405d, and 405f. When the reference number reaches two (2) or more on the collaboration module instance 105a, the insertion of "Big" by the collaboration module instance 105b becomes visible to the collaboration module instance 105a, and thus the partial length information increases by four (4) relative to sequence number zero to a total of eighteen (18), as shown by partial length information 1212a. When the reference number reaches three (3) or more on the collaboration module instance 105a, the insertion by the collaboration module instance 105b of "furry" becomes visible, and thus the partial length information 1212a indicates an additional six (6) characters of data for a reference number of three (3) as shown.

With respect to collaboration module instance 105b, the partial length information 1212b indicates that four (4) additional characters are provided by elements below the block 1220 when a reference sequence number is zero. These four (4) additional characters are represented by the block 405c. The partial length information 1212b further indicates that four (4) additional characters are provided by elements below the block 1220 when a reference sequence number is one (1). These four (4) additional characters are represented by the block 405b, when collaboration module instance 105a's insertion of "Cat" becomes visible to the collaboration module instance 105b. With the assignment of a sequence number (4) to the insertion of "top of", represented by element 405f, the partial length information 1212b may then be updated to indicate this. In other words, when accessing the tree portion 1200, the collaboration module instance 105b has visibility to fifteen (15) characters of additional information (beyond that indicated by the minimum length value 1222, when its reference sequence number is four (4) or larger, as shown by partial length information 1212b. The additional seven characters relative to a sequence number of one (1) is provided by the data represented by the block 405f.

Figure 13:
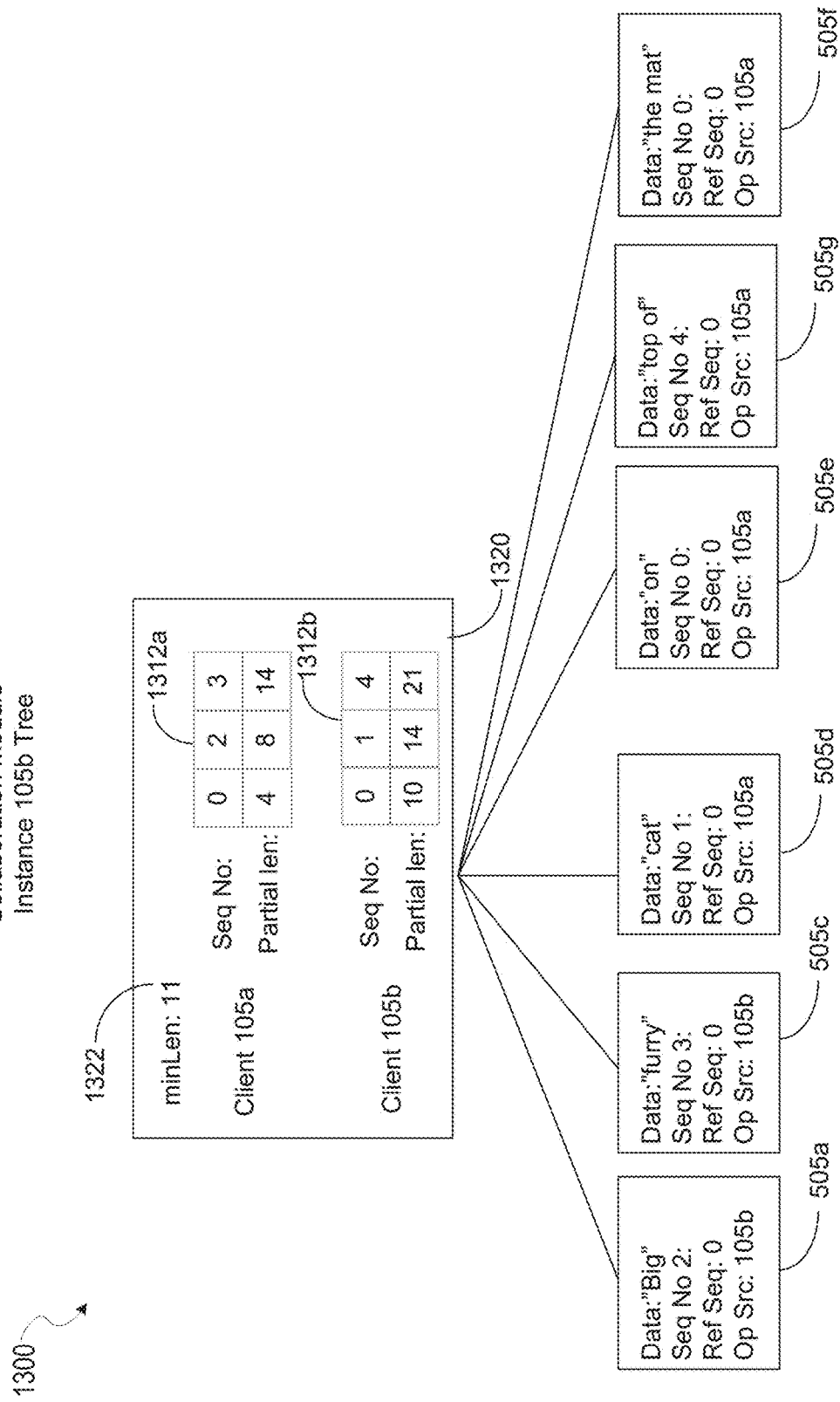
FIG. 13 shows a merge tree portion stored by a collaboration module instance.

FIG. 13 shows a merge tree portion 1300 stored on the collaboration module instance 105b after it receives notification of the insertion, by collaboration module instance 105a, of the string "top of." The insertion is represented by element 505g. To accomplish the insertion, collaboration module instance 105b splits its previous "on the mat" element 505a into two elements, 505e and 505f to represent "on" and "the mat" respectively. The "top of" insertion is then represented by element 505g, as shown.

A block 1320 includes minimum length value 1322 and partial length information 1312a-b for the collaboration modules 105a-b respectively. Based on the "top of" insertion represented by element 505g, an indication that a reference sequence number of four (4) (equivalent to the sequence number assigned by the distribution server 106 to the "top of" insertion operation), provides for an additional 7 characters of data relative to a reference sequence number of one, two, or three, as shown by partial length information 1312b.

Figure 14:
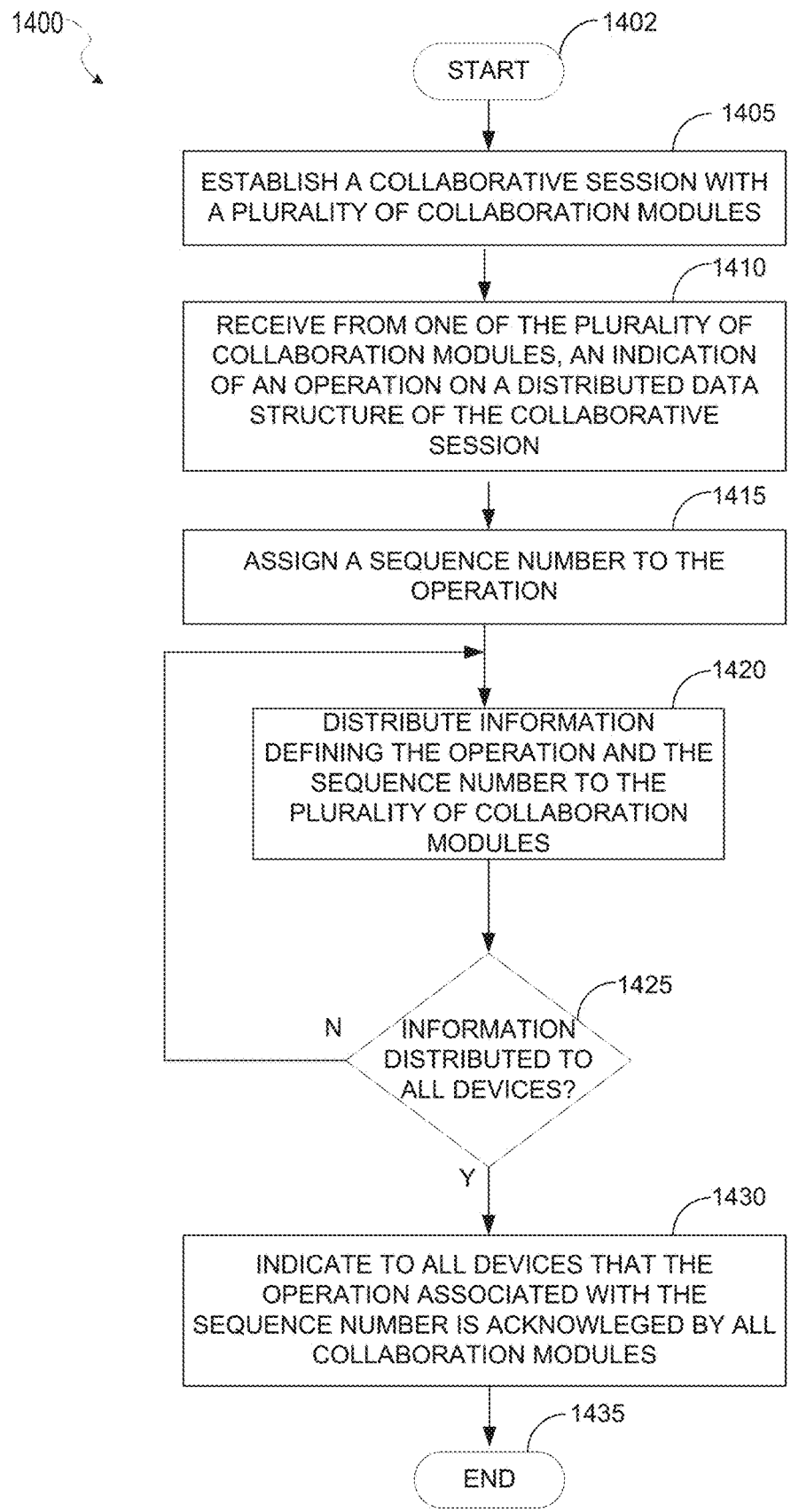
FIG. 14 is a flowchart of an example process for distributing operations on a distributed data structure to a plurality of collaboration module instance.

FIG. 14 is a flowchart of an example process for distributing operations on a distributed data structure to a plurality of collaboration modules. In some aspects, the process 1400 discussed below with respect to FIG. 14 may be performed by the synchronization service 106. In some aspects, instructions (e.g. instructions 2324 below) stored in a memory (e.g. instructions 2304 below) may configure hardware processing circuitry (e.g. processor 2302 below) to perform one or more of the functions discussed below.

In operation 1405, a collaborative session is established with a plurality of collaboration module instances. For example, as discussed above with respect to FIG. 1A, a plurality of collaboration module instances (e.g. collaboration module instances 102a and 102b) may each edit a distributed data structure, such as a text string. Establishing the collaborative session may include, for example, retrieving data defining a particular version of the distributed data structure, and in some aspects, obtaining data defining one or more in process operations on the distributed data structure from one or more corresponding collaboration modules. The in-process operations may not yet be synchronized with each collaboration module instance participating in the collaborative session.

In operation 1410, an indication of an operation on the distributed data structure is received. For example, as discussed above with respect to FIG. 1A, a collaboration module instance performing an operation on the distributed data structure may notify the synchronization service 106 of the operation (e.g. via message 200 of FIG. 2A). Operation 1410 may also include receiving an indication of a version of the distributed data structure upon which the operation was performed (e.g. via reference sequence number 206 of the message 200). Further indications received in operation 1410 may include a type of the operation (e.g. insertion, deletion, or annotation), an indication of the collaboration module instance initiating the operation (e.g. field 202), a value associated with the operation (annotation values for example or string characters being inserted as another example), and an identification of where in the distributed data structure the operation is performed. For example, an offset into the distributed data structure may identify an insertion point for an insertion. An offset range may indicate a portion of the distributed data structure to be deleted by the operation as another example.

In operation 1415, a sequence number is assigned to the operation. In some aspects, operation sequence numbers may be assigned to operations according to an order in which the indications of the operations are received by a common service for the collaboration module instances, such as the synchronization service 106. The sequence number assigned to each received operation may be a monotonically increasing number or strictly increasing number. In some aspects, when a collaboration module instance initiates an operation and informs the common service (e.g. synchronization service 106) of the operation, the collaboration module instance may initiate a sequence number for the new operation to a predefined number, such as minus one (−1). The common service, when receiving the notification, may recognize the need to assign a sequence number to the operation at least in part based on the sequence number for the operation being set to this predefined number.

In operation 1420, information defining the operation is distributed to the plurality of collaboration module instances participating in the collaboration session. In some aspects, the information may be indicated consistent with one or more of the fields discussed above with respect to FIG. 2A. Operation 1420 may include generating a message including the information and transmitting it to each collaboration module instance participating in the collaboration session. For example, FIG. 1A shows messages 120a and 120b distributing a message to each of the collaboration module instances 105a and 105b, informing each of those collaboration module instances of an operation initiated by the collaboration module instance 105a. In this particular example, the collaboration module instance 105a, which already is aware of the operation since it was initiated by the collaboration module instance 105a, identifies a sequence number assigned to the operation via the message 120a.

Operation 1425 determines whether the information has been distributed to all of the collaboration module instances participating in the collaboration. If not, processing returns to operation 1420, where the information is distributed to one or more additional devices.

If the information is distributed to all collaboration module instances, process 1400 moves to operation 1430, which indicates to all devices participating in the collaboration that the sequence number assigned to the operation is synchronized. In other words, operation 1430 informs all of the collaboration module instances that each collaboration module instance is now aware of the operation. In some aspects, operation 1430 is accomplished by updating the field 214, discussed above with respect to FIG. 2A, to indicate a value equivalent to the operation sequence number assigned in operation 1415. The message 200 may then be transmitted to all of the collaboration module instances. This is illustrated in FIG. 1A with respect to the additional messages 130*a* and 130*b*, which inform each of the collaboration module instances 105*a* and 105*b* respectively that an operation has been fully synchronized across all collaboration module instances.

For example, as discussed above with respect to FIG. 2A, a message transmitted from the synchronization service 106 to a collaboration module instance (e.g. 105*a* and/or 105*b*) defines an operation performed on the distributed data structure. In some aspects, operation 1410 also includes receiving an indication of a sequence number assigned to the operation (e.g. by the synchronization service 106). The indication may be included in a field of a message (e.g. 200) received by a collaboration field (e.g. field 206). Operation 1410 may also include receiving an indication of a version of the distributed data structure upon which the operation was performed (e.g. reference sequence number in field 204).

Figure 15:
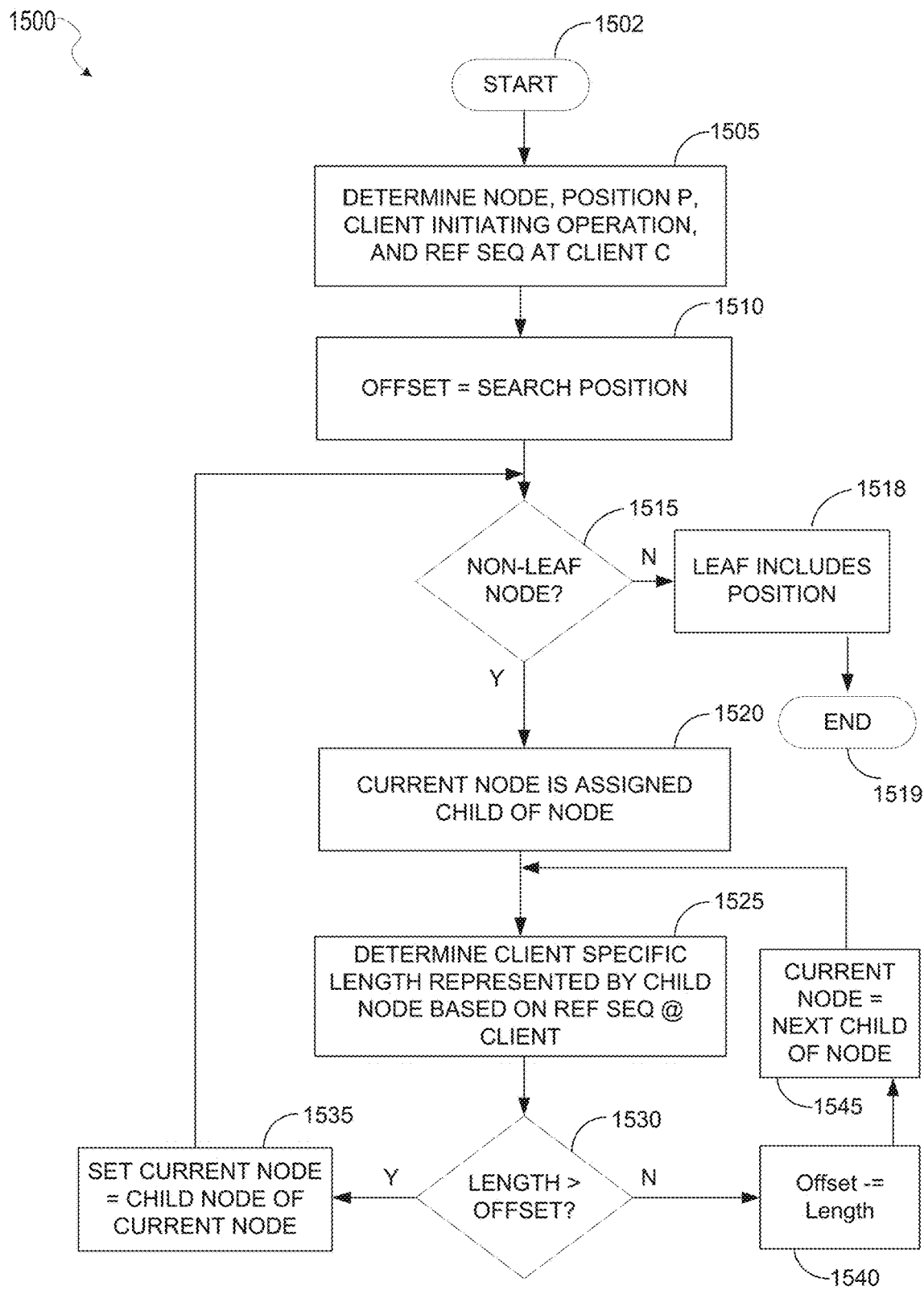
FIG. 15 is a flowchart of an example process for distributing operations on a distributed data structure to a plurality of collaboration module instances.

FIG. 15 is a flowchart of an example process for distributing operations on a distributed data structure to a plurality of collaboration module instances. In some aspects, the process 1500 discussed below with respect to FIG. 15 may be performed by a collaboration module instance, such as any of the collaboration module instances 105*a-b*. In some aspects, instructions (e.g. instructions 2324 below) stored in a memory (e.g. instructions 2304 below) may configure hardware processing circuitry (e.g. processor 2302 below) to perform one or more of the functions discussed below.

After start operation 1502, process 1500 moves to operation 1505. In operation 1505, a node, position, reference sequence number, and collaboration module instance initiating an operation are determined. For example, in some aspects, process 1500 may be performed to identify a portion of a tree upon which an operation is to be applied. For example, an insert, delete, or annotate operation may be generated by local operations or by a remote collaboration module instance. The operation may indicate a portion of a distributed data structure that the operation will affect. For example, an insert command may indicate a point of insertion within the distributed data structure. A delete operation may indicate a range of data of the distributed data structure for deletion. An annotation operation may indicate a position in the distributed data structure for the annotation to be added.

Operation 1510 sets an offset variable to the position indicated in the search. The offset variable may be changed as process 1500 continues.

Decision operation 1515 evaluates whether the node identified in operation 1505 is a block (non-leaf node of the tree) or an element (leaf node of the tree). If the node is a leaf, the position identified in operation 1505 is located or represented by the leaf node. Thus, an identification of the leaf node may be returned as a result of the search. Process 1500 then moves to end operation 1519. If the node is a non-leaf node, process 1500 moves from decision block 1515 to operation 1520.

In operation 1520, a child node of the node is obtained. In some aspects, operation 1520 is configured to traverse child nodes from a first position of the data structure (e.g. a node representing a starting portion of the data structure) to a second position of the data structure (a node representing an ending portion of the data structure. For example, operation 1520 may be configured to provide a node representing a beginning of a string when the distributed data structure represents a rich text string, and subsequent invocations of operation 1520 may provide nodes representing progressively later portions of the rich text string.

In operation 1525, a collaboration module instance specific length represented by the child node is determined. The collaboration module instance specific length is determined based on a collaboration module instance initiating the operation and a reference sequence number at the collaboration module instance. For example, as discussed above with the example tree structures of any of FIGS. 4-13, the disclosed embodiments may maintain partial length information that defines a collaboration module instance specific length of the distributed data structure represented by a particular portion of a tree structure. In some aspects, the partial length may be determined based on Equation 1, discussed above.

Operation 1525 may determine the collaboration module instance specific length based on the partial length, and also a minimum length value, where the minimum length value indicates a minimum size or length of the distributed data structure represented by a portion of the tree below the child node of operation 1520. The partial length value for the child node and the minimum length may be added to determine the collaboration module instance specific length.

Decision operation 1530 determines whether the length determined in operation 1525 is greater than or equal to the offset value. If the length is greater than the offset, then the position being search for (from operation 1505) is represented by the portion of the tree represented by the current node. In this case, process 1500 moves to operation 1535, which moves to a lower layer in the tree by setting the node to a child of the previous node. If the length is not greater than the offset value, then the current node does not represent a portion of the distributed data structure including the position. Thus, the offset value is adjusted by the determined length. Process 1500 then moves to operation 1545 and another child of the node is determined (a peer node of the current node).

Figure 16:
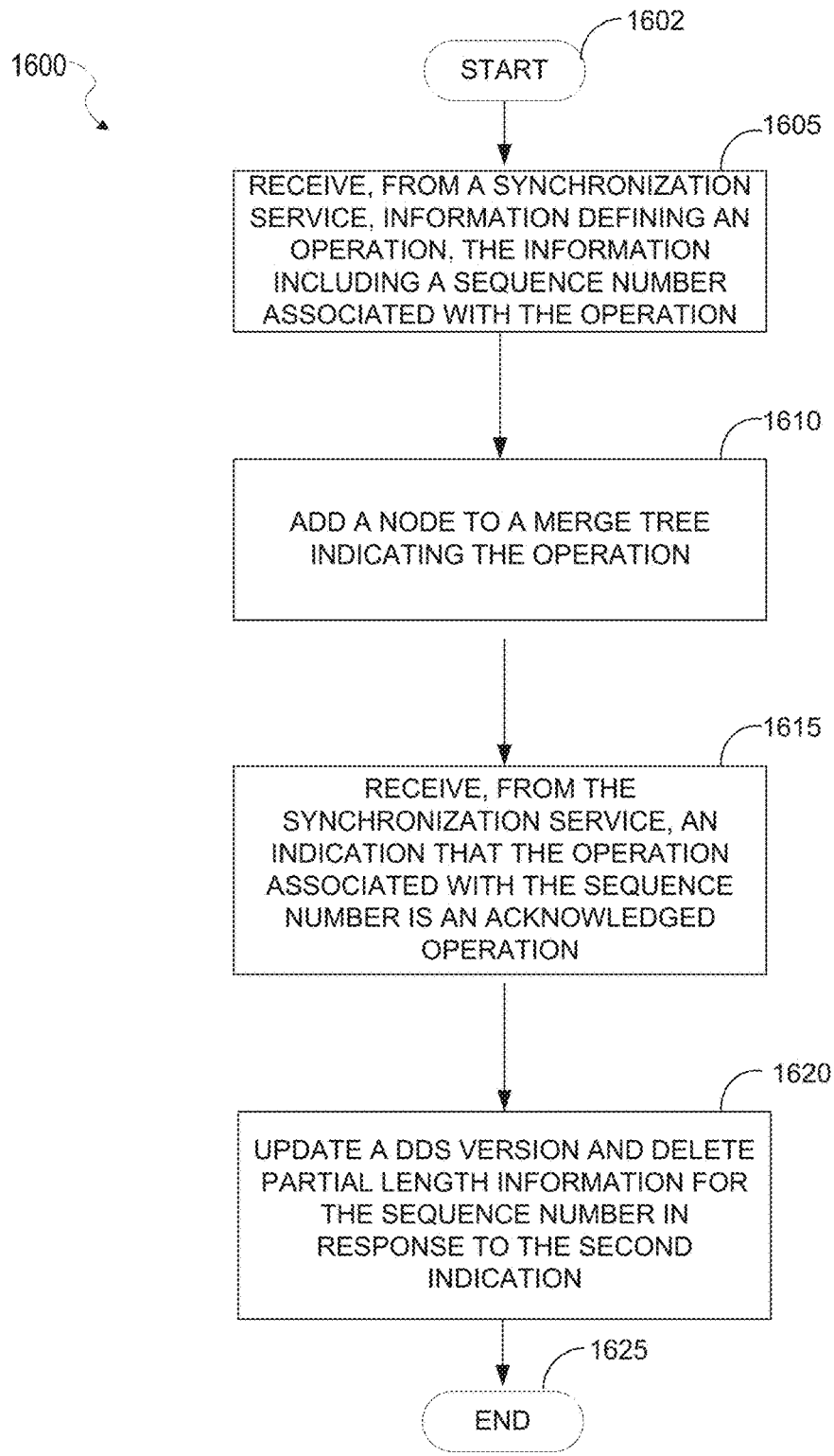
FIG. 16 is a flowchart of an example process for distributing operations on a distributed data structure to a plurality of collaboration module instances.

FIG. 16 is a flowchart of an example process for distributing operations on a distributed data structure to a plurality of collaboration module instances. In some aspects, the process 1600 discussed below with respect to FIG. 16 may be performed by a collaboration module instance, such as any of the collaboration module instances 102*a-b*. In some aspects, instructions (e.g. instructions 2324 below) stored in a memory (e.g. instructions 2304 below) may configure hardware processing circuitry (e.g. processor 2302 below) to perform one or more of the functions discussed below.

After start operation 1602, process 1600 moves to operation 1605. In operation 1605, information defining an operation is received. The information may be received from a common service for a collaboration session. The common service may be in communication with collaboration module instances participating in the collaboration session. In some aspects, the common service is the synchronization service 106 discussed above. The information defining the operation may include one or more of the items discussed above with respect to message 200 and FIG. 2A. For example, the information may include an operation sequence number assigned to the operation by the common service. The operation sequence number uniquely identifies the operation. The information may also include a reference sequence number for the operation. The reference sequence number identifies a version of the distributed data structure being modified by the operation. The information may also include an indication of the type of operation, for example, whether the operation is an insertion, deletion, or annotation of the distributed data structure, such as a text string or rich text string. The information may include a value associated with the operation (e.g. data to insert into the data structure, or data to annotate the data structure with). The information may also include an indication of a maximum sequence number for operations synchronized with every collaboration module instance participating in the collaboration session (e.g. value of field 214). The information may also include a position within the distributed data structure for the operation to be applied (e.g. field 210 of message 200).

In operation 1610, an element is added or modified for a merge tree to represent the operation. In some aspects, block 1610 may include updating a collaboration module instance specific partial length information for every block node between the added/modified element and a root of the tree. Thus, if a collaboration module instance 105a initiates a particular operation, partial length information specific to the collaboration module instance 105a may be updated for every block bode between the added node/element and the root.

For example, an operation inserting data to a rich text string based on a particular reference sequence number may cause each node between the element representing the inserted data and a root node of the tree representing the rich text string may be updated to associate the particular reference sequence number with an increase in the partial length equivalent to the length of the inserted data. A partial length for the collaboration module instance initiating the operation information is updated to In operation 1615, an indication that the operation associated with the sequence number is a synchronized operation is received. For example, as discussed with respect to FIG. 1, each of the collaboration module instances 105a-b may receive a respective message 130a-b, indicating an operation has been synchronized across all collaboration module instances participating in the collaboration. This may be accomplished, in some aspects, by setting the field 214 of the message 200 to a value equivalent to the operations' sequence number assigned by the common service (e.g. synchronization service 106).

In operation 1620, a reference sequence number is updated based on the received indication of operation 1615. In other words, collaboration module implementations may track a maximum synchronized sequence number for a distributed data structure. When a collaboration module instance initiates an operation, it may use the tracked reference sequence number as a basis for the operation. In other words, the tracked reference sequence number is used to identify a version of the distributed data structure upon which the collaboration module instance is operating. This information is provided when these operations are shared with other collaboration module instances via a common service, such as the synchronization service 106. For example, the version of the distributed data structure used as a basis for a particular operation may be communicated to the other collaboration module instances via the message 200, and specifically, in some embodiments, via the field 204, discussed above.

After operation 1620 completes, process 1600 moves to end operation 1625.

Figure 17:
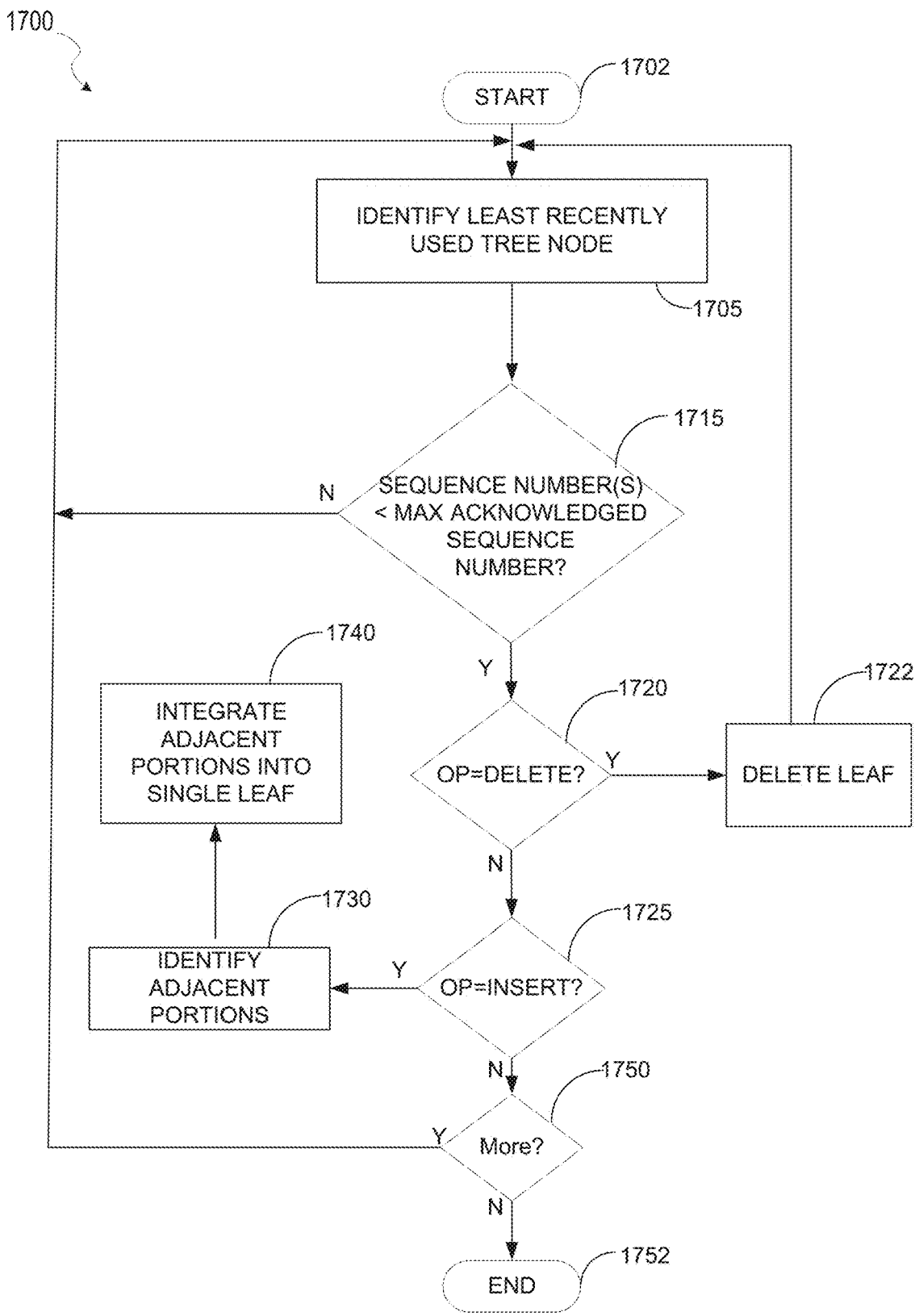
FIG. 17 is a flowchart for an example process of accessing a distributed data structure.

FIG. 17 is a flowchart for an example process of accessing a distributed data structure. In some aspects, process 1700 may be performed by a device running a collaboration module instance. For example, process 1700 may be performed by one or more of the devices 102a and/or 102b. In some aspects, a collaboration module instance performing one or more of the functions discussed below with respect to FIG. 17 may be run on a server side of an implementation, such as on a computer also running the synchronization service 106. In some aspects, the process 1700 discussed below with respect to FIG. 17 may be performed by a collaboration module instance, such as any of the collaboration module instances 105a-b. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 17 below, a device performing the method 1700 may be referred to as an "executing device."

After start operation 1702, process 1700 moves to operation 1705. In operation 1705, a least recently used node is identified. As discussed above, in embodiments that represent a distributed data structure via a tree, a least recently used list of nodes on the tree may be maintained. The least recently used list of nodes may be used to facilitate garbage collection and/or other optimizations of the tree structure.

In some aspects, a node may be identified by operation 1705 in some other manner besides an LRU list. For example, as discussed above, as a maximum sequence number of operations acknowledged by all collaboration module instances participating in the collaboration advances, some maintenance to a data structure representing the distributed data structure may be performed, for example, as described below.

Decision operation 1715 evaluates whether a sequence number assigned to an operation represented by the node is less than a maximum sequence number that has been acknowledged by all participants (e.g. collaboration module instances) of the collaboration. In other words, does the node represent an operation within the collaboration window or below the collaboration window. In some embodiments, this may be accomplished by comparing two sequence numbers identified by the node. For example, the node may indicate an insert or annotate sequence number (e.g. via field 324) and also a delete sequence number (via field 325). If multiple sequence numbers are indicated, all of the multiple sequence numbers must pass below the collaboration window before further action (e.g. garbage collection) may be performed on the node.

If the node represents an operation still within the collaboration window, process 1700 returns to operation 1705 and possibly selects another node from the LRU list.

If the operation represented by the node has passed out of the collaboration window, process 1700 moves from decision operation 1715 to operation 1720, which evaluates of the operation is a delete. To make this determination, operation 1720 may evaluate whether the node includes a delete sequence number (e.g. 325). If a delete sequence number is indicated, process 1700 moves to operation 1722 and deletes the leaf node. Processing then returns back to operation 1705. If the node does not represent a delete operation, process 1700 moves to decision block 1725, which determines if the operation is an insert operation. If the operation is an insert, process 1700 moves from decision operation 1725 to operation 1730, which identifies adjacent portions of the distributed data structure (e.g. represented by sibling nodes). Operation 1740 may integrate adjacent portions of the distributed data structure into a single leaf node. The integration may depend on whether those other portions have also passed below the collaboration window. Process 1700 then returns to obtain another node from the LRU list.

Figure 18:
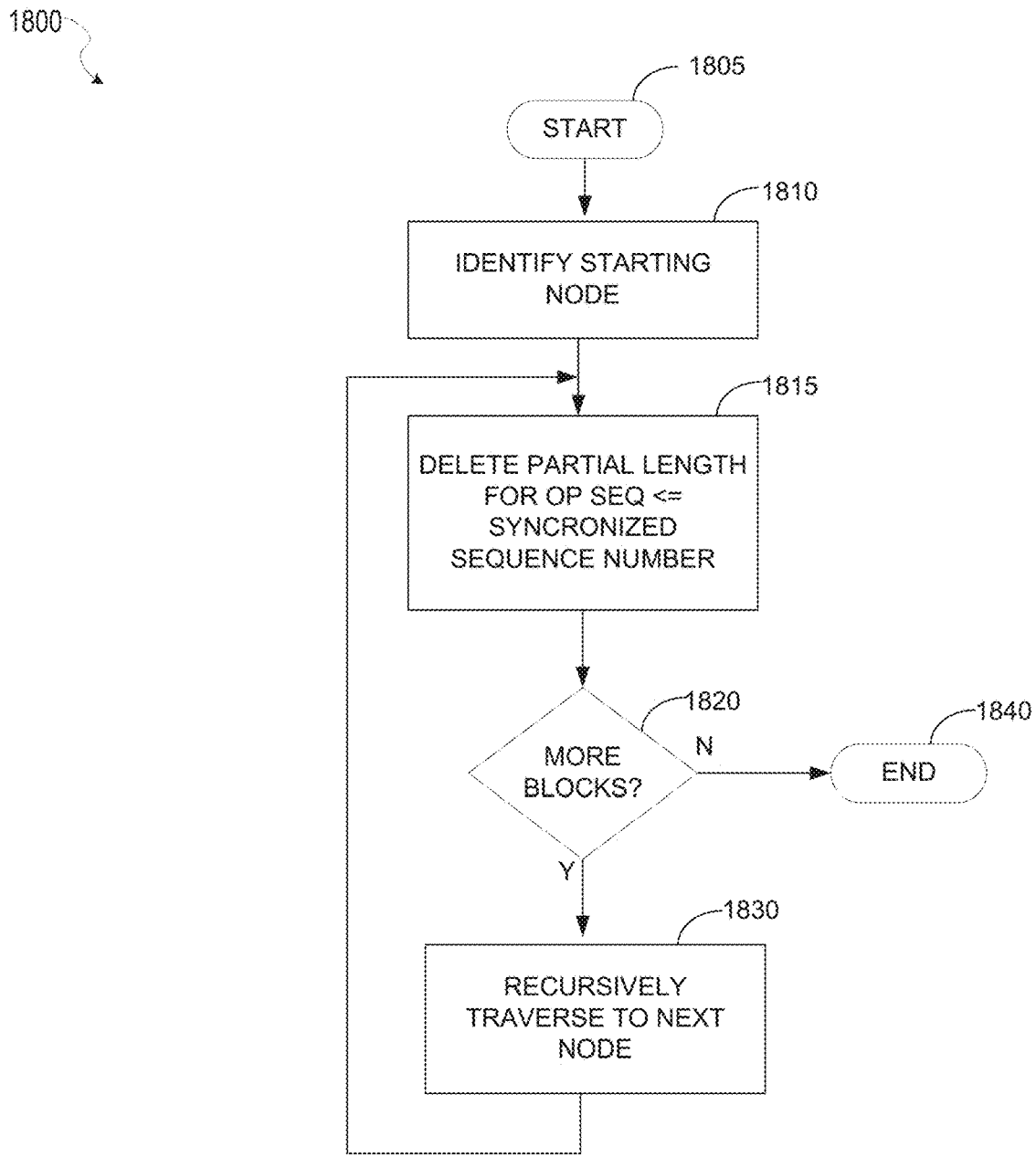
FIG. 18 is a flowchart for an example process of accessing a distributed data structure.

FIG. 18 is a flowchart for an example process of accessing a distributed data structure. In some aspects, process 1800 may be performed by a device running a collaboration module instance. For example, process 1800 may be performed by one or more of the devices 102a and/or 102b. In some aspects, a collaboration module instance performs one or more of the functions discussed below with respect to FIG. 18. The collaboration module instance (e.g. 105a-b) may be run on a server side of an implementation, such as on a computer also running the synchronization service 106. In some aspects, the process 1800 discussed below with respect to FIG. 18 may be performed by a collaboration module instance, such as any of the collaboration module instances 105a-b. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 18 below, a device performing the method 1800 may be referred to as an "executing device."

After start operation 1805, process 1800 transitions to operation 1810, which identifies a starting node. In some aspects, the starting node may be a root node of a tree representing a distributed data structure.

In operation 1815, partial length information for operation sequence numbers less than or equal to the maximum sequence number acknowledged by all collaboration module instances participating in the collaboration (e.g. value of field 214). The reasoning supporting operation 1815 is that once a particular sequence number is less than or equal to the maximum sequence number acknowledged by all collaboration module instances, the operation assigned to that particular sequence number has been seen and/or has been applied by all collaboration module instances participating in the collaboration, and thus there is no need to maintain partial length for that operation. Note that a minimum length value for the node may be adjusted based on the deleted partial length information.

Decision operation 1820 determines whether there are additional nodes to examine. If not, process 1800 completes at end operation 1840. Otherwise, process 1800 moves to operation 1830, which recursively traverses to a next node in the tree.

Figure 19:
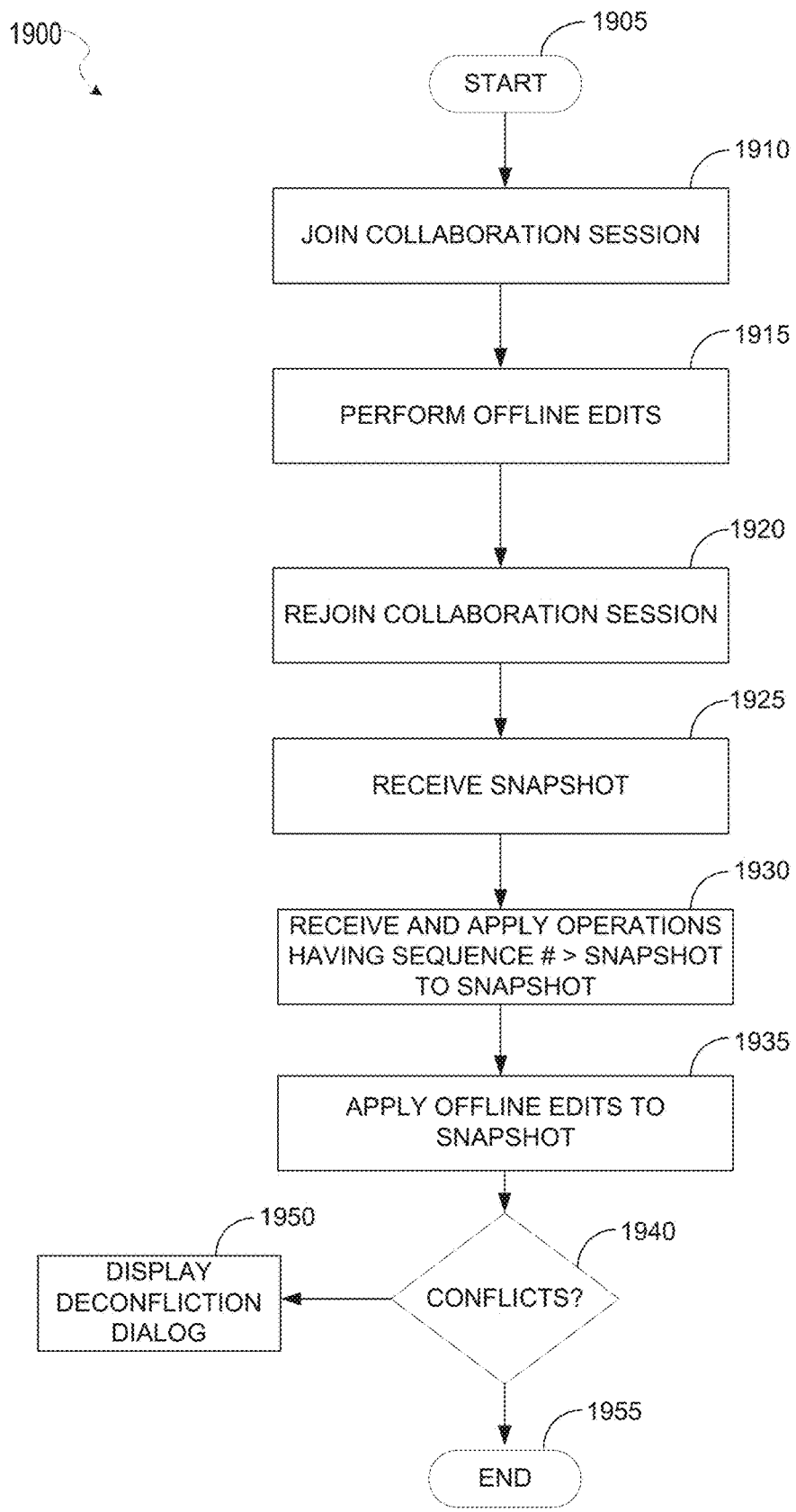
FIG. 19 is a flowchart for an example process of accessing a distributed data structure.

FIG. 19 is a flowchart for an example process of accessing a distributed data structure. In some aspects, process 1900 may be performed by a device running a collaboration module instance. For example, process 1900 may be performed by one or more of the devices 102a and/or 102b. In some aspects, the collaboration module instance may be run on a server side of an implementation, such as on a computer also running the synchronization service 106. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 19 below, a device performing the method 190 may be referred to as an "executing device."

After start operation 1900, process 1900 moves to operation 1910, which joins a collaboration session. The collaboration session provides access to a distributed data structure. Joining the collaboration session may include establishing a session with the synchronization service 106. In some aspects, joining the collaboration session may include interfaces, via a peer to peer protocol, with other devices and/or collaboration module instances participating in the collaboration session.

In operation 1915, offline edits are performed on the distributed data structure. Performing offline edits may include generating operations on the distributed data structure. In embodiments that utilize a tree structure such as that discussed herein, performing the offline edits may include generating non-leaf and/or leaf nodes as necessary to represent the offline operations locally. Since the edits may be generated while the executing device is unable to contact the synchronization service 106 (or other peer devices when using a peer to peer protocol), the collaboration window maintained at the executing device may grow to be relatively large, including all of the operations providing for the offline edits.

In operation 1920, the executing device rejoins the collaboration session. For example, while the executing device may have not had network connectivity to the synchronization service 106 during operation 1915, network connectivity between the synchronization service 106 and the executing device is restored in 1920.

In operation 1925, a snapshot of the distributed data structure is received. As discussed above, a snapshot indicates an absolute value or state of the distributed data structure at a point in time. Thus, as one example, if one or more operations were applied the distributed data structure before the snapshot, the snapshot represents the combined results of those one or more operations.

In operation 1930, any additional operations occurring after the snapshot (initiated by other collaboration module instances) are communicated to the executing device (and the executing collaboration module instance). This allows the executing device to represent a version of the distributed data structure based on the snapshot and the additional operations. Note that only operations having a sequence number greater than the version of the snapshot are included in the version.

In operation 1935, the offline edits are applied to the snapshot. In some aspects, operation 1935 includes transmitting a message 200 for each of the offline edits, each message defining a particular offline edit as an operation on the distributed data structure. Each message would be constructed by process 1900 consistent with the description of message 200 discussed above. Operation 1935 may also include receiving a corresponding number of responses/messages from the synchronization service, with the synchronization service 106 assigning a sequence number to each of the offline edits/operations. The executing device could then represent an addition version of the distributed data structure that included both the operations of 1930 and the operations of 1935. This process will generate a version of the distributed data structure maintained by the executing device that is consistent with distributed data structure versions maintained by other collaboration module instances participating in the collaboration.

Decision operation 1940 determines if there are any conflicts between the offline edits and the operations applied to the snapshot. If there are conflicts, process 1900 moves to operation 1950, which displays a deconfliction dialog. The deconfliction dialog is configured to provide for manual selection of one of two operations that conflict. The selected operation will be applied to the distributed data structure, while a second of two operations will be canceled.

Figure 20:
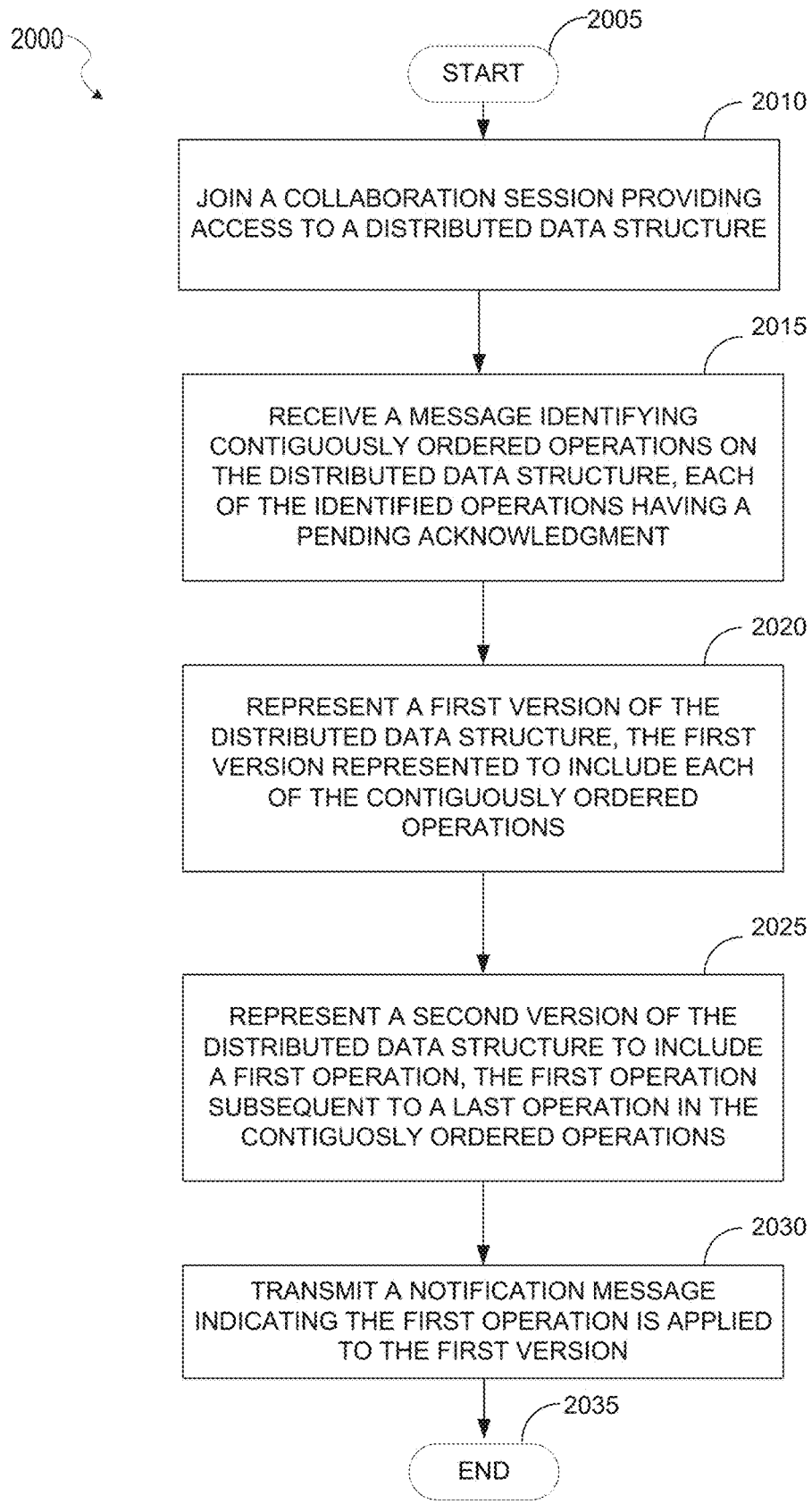
FIG. 20 is a flowchart for an example process of accessing a distributed data structure.

FIG. 20 is a flowchart for an example process of accessing a distributed data structure. In some aspects, process 2000 may be performed by a device running a collaboration module instance. For example, process 2000 may be performed by one or more of the devices 102*a* and/or 102*b*. In some aspects, a collaboration module instance performing one or more of the functions discussed below with respect to FIG. 20 may be run on a server side of an implementation, such as on a computer also running the synchronization service 106. In some aspects, the process 2000 discussed below with respect to FIG. 20 may be performed by a collaboration module instance, such as any of the collaboration module instances 102*a-b*. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 20 below, a device performing the method 2000 may be referred to as an "executing device." Note that in various embodiments, one or more of the functions discussed above with respect to at least FIGS. 15-19 and/or 21 and/or 22 may be included in process 2000.

After start operation 2005, process 2000 moves to operation 2010. Operation 2010 joins a collaboration session. The collaboration session provides access to a distributed data structure. Joining a collaboration session may include opening a network connection to a service, such as the synchronization service 106. Joining the collaboration session may also include identifying to the service a distributed data structure that the collaboration session will provide access to. In some aspects, the distributed data structure may be in the form of a file. In some aspects, the file may be stored on a stable storage device that is accessible via a network. The distributed data structure may be identified via, in some aspects, a uniform resource locator (URL).

In operation 2015, a message is received identifying contiguously ordered operations on the distributed data structure. In some aspects, the message is received from the synchronization service 106. In some other aspects that utilize a peer to peer protocol to communicate between collaboration module instances participating in the collaboration session, the message may be received from one of the other collaboration module instances participating in the collaboration session. Each of the identified operations have a pending acknowledgment. The contiguously ordered operations define a collaboration window of the distributed data structure. In other words, the collaboration window represents operations on the distributed data structure that have been initiated by some collaboration module instance participating in the collaboration, but have not yet been acknowledged by all of the collaboration module instances participating in the collaboration. Thus, the collaboration window represents operations that are still "in progress" when the collaboration is considered as a whole (is considered with respect to all collaboration module instances participating in the collaboration).

As discussed above with respect to FIG. 2A and message 200, may indicate an operation sequence number (e.g. via field 206) and a maximum sequence number for synchronized or acknowledged operations (e.g. via field 214). These two values provide the indication of contiguously ordered operations on the distributed data structure. For example, if a maximum sequence number for acknowledged operations is N, and the operation sequence number is N+C (where C is a constant), then there are C contiguously ordered operations identified by the message that have pending acknowledgments. This is the case because as operations are acknowledged by all devices, the maximum sequence number for acknowledged operations (e.g. 214) advances "toward" the operation sequence number (e.g. 206). New operations will advance the operation sequence number as they are distributed to collaboration module instances participating in the collaboration.

In operation 2020, a first version of the distributed data structure is represented to include each of the contiguously ordered operations. By representing the distributed data structure to include each of the contiguously ordered operations, subsequent operations on the first version are based on results of each of the contiguously ordered operations. Some aspects may achieve this by storing or queuing information defining the contiguously ordered operations. For example, some embodiments may use queue or tree type data structures to store pending (unacknowledged) operations. Once the contiguously ordered operations are appropriated stored or queued, the distributed data structure is considered to be "representing" those operations in these embodiments.

In some aspects, once an operation is acknowledged by all collaboration module instances participating in the collaboration, the operation may be applied to the distributed data structure. In other words, data included in the distributed data structure may be irrevocably modified by the operation. Details on how operations on a distributed data structure are represented vary by embodiment. In some embodiments, a garbage collection process or other process asynchronous to collaboration on the distributed data structure may apply the operations to data included in the distributed data structure. For example, a garbage collection process, as described above may operate on operations acknowledged by all collaboration module instances participating in the collaboration. In some aspects, based on the message received in operation 2015, the distributed data structure may be modified based on the operation.

In operation 2025, a second version of the distributed data structure is represented to include a first operation, the first operation is subsequent to a last operation of the contiguously ordered operations. The first operation is initiated by the executing device. As discussed above, some implementations may store information defining a pending operation. Thus, in these embodiments, information defining the first operation, such as a type of the operation (e.g. field 208), a position of or range within the distributed data structure to which the operation is applied (e.g. field 210), a version of the distributed data structure to which the operation is applied (e.g. field 204), and a collaboration module instance initiating the operation (e.g. field 202) may be stored, queued, or otherwise recorded. By representing the second version of the distributed data structure, subsequent operations performed on the distributed data structure take results of the first operation into account. By representing the first operation on the distributed data structure, operations subsequent to the first operation depend on results of the first operation (to the extent the subsequent operation depends on the results of the first operation).

In operation 2030, a notification message is transmitted. The notification message indicates that the first operation is applied to the first version of the distributed data structure. In some aspects, the notification message includes one or more of the fields described above with respect to FIG. 2A. One or more values of the fields are specific to the first operation. The notification may be transmitted to the synchronization service 106 in embodiments utilizing a centralized service for serialization of operations. In other embodiments utilizing a peer to peer protocol for serialization, the notification may be transmitted to another collaboration module instance participating in the collaboration.

Some aspects of process 2000 include receiving a plurality of notifications. Each of the notifications is for a corresponding operation. As the notification above, each notification indicates a unique sequence number assigned to the corresponding operation. Each notification also identifies a collaboration module instance that initiated the operation. In some aspects, there may be a one to one mapping between collaboration module instances and client devices, and thus, an identification of a collaboration module instance may be synonymous with an identification of a particular physically distinct computing device that is running the particular instance of the collaboration module. The unique sequence numbers assigned to each of the operations indicate an order in which the operations are applied to the distributed data structure. One or more of the plurality of notifications received by process 2000 may be for operations initiated by the executing device. For example, as discussed above, when a collaboration module instance initiates a new operation, it may communicate to other collaboration module instances participating in the collaboration, values corresponding to one or more of the fields described above with respect to the message 200. Since a sequence number has not yet been assigned to the operation, it may send a predetermined value indicating same. Once a sequence number is assigned, a notification will be provided back to the collaboration module instance that originally initiated the new operation. This notification will indicate the receiving collaboration module instance's identifier (e.g. in field 202).

Process 2000 may include, in some embodiments, initiating a second operation of the distributed data structure, and later receiving a notification of an additional operation. The notification may further indicate (e.g. via a sequence number assigned to the additional operation), that the additional operation is to be applied to the distributed data structure before the second operation. Alternatively, if the executing device receiving a notification assigning a sequence number to the second operation and then later receives a second notification assigning a second sequence number to the additional operation, then the second operation is to be applied to the distributed data structure before the additional operation.

Some aspects of process 2000 include resolving edit conflicts between two operations on the distributed data structure. The edit conflict is resolved based on a relative order of two sequence numbers, each of the two sequence numbers assigned to one of the conflicting two operations. For example, an edit conflict between two edit operations may cause a later sequenced insert to appear before an earlier sequenced insert in the distributed data structure. An edit conflict between two delete operations is resolved by performing the delete operations in an order consistent with an order of their assigned sequence numbers.

Some aspects of process 2000 include receiving an indication of an updated collaboration window, the updated collaboration window excluding some of the contiguous operations; and performing garbage collection on the excluded operations based on the received indication.

After operation 2030, process 2000 moves to end operation 2035.

Figure 21:
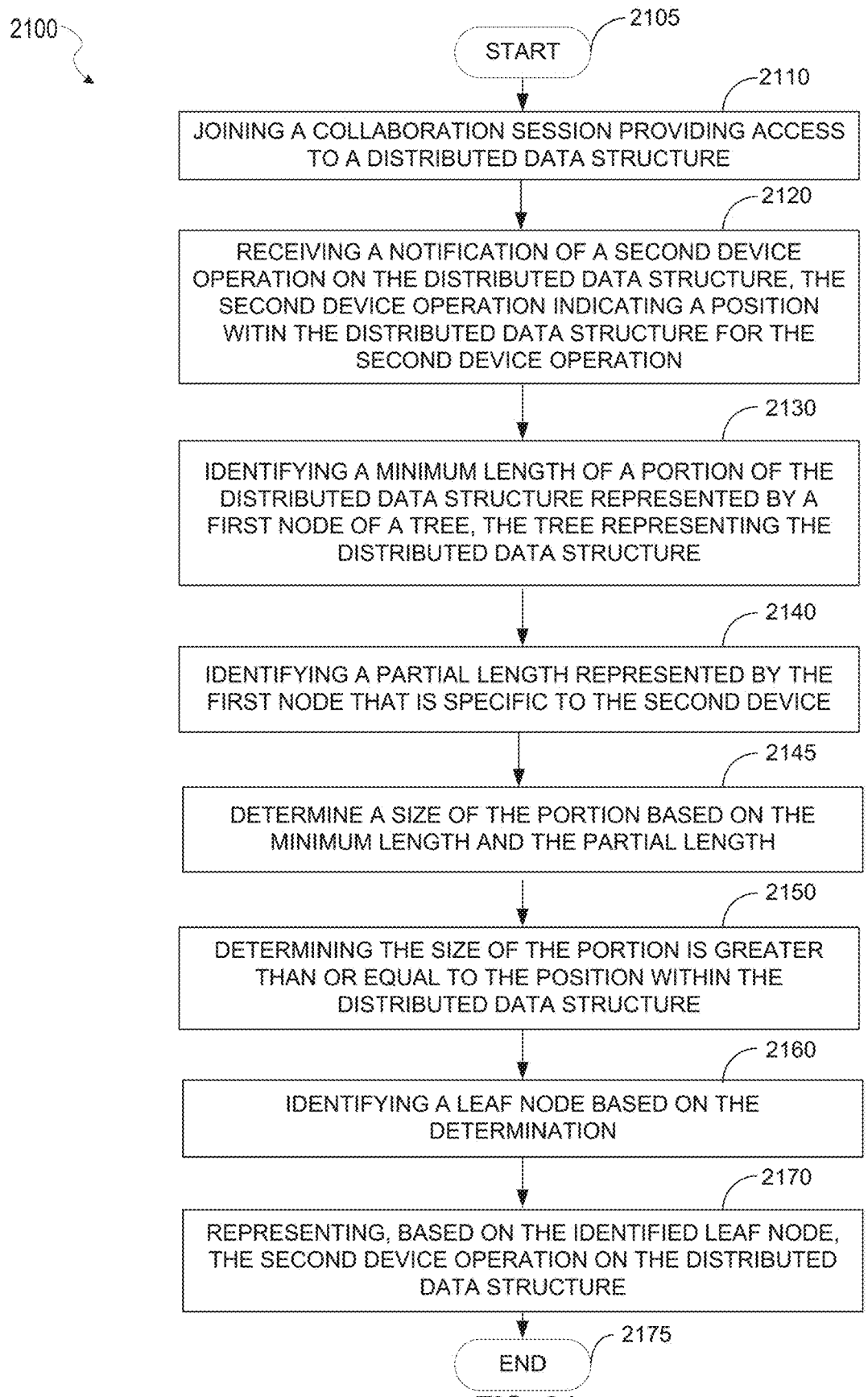
FIG. 21 is a flowchart of an example process of accessing a distributed data structure.

FIG. 21 is a flowchart of an example process of accessing a distributed data structure. In some aspects, process 2100 may be performed by a device running a collaboration module instance. For example, process 2100 may be performed by one or more of the devices 102a and/or 102b. In some aspects, a collaboration module instance may also be run on a server side of an implementation, such as on a computer also running the synchronization service 106. In some aspects, the process 2100 discussed below with respect to FIG. 21 may be performed by a collaboration module instance, such as any of the collaboration module instances 105a-b. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 21 below, a device performing the method 2100 may be referred to as an "executing device." Note that in various embodiments, one or more of the functions discussed above with respect to at least FIGS. 15-20 and/or 22 may be included in process 2100.

After start operation 2105, process 2100 moves to operation 2110. Operation 2110 joins a collaboration session. The collaboration session provides access to a distributed data structure. Joining a collaboration session may include opening a network connection to a service, such as the synchronization service 106. Joining the collaboration session may also include identifying to the service a distributed data structure that the collaboration session will provide access to. In some aspects, the distributed data structure may be in the form of a file. In some aspects, the file may be stored on a stable storage device that is accessible via a network. The distributed data structure may be identified via, in some aspects, a uniform resource locator (URL).

In operation 2120, a notification is received. The notification may be in the form of a network message in at least some embodiments. The notification may be received from the synchronization service 106. In some other embodiments that utilize a peer to peer protocol to communicate between collaboration module instances of the collaboration session, the notification may be received from one of the other collaboration module instances participating in the collaboration session.

The notification indicates an operation performed by a remote device. In other words, the operation is performed by a device other than the executing device. The operation may be, for example, an insertion, deletion, or annotation operation on a sequence data structure, such as a text string, rich test string, or stream. The operation may be indicated via a sequence number assigned to the operation.

The notification also indicates a position of the operation with respect to the distributed data structure. For example, the position may include an offset, in bytes or words in various aspects, from a starting data point or byte of the distributed data structure to a position in the distributed data structure where the insert, delete, or annotation operation is to be applied. In the case of an insert operation, the position indicates where in the distributed data structure new data will be inserted, with data of the pre-operation version of the distributed data structure subsequent to the position being positioned after the newly inserted data. In the case of an annotation operation, the position indicates which portion of the distributed data structure is to be annotated. In the case of a remove operation, the position indicates data of the distributed data structure to be removed. For example, the position may indicate a range of data positions to be removed from the distributed data structure by the remove operation.

The notification may also indicate a version of the distributed data structure to which the operation was applied. For example, as discussed above, a highest sequence number of operations applied to a particular distributed data structure may define a version of that particular distributed data structure. This version or sequence number information may be communicated to collaboration module instances participating in the collaboration, such as a collaboration module instance running on the executing device, via a message including one or more of the fields of the message 200, discussed above with respect to FIG. 2A.

In operation 2130, a minimum length of a portion of the distributed data structure represented by a first node of a tree is identified. The tree represents the distributed data structure. The first node referred to in operation 2130 may be any node of a tree, including a root node or a node below the root node. The first node may be a leaf node of the tree in some aspects.

As discussed above, in embodiments representing the distributed data structure as a tree, some portions of the distributed data structure may be synchronized across all collaboration module instances participating in the collaboration. Thus, these portions are constant for all of these collaboration module instances, and a length of these portions may be determined. This length is the minimum length referred to in operation 2130, and is consistent with the discussion of minimum length discussed throughout this disclosure.

In some embodiments, the notification may also indicate a minimum sequence number of operations acknowledged or synchronized with all other clients participating in the collaboration. For example, as discussed above with respect to FIG. 2, the notification may include the field 214.

In operation 2140, a partial length specific to the second device, and represented by the first node is determined. As discussed above, as devices participating in the collaboration apply operations to the distributed data structure, the distributed data structure evolves through sequential versions that incorporate each of those operations. Thus, two collaboration module instances participating in the collaboration may have versions of the distributed data structure that differ slightly until certain edits have been communicated to the two collaboration module instances. The minimum length determined in operation 2140 accounts for these differences in distributed data structure versions across collaboration module instances. Operation 2140 determines a partial length represented by the first node of a version of the distributed data structure to which the second device operation was applied. As discussed above, the partial length may be specific not only the collaboration module instance performing the operation, but the version of the distributed data structure to which the particular operation was applied. In some aspects, Equation 1 may be used to determine the partial length. In some embodiments, the partial length may have been previously determined and the first node updated to reflect the partial length before operation 2140 is performed.

In operation 2145, a size of the portion of the distributed data structure represented by the first node is determined. The size is based on the minimum length and the partial length. In some aspects, the size is a sum of the minimum length and partial length.

In operation 2150, a determination is made that the size of the portion is greater than or equal to the position of the operation within the distributed data structure. As discussed above, in embodiments that represent the distributed data structure as a tree, particular nodes of the tree represent particular portions of the distributed data structure. Process 2100 describes how an embodiment may identify which particular nodes represent a portion of the tree to which an operation is being applied by searching through the nodes of the tree, based on lengths of the distributed data structure represented by each node.

While operation 2150 indicates that the position of the second device operation is at or below the first node, in other examples, the size may be less than the position, indicating that other children nodes of the first node need to be searched to identify a node representing a portion of the distributed data structure including the position. This process may continue across sibling nodes of the first node until an appropriate branch of the tree is identified. The process may then proceed lower in the tree to progressively narrow the portion of the distributed data structure until a leaf node representing the portion is identified.

In operation 2160, a leaf node is determined based on the determination of operation 2150. Since operation 2150 determined that the portion of the distributed data structure including the position is represented by the first node, operation 2160 may proceed deeper into the tree (to children of the first node) to progressively narrow the search until a leaf node representing the position is identified.

In operation 2170, the second device operation is represented in the tree based on the identified leaf node. Representing the operation may include a variety of items. If the operation is an insert or removal operation, the identified leaf node may be split as necessary to provide for a single leaf node to include the portion of the distributed data structure affected by the operation. For example, if an insertion operation is performed, the leaf node may be split at the position into three nodes, a first node representing a portion of the distributed data structure before the inserted data, a second leaf node to represent the inserted data, and a third leaf node to represent any remaining data from the identified leaf node. For a remove operation, the leaf node may be updated to indicate a sequence number for the operation. The identified leaf node may also be split for remove operations such that the removed data is represented by a single leaf node, or at least that data not deleted is not represented in the same leaf node as data that is deleted. For annotation operation, the leaf node may be updated to include the annotation information. Appropriate splitting of the leaf node may also be performed as necessary to represent the operation in the tree.

After operation 2170 completes, process 2100 moves to end operation 2175.

Figure 22:
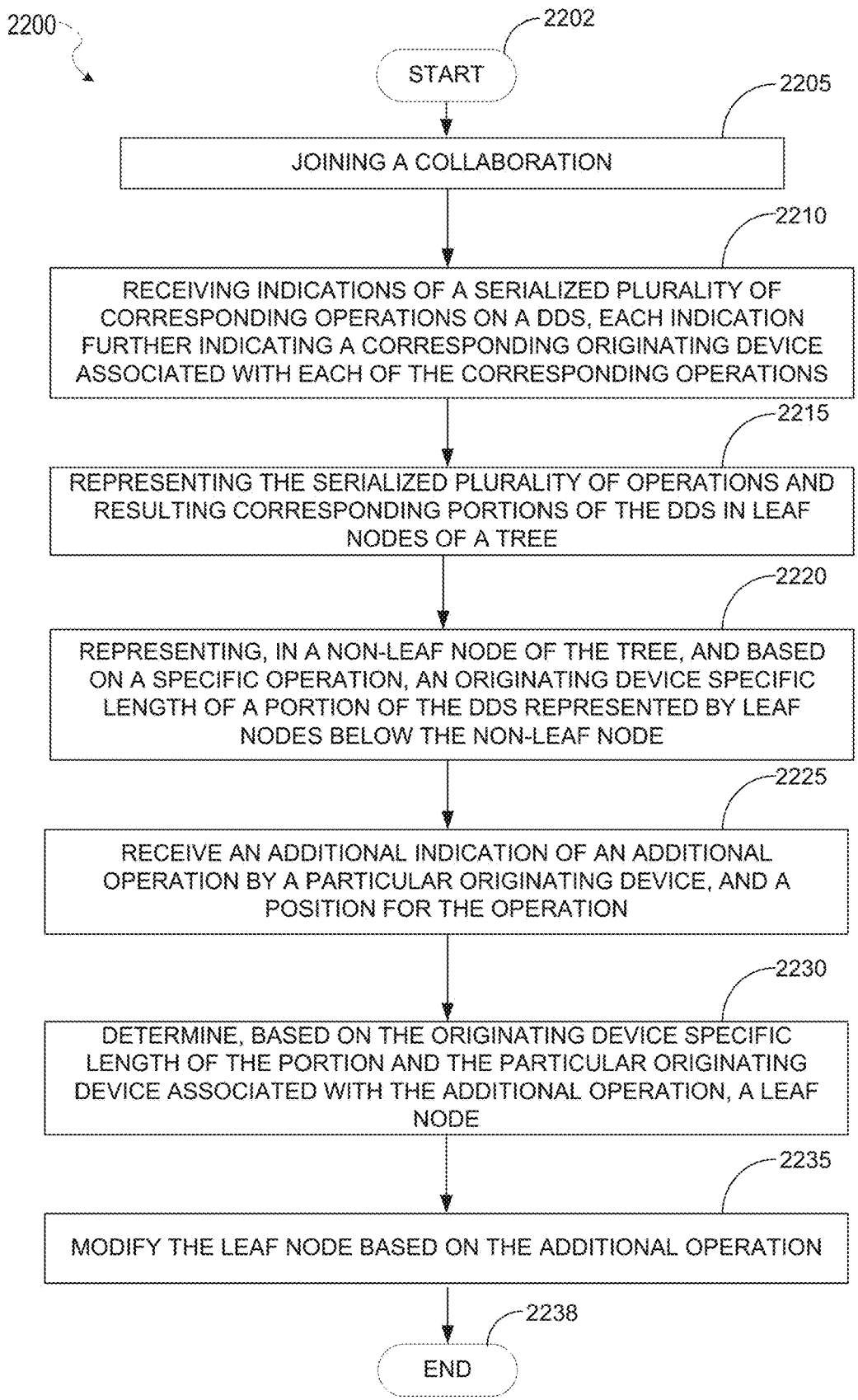
FIG. 22 is a flowchart of an example process of accessing a distributed data structure.

FIG. 22 is a flowchart of an example process of accessing a distributed data structure. In some aspects, process 2200 may be performed by a device running a collaboration module instance. For example, process 2200 may be performed by one or more of the devices 102a and/or 102b. In some aspects, a collaboration module instance may also be run on a server side of an implementation, such as on a computer also running the synchronization service 106. In some aspects, the process 2200 discussed below with respect to FIG. 22 may be performed by a collaboration module instance, such as any of the collaboration module instances 105a-b. In some aspects, instructions (e.g. instructions 2324 below) stored in a memory (e.g. instructions 2304 below) may configure hardware processing circuitry (e.g. processor 2302 below) to perform one or more of the functions discussed below. In the discussion of FIG. 22 below, a device performing the method 2200 may be referred to as an "executing device."

Figure 24:
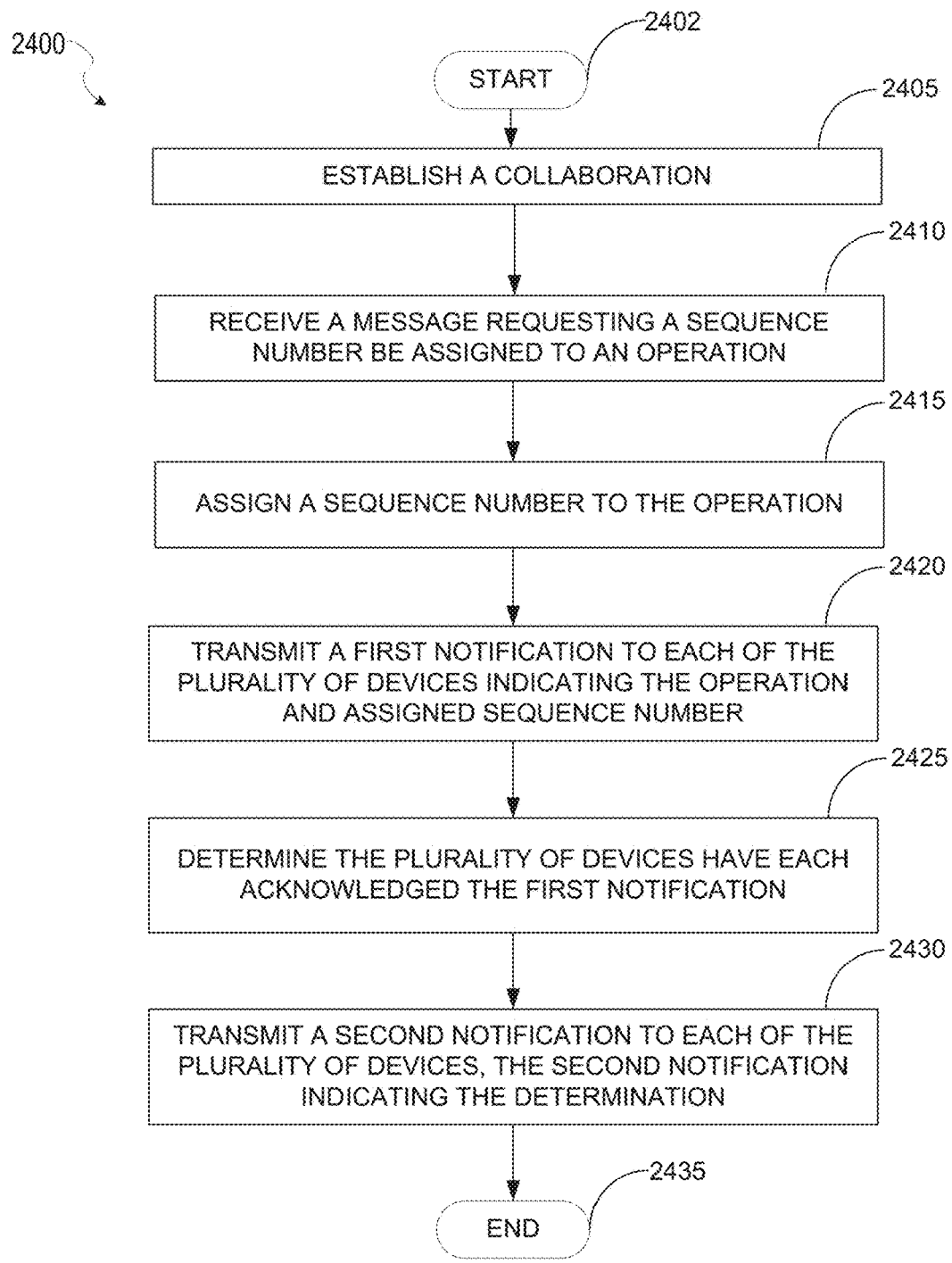
FIG. 24 is a flowchart of an example process that may be implemented by a serialization service.

Note that in various embodiments, one or more of the functions discussed above with respect to at least FIGS. 15-19 and/or FIG. 20 and/or FIG. 21 and/or FIG. 24 may be included in process 2200.

In operation 2205, the executing device joins a collaboration. The collaboration provides access to a distributed data structure. Joining a collaboration session may include opening a network connection to a service, such as the synchronization service 106. Joining the collaboration session may also include identifying to the service a distributed data structure that the collaboration session will provide access to. In some aspects, the distributed data structure may be in the form of a file. In some aspects, the file may be stored on a stable storage device that is accessible via a network. The distributed data structure may be identified via, in some aspects, a uniform resource locator (URL).

In operation 2210, indications of a serialized plurality of corresponding operations on a distributed data structure are received. In some aspects, each of the indications may be a message from a serialization service including one or more of the fields discussed above with respect to message 200 and FIG. 2A. The indications further indicate a device originating each of the operations (e.g. field 202 of message 200). Instead, of indicating a device, the indications may instead indicate a collaboration module instance, as discussed above.

In operation 2215, the plurality of operations on (e.g. via 320) and results of the operations on the distributed data structure (e.g. via at least 322) are represented in leaf nodes of the tree. As discussed above, for example, with respect to FIGS. 4-13, operations may be represented in leaf nodes of a tree, and selectively applied to data of the distributed data structure based on an originating device for the operation (e.g. collaboration module instance), a version of the DDS to which the operation was applied by the originating device, and a sequence number assigned to the operation.

In operation 2220, originating device (or originating collaboration module instance) specific length is represented for a portion of the distributed data structure represented by leaf nodes below a non-leaf node. In various embodiments. Operation 2230 may be performed for each non-leaf node in the tree, or at least for non-leaf nodes between a leaf node and a root node of the tree. As discussed above, partial length information is included in non-leaf nodes of the tree. A minimum length value may also be represented in the non leaf node, the minimum length value representing a minimum length of the DDS as represented by leaf nodes below the non-leaf node.

In operation 2225, an additional indication of an additional operation by a particular originating device is received. Also received is an indication of a position within the distributed data structure to apply the operation (for example, a position to insert, or a position range to remove, or a position to annotate). In some aspects, operation 2225 includes receiving a message including one or more of the fields discussed above with respect to FIG. 2A, with the message providing the indications.

In operation 2230, a leaf node of the tree is identified that represents a portion of the distributed data structure to which the additional operation is applied. For example, if the operation is an insert operation at offset X into a string, operation 2230 identifies a leaf node representing offset X in the string. To identify the leaf node, operation 2230 relies on one or more of the partial length values discussed above that are specific to the device (or collaboration module instance) initiating the operation. The leaf node is further identified based on a version of the distributed data structure to which the particular originating device applied the additional operation.

In operation 2235, the leaf node is modified based on the additional operation. As discussed above, some example modifications include splitting the lead node into multiple nodes to facilitate an insertion of data. For a delete operation, the leaf node may be modified by recording a sequence number assigned to the delete operation. The leaf node may also be split to provide for a leaf node dedicated to the deleted data in some embodiments. If the operation is an annotation operation, the annotation data may be copied to the leaf node, or otherwise associated with the leaf node. (Indicating text in a string is bold is an example of an annotation).

As discussed above, process 2200 may include receiving messages from a serialization service (or peer to peer protocol) indicating one or more of the fields of message 200, discussed above with respect to FIG. 2A. As discussed above with respect to FIG. 2B, these messages define a collaboration window of operations that have not yet been acknowledged by all participants (collaboration module instances or devices) of the collaboration. Process 220 may also include applying a maintenance process to leaf nodes of the tree that represent operations below the collaboration window. As discussed above, these maintenance operations can include combining leaf nodes when those leaf nodes represent contiguous data of the DDS, removing nodes entirely (for example, if data is deleted by an operation below the collaboration window, a leaf node representing the data may be removed from the tree).

Figure 23:
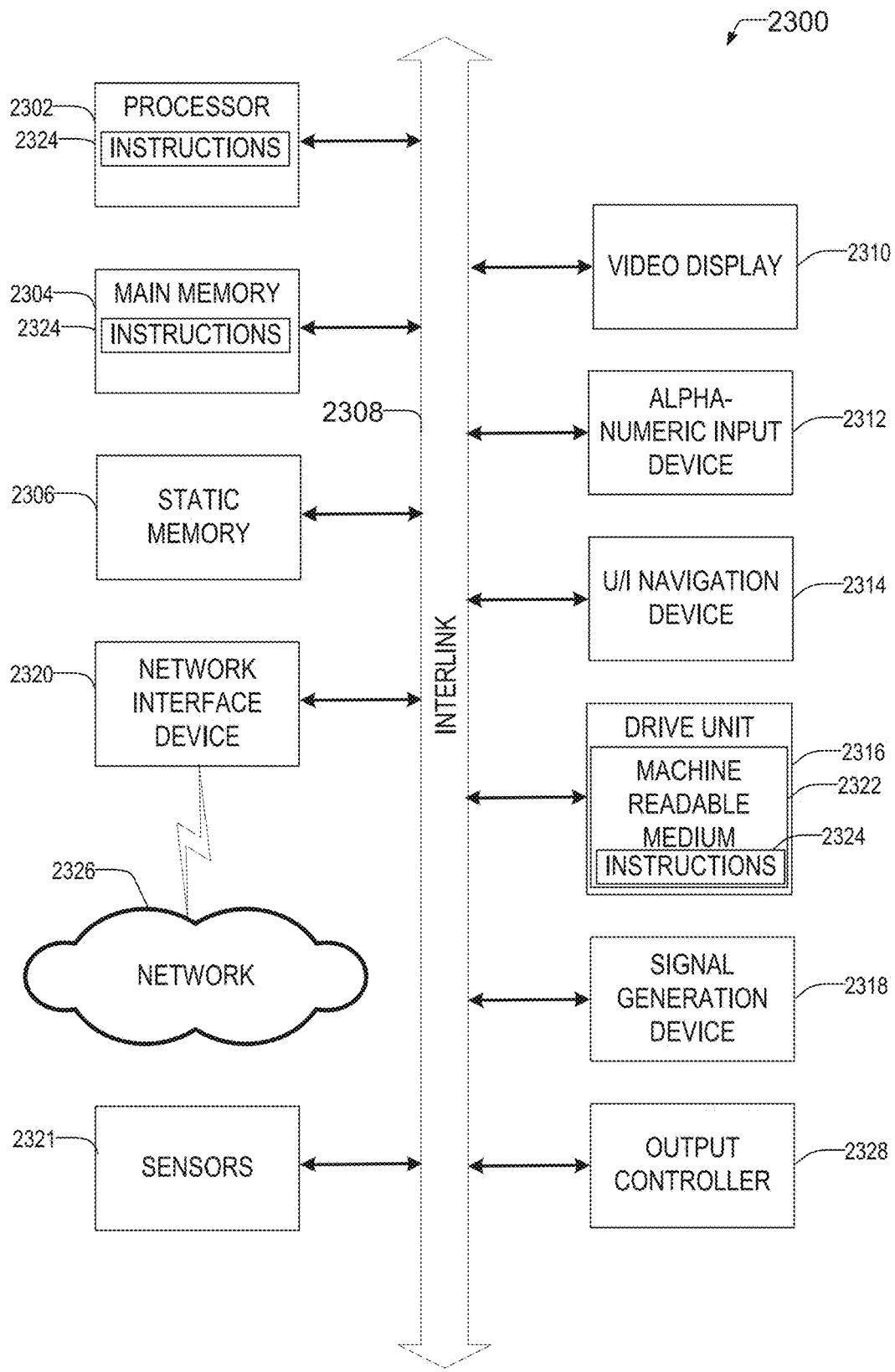
FIG. 23 illustrates a block diagram of an example machine upon which any one or more of the techniques (e.g., methodologies) discussed herein may be performed in one or more of the disclosed embodiments.

FIG. 23 illustrates a block diagram of an example machine 2300 upon which any one or more of the techniques (e.g., methodologies) discussed herein may perform. In alternative embodiments, the machine 2300 may operate as a standalone device or may be connected (e.g., networked) to other machines. In a networked deployment, the machine 2300 may operate in the capacity of a server machine, a client machine, or both in server-client network environments. In an example, the machine 2300 may act as a peer machine in peer-to-peer (P2P) (or other distributed) network environment. The machine 2300 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 2300 may perform one or more of the processes described above with respect to FIGS. 1-22 above or 24 below. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2300 may include a hardware processor 2302 (e.g., a central processing unit (CPU), a graphics processing unit (GPU), a hardware processor core, or any combination thereof), a main memory 2304 and a static memory 2306, some or all of which may communicate with each other via an interlink (e.g., bus) 2308. The machine 2300 may further include a display unit 2310, an alphanumeric input device 2312 (e.g., a keyboard), and a user interface (UI) navigation device 2314 (e.g., a mouse). In an example, the display unit 2310, input device 2312 and UI navigation device 2314 may be a touch screen display. The machine 2300 may additionally include a storage device (e.g., drive unit) 2316, a signal generation device 2318 (e.g., a speaker), a network interface device 2320, and one or more sensors 2321, such as a global positioning system (GPS) sensor, compass, accelerometer, or other sensor. The machine 2300 may include an output controller 2328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2316 may include a machine readable medium 2322 on which is stored one or more sets of data structures or instructions 2324 (e.g., software) embodying or utilized by any one or more of the techniques or functions described herein. The instructions 2324 may also reside, completely or at least partially, within the main memory 2304, within static memory 2306, or within the hardware processor 2302 during execution thereof by the machine 2300. In an example, one or any combination of the hardware processor 2302, the main memory 2304, the static memory 2306, or the storage device 2316 may constitute machine readable media.

While the machine readable medium 2322 is illustrated as a single medium, the term "machine readable medium" may include a single medium or multiple media (e.g., a centralized or distributed database, and/or associated caches and servers) configured to store the one or more instructions 2324.

The term "machine readable medium" may include any medium that is capable of storing, encoding, or carrying instructions for execution by the machine 2300 and that cause the machine 2300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 2324 may further be transmitted or received over a communications network 2326 using a transmission medium via the network interface device 2320. The machine 2300 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 2320 may include one or more physical jacks (e.g., Ethernet, coaxial, or phone jacks) or one or more antennas to connect to the communications network 2326. In an example, the network interface device 2320 may include a plurality of antennas to wirelessly communicate using at least one of single-input multiple-output (SIMO), multiple-input multiple-output (MIMO), or multiple-input single-output (MISO) techniques. In some examples, the network interface device 2320 may wirelessly communicate using Multiple User MIMO techniques.

FIG. 24 is a flowchart of an example process that may be implemented by a serialization service. For example, process 2400 may be performed by the serialization service 106. In some aspects, instructions (e.g. instructions 2324 above) stored in a memory (e.g. instructions 2304 above) may configure hardware processing circuitry (e.g. processor 2302 above) to perform one or more of the functions discussed below. In the discussion of FIG. 24 below, a device performing the method 2200 may be referred to as an "executing device." Note that in various embodiments, one or more of the functions discussed above with respect to at least FIGS. 14-19 and/or FIG. 20 and/or FIGS. 21 and/or 22 may be included in process 2400.

After start operation 2402, process 2400 moves to operation 2405, which establishes a collaboration session with a plurality of devices. The collaboration session provides access to a distributed data structure In operation 2410, a message is received. The message requests a sequence number be assigned to an operation. For example, operation 2410 may receive a message including one or more of the fields discussed above with respect to FIG. 2A and message 200. The message may indicate, for an example, a collaboration module instance or device initiating the operation (e.g. field 202), and request a sequence number be assigned to an operation indicated in the message (e.g. the operation may be indicated by one or more of fields 208, 2010, 212). The request may be indicated via a predetermined value included in the sequence number field 206 in some aspects as discussed above (e.g. −1).

In some aspects, the received message may be decoded to identify that a sequence number indicated in the message is set to a predetermined value, with the predetermined value indicating that a sequence number needs to be assigned to the operation (e.g. the sequence number field 206 may be set to the predetermined value, such as −1). A determination may then be made based on the identification that the message is requesting the sequence number assignment.

In some aspects, the received message indicates a version number of the distributed data structure associated with the operation (e.g. via field 204).

In operation 2415, a sequence number is assigned to the operation. Operation is performed in response to the message received in operation 2410. The sequence number may be assigned as described above with respect to, for example, any of FIGS. 2B and/or 2C. For example, the sequence number may be assigned to define an order of operations initiated by various collaboration module instances or devices participating in the collaboration session.

In operation 2420, a first notification is transmitted to each of the plurality of devices indicating the operation and assigned sequence number. For example, the first notification may include one or more of the fields discussed above with respect to FIG. 2A and message 200. As discussed above, the executing device may notify each of the collaboration participants (devices and/or collaboration module instances) via a single broadcast message, multiple multicast messages, or individual unicast messages transmitted to each participant separately. Since the first notification may include any of the fields of FIG. 2A, the notification may also notify each of the plurality of devices of a current maximum sequence number of operations that have been acknowledged by all devices (e.g. reference sequence number).

The first notification may be generated to further indicate a version associated with the operation. Additionally, any information relevant to the operation may also be provided in the first notification. For example, the first notification may include values in any of the fields of the message 200 that are consistent with values included in the message received in operation 2410. As described above with respect to FIG. 2D, in some cases, a version number associated with a first operation received from a collaboration participant may be adjusted based on other locally initiated operations at that participant. In particular, a number of operations without assigned sequence numbers at the collaboration participant when the first operation was performed is relevant to how the version number is adjusted. The version number is adjusted to account for these operations (with pending sequence number assignments). As discussed above, if the first operation is associated with a first version, but the initiating participant has N other operations pending before the first operation was initiated, the first version may be adjusted to reflect that these N pending operations were applied to the distributed data structure before the first operation was initiated at the collaboration participant. The first version may be adjusted as first version+N in some aspects that utilize numerically higher sequence numbers to represent higher order operations and versions. In some aspects, N may be determined by first determining a number of operations (not including the operation of the message of 2410) initiated by the participant since the version of the distributed data structure specified in the message of operation 2410. N may be set to this number of operations. This is described above with respect to FIG. 2D.

Operation 2425 determines that each of the plurality of devices (participants in the collaboration being either devices and/or collaboration module instances) has acknowledged the operation. Operation 2425 may make this determination by monitoring messages received from each of the plurality of devices. In particular, a value of the max sequence number field 214 of message 200 discussed above with respect to FIG. 2A may be monitored. When the value of this field in a particular message from a particular device (or collaboration module instance) indicates a value equal to or higher in an operational order than sequence number assigned in operation 2415, operation 2425 determines that the particular device has acknowledged the operation. Operation 2425 then monitors values received from each of the plurality of devices (or collaboration module instances). When all devices indicate same, the determination of operation 2425 is complete.

In operation 2430, a second notification is transmitted to each of the plurality of devices. The second notification indicates the determination of operation 2425. The second notification may be a message including one or more of the fields discussed above with respect to message 200 in FIG. 2A. In some aspects, the determination is indicated by setting a value of the field 214 of the message of FIG. 2 to a value at least as high, in the operational order, as the assigned sequence number.

While process 2400 describes above the assignment of a single sequence number to a single operation, one of skill in the art would understand that process 2400 may operate iteratively to assign multiple sequence numbers to multiple operations. Operations initiated by a variety of collaboration participants (devices and/or collaboration module instances) may be received in an interleaved manner, and process 2400 may assign sequence numbers to these interleaved operations in an order consistent with a reception order of the operations.

Process 2400 may also include generating a snapshot of the distributed data structure. As discussed above with respect to FIG. 2E a snapshot may incorporate results of all operations on the distributed data structure up to a certain sequence number. The snapshot represents values of the distributed data structure once those results are applied to the distributed data structure. When a new participants joins the collaboration, the new participant may be provided with the snapshot. Additionally, any operations assigned sequence numbers but not included in the snapshot may also be provided to the new participant. This allows the new participant to apply those operations to the snapshot and synchronize its local version of the distributed data structure with those of other participants of the collaboration.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Example 1 is a method performed by a device, comprising: joining a collaboration session providing access to a distributed data structure; receiving a message identifying contiguously ordered operations on the distributed data structure, each of the identified operations having a pending acknowledgment; representing a first version of the distributed data structure, the first version represented to include each of the contiguously ordered operations; representing a second version of the distributed data structure to include a first operation, the first operation ordered subsequent to a last operation in the contiguously ordered operations; and transmitting a second message indicating the first operation and further indicating an association between the first operation and the first version.

In Example 2, the subject matter of Example 1 optionally includes receiving a plurality of messages indicating a plurality of corresponding operations, each of the messages indicating a unique sequence number assigned to each of the corresponding operations, each message further identifying a different device participating in the collaboration session that initiated the corresponding operation, the unique sequence numbers further indicating an order in which the plurality of operations operate on the distributed data structure; and representing the distributed data structure to include each of the plurality of operations.

In Example 3, the subject matter of Example 2 optionally includes wherein a message of the plurality of messages indicates that the device initiated the corresponding operation.

In Example 4, the subject matter of any one or more of Examples 1-3 optionally include representing a third version of the distributed data structure to include a second operation; receiving a third message indicating an additional operation, and a further indication that the additional operation is applied to the distributed data structure before the second operation; and modifying the second version of the distributed data structure to be consistent with the third message.

In Example 5, the subject matter of any one or more of Examples 1-4 optionally include receiving a third message indicating a first sequence number assigned to the first operation.

In Example 6, the subject matter of Example 5 optionally includes receiving a fourth message indicating a second device operation, the fourth message further indicating the second device operation is applied to a third version of the distributed data structure, the fourth message further indicating a second sequence number assigned to the second device operation.

In Example 7, the subject matter of Example 6 optionally includes resolving an edit conflict between the first operation and the second device operation on the distributed data structure based on a relative order of the first sequence number and the second sequence number.

In Example 8, the subject matter of any one or more of Examples 1-7 optionally include wherein the contiguously ordered operations define a collaboration window of the distributed data structure.

In Example 9, the subject matter of Example 8 optionally includes wherein the representing of the second version of the distributed data structure comprises: storing first data defining each of the contiguously ordered operations; and storing second data defining the first operation based on the first data.

In Example 10, the subject matter of any one or more of Examples 8-9 optionally include receiving an indication of an updated collaboration window, the updated collaboration window excluding some of the contiguous operations; and performing garbage collection on the excluded operations based on the received indication.

In Example 11, the subject matter of any one or more of Examples 1-10 optionally include wherein a version of the distributed data structure is defined by a highest ordered sequence number of operations included in the version.

In Example 12, the subject matter of any one or more of Examples 1-11 optionally include receiving a message defining a second operation, a sequence number assigned to the second operation, and a highest ordered sequence number of operations acknowledged by participants in the collaboration session.

In Example 13, the subject matter of Example 12 optionally includes wherein the contiguously ordered operations include operations with assigned sequence numbers higher in the order than the highest ordered sequence number acknowledged by devices participating in the collaboration session, and lower or equivalent in the order to the sequence number.

In Example 14, the subject matter of any one or more of Examples 1-13 optionally include wherein the indication of the contiguously ordered operations is received from a service in communication with participants of the collaboration session.

In Example 15, the subject matter of Example 14 optionally includes wherein the second message is transmitted to the service.

In Example 16, the subject matter of any one or more of Examples 1-15 optionally include wherein the indication of the contiguously ordered operations is received via a peer to peer protocol.

In Example 17, the subject matter of Example 16 optionally includes wherein the second message is transmitted over the peer to peer protocol.

Example 18 is a device, comprising: hardware processing circuitry; one or more hardware memories storing instructions that when executed configure the hardware processing circuitry to perform operations comprising: joining a collaboration session providing access to a distributed data structure; receiving a message identifying contiguously ordered operations on the distributed data structure, each of the identified operations having a pending acknowledgment; representing a first version of the distributed data structure, the first version represented to include each of the contiguously ordered operations; representing a second version of the distributed data structure to include a first operation, the first operation ordered subsequent to a last operation in the contiguously ordered operations; and transmitting a second message indicating the first operation and further indicating an association between the first operation and the first version.

In Example 19, the subject matter of Example 18 optionally includes the operations further comprising: receiving a plurality of messages indicating a plurality of corresponding operations, each of the messages indicating a unique sequence number assigned to each of the corresponding operations, each message further identifying a different device participating in the collaboration session that initiated the corresponding operation, the unique sequence numbers further indicating an order in which the plurality of operations operate on the distributed data structure; and representing the distributed data structure to include each of the plurality of operations.

In Example 20, the subject matter of Example 19 optionally includes wherein a message of the plurality of messages indicates that the device initiated the corresponding operation.

In Example 21, the subject matter of any one or more of Examples 18-20 optionally include the operations further comprising: representing a third version of the distributed data structure to include a second operation; receiving a third message indicating an additional operation, and a further indication that the additional operation is applied to the distributed data structure before the second operation; and modifying the second version of the distributed data structure to be consistent with the third message.

In Example 22, the subject matter of any one or more of Examples 18-21 optionally include the operations further comprising receiving a third message indicating a first sequence number assigned to the first operation.

In Example 23, the subject matter of Example 22 optionally includes the operations further comprising receiving a fourth message indicating a second device operation, the fourth message further indicating the second device operation is applied to a third version of the distributed data structure, the fourth message further indicating a second sequence number assigned to the second device operation.

In Example 24, the subject matter of Example 23 optionally includes the operations further comprising resolving an edit conflict between the first operation and the second device operation on the distributed data structure based on a relative order of the first sequence number and the second sequence number.

In Example 25, the subject matter of any one or more of Examples 18-24 optionally include wherein the contiguously ordered operations define a collaboration window of the distributed data structure.

In Example 26, the subject matter of Example 25 optionally includes wherein the representing of the second version of the distributed data structure comprises: storing first data defining each of the contiguously ordered operations; and storing second data defining the first operation based on the first data.

In Example 27, the subject matter of Example 26 optionally includes the operations further comprising: receiving an indication of an updated collaboration window, the updated collaboration window excluding some of the contiguous operations; and performing garbage collection on the excluded operations based on the received indication.

In Example 28, the subject matter of any one or more of Examples 18-27 optionally include wherein a version of the distributed data structure is defined by a highest ordered sequence number of operations included in the version.

In Example 29, the subject matter of any one or more of Examples 18-28 optionally include the operations further comprising receiving a message defining a second operation, a sequence number assigned to the second operation, and a highest ordered sequence number of operations acknowledged by participants in the collaboration session.

In Example 30, the subject matter of any one or more of Examples 12-29 optionally include wherein the contiguously ordered operations include operations with assigned sequence numbers higher in the order than the highest ordered sequence number acknowledged by devices participating in the collaboration session, and lower or equivalent in the order to the sequence number.

In Example 31, the subject matter of any one or more of Examples 18-30 optionally include wherein the indication of the contiguously ordered operations is received from a service in communication with participants of the collaboration session.

In Example 32, the subject matter of Example 31 optionally includes wherein the second message is transmitted to the service.

In Example 33, the subject matter of any one or more of Examples 18-32 optionally include wherein the indication of the contiguously ordered operations is received via a peer to peer protocol.

In Example 34, the subject matter of Example 33 optionally includes wherein the second message is transmitted over the peer to peer protocol.

Example 35 is a non-transitory computer readable storage medium comprising instructions that when executed by hardware processing circuitry of a device, configure the device to perform operations comprising: joining a collaboration session providing access to a distributed data structure; receiving a message identifying contiguously ordered operations on the distributed data structure, each of the identified operations having a pending acknowledgment; representing a first version of the distributed data structure, the first version represented to include each of the contiguously ordered operations; representing a second version of the distributed data structure to include a first operation, the first operation ordered subsequent to a last operation in the contiguously ordered operations; and transmitting a second message indicating the first operation and further indicating an association between the first operation and the first version.

In Example 36, the subject matter of Example 35 optionally includes the operations further comprising: receiving a plurality of messages indicating a plurality of corresponding operations, each of the messages indicating a unique sequence number assigned to each of the corresponding operations, each message further identifying a different device participating in the collaboration session that initiated the corresponding operation, the unique sequence numbers further indicating an order in which the plurality of operations operate on the distributed data structure; and representing the distributed data structure to include each of the plurality of operations.

In Example 37, the subject matter of Example 36 optionally includes wherein a message of the plurality of messages indicates that the device initiated the corresponding operation.

In Example 38, the subject matter of any one or more of Examples 35-37 optionally include the operations further comprising: representing a third version of the distributed data structure to include a second operation; receiving a third message indicating an additional operation, and a further indication that the additional operation is applied to the distributed data structure before the second operation; and modifying the second version of the distributed data structure to be consistent with the third message.

In Example 39, the subject matter of any one or more of Examples 35-38 optionally include the operations further comprising receiving a third message indicating a first sequence number assigned to the first operation.

In Example 40, the subject matter of Example 39 optionally includes the operations further comprising receiving a fourth message indicating a second device operation, the fourth message further indicating the second device operation is applied to a third version of the distributed data structure, the fourth message further indicating a second sequence number assigned to the second device operation.

In Example 41, the subject matter of Example 40 optionally includes the operations further comprising resolving an edit conflict between the first operation and the second device operation on the distributed data structure based on a relative order of the first sequence number and the second sequence number.

In Example 42, the subject matter of any one or more of Examples 35-41 optionally include wherein the contiguously ordered operations define a collaboration window of the distributed data structure.

In Example 43, the subject matter of Example 42 optionally includes wherein the representing of the second version of the distributed data structure comprises: storing first data defining each of the contiguously ordered operations; and storing second data defining the first operation based on the first data.

In Example 44, the subject matter of any one or more of Examples 42-43 optionally include the operations further comprising: receiving an indication of an updated collaboration window, the updated collaboration window excluding some of the contiguous operations; and performing garbage collection on the excluded operations based on the received indication.

In Example 45, the subject matter of any one or more of Examples 35-44 optionally include wherein a version of the distributed data structure is defined by a highest ordered sequence number of operations included in the version.

In Example 46, the subject matter of any one or more of Examples 35-45 optionally include the operations further comprising receiving a message defining a second operation, a sequence number assigned to the second operation, and a highest ordered sequence number of operations acknowledged by participants in the collaboration session.

In Example 47, the subject matter of Example 46 optionally includes wherein the contiguously ordered operations include operations with assigned sequence numbers higher in the order than the highest ordered sequence number acknowledged by devices participating in the collaboration session, and lower or equivalent in the order to the sequence number.

In Example 48, the subject matter of Example 47 optionally includes wherein the indication of the contiguously ordered operations is received from a service in communication with participants of the collaboration session.

In Example 49, the subject matter of Example 48 optionally includes wherein the second message is transmitted to the service.

In Example 50, the subject matter of any one or more of Examples 47-49 optionally include wherein the indication of the contiguously ordered operations is received via a peer to peer protocol.

In Example 51, the subject matter of Example 50 optionally includes wherein the second message is transmitted over the peer to peer protocol.

Example 52 is an apparatus, comprising: means for joining a collaboration session providing access to a distributed data structure; means for receiving a message identifying contiguously ordered operations on the distributed data structure, each of the identified operations having a pending acknowledgment; means for representing a first version of the distributed data structure, the first version represented to include each of the contiguously ordered operations; means for representing a second version of the distributed data structure to include a first operation, the first operation ordered subsequent to a last operation in the contiguously ordered operations; and means for transmitting a second message indicating the first operation and further indicating an association between the first operation and the first version.

In Example 53, the subject matter of Example 52 optionally includes means for receiving a plurality of messages indicating a plurality of corresponding operations, each of the messages indicating a unique sequence number assigned to each of the corresponding operations, each message further identifying a different apparatus participating in the collaboration session that initiated the corresponding operation, the unique sequence numbers further indicating an order in which the plurality of operations operate on the distributed data structure; and means for representing the distributed data structure to include each of the plurality of operations.

In Example 54, the subject matter of Example 53 optionally includes wherein a message of the plurality of messages indicates that the apparatus initiated the corresponding operation.

In Example 55, the subject matter of any one or more of Examples 52-54 optionally include means for representing a third version of the distributed data structure to include a second operation; means for receiving a third message indicating an additional operation, and a further indication that the additional operation is applied to the distributed data structure before the second operation; and means for modifying the second version of the distributed data structure to be consistent with the third message.

In Example 56, the subject matter of any one or more of Examples 52-55 optionally include means for receiving a third message indicating a first sequence number assigned to the first operation.

In Example 57, the subject matter of Example 56 optionally includes means for receiving a fourth message indicating a second apparatus operation, the fourth message further indicating the second apparatus operation is applied to a third version of the distributed data structure, the fourth message further indicating a second sequence number assigned to the second apparatus operation.

In Example 58, the subject matter of Example 57 optionally includes means for resolving an edit conflict between the first operation and the second apparatus operation on the distributed data structure based on a relative order of the first sequence number and the second sequence number.

In Example 59, the subject matter of any one or more of Examples 52-58 optionally include wherein the contiguously ordered operations define a collaboration window of the distributed data structure.

In Example 60, the subject matter of Example 59 optionally includes wherein the representing of the second version of the distributed data structure comprises: means for storing first data defining each of the contiguously ordered operations; and means for storing second data defining the first operation based on the first data.

In Example 61, the subject matter of Example 60 optionally includes means for receiving an indication of an updated collaboration window, the updated collaboration window excluding some of the contiguous operations; and means for performing garbage collection on the excluded operations based on the received indication.

In Example 62, the subject matter of any one or more of Examples 52-61 optionally include wherein a version of the distributed data structure is defined by a highest ordered sequence number of operations included in the version.

In Example 63, the subject matter of any one or more of Examples 52-62 optionally include means for receiving a message defining a second operation, a sequence number assigned to the second operation, and a highest ordered sequence number of operations acknowledged by participants in the collaboration session.

In Example 64, the subject matter of Example 63 optionally includes wherein the contiguously ordered operations include operations with assigned sequence numbers higher in the order than the highest ordered sequence number acknowledged by devices participating in the collaboration session, and lower or equivalent in the order to the sequence number.

In Example 65, the subject matter of any one or more of Examples 52-64 optionally include wherein the indication of the contiguously ordered operations is received from a service in communication with participants of the collaboration session.

In Example 66, the subject matter of Example 65 optionally includes wherein the second message is transmitted to the service.

In Example 67, the subject matter of any one or more of Examples 52-66 optionally include wherein the indication of the contiguously ordered operations is received via a peer to peer protocol.

In Example 68, the subject matter of Example 67 optionally includes wherein the second message is transmitted over the peer to peer protocol.

Example 69 is a non-transitory computer readable storage medium comprising instructions that when executed configure hardware processing circuitry to perform operations comprising: establishing a collaboration session with a plurality of devices, the collaboration session providing collaborative access to a distributed data structure; receiving, from a device included in the plurality of devices, a message indicating a request to assign a sequence number to an operation on the distributed data structure; in response to the request, assigning a sequence number to the operation; transmitting to each of the plurality of devices, a first notification indicating the operation and the assigned sequence number; determining an acknowledgment of the first notification is received from each of the plurality of devices; and in response to the determining, transmitting to each of the plurality of devices, a second notification indicating the determination.

In Example 70, the subject matter of Example 69 optionally includes wherein the message indicates a version number of the distributed data structure associated with the operation, and the method further includes generating the first notification to further indicate the version and the assigned sequence number.

In Example 71, the subject matter of Example 70 optionally includes the operations further comprising: receiving from the device, a second message indicating a request to assign a second sequence number to a second operation, the message further indicating a second version of the distributed data structure associated with the second operation; assigning a second sequence number to the second operation in response to the request; determining a number of operations by the device having unassigned sequence numbers; adjusting, based on the number of operations, the second version; and notifying each of the plurality of devices of the second operation, the assigned second sequence number, and the adjusted second version.

In Example 72, the subject matter of any one or more of Examples 69-71 optionally include the operations further comprising first determining that a sequence number field of the message stores a predetermined value, and second determining, based on the first determining, the message indicates the request.

In Example 73, the subject matter of any one or more of Examples 69-72 optionally include the operations further comprising: receiving from the device, a first plurality of requests to assign sequence numbers to a corresponding first plurality of operations; receiving, interleaved with the first plurality of requests, a second plurality of requests to assign sequence numbers to a corresponding second plurality of operations; and assigning sequence numbers to the first and second plurality of operations in an order of the interleaving of the second plurality of operations with the first plurality of operations.

In Example 74, the subject matter of Example 73 optionally includes the operations further comprising: generating, based on the first plurality of operations and the second plurality of operations, a snapshot of the distributed data structure; receiving a request to join the collaboration session from an additional device; and transmitting the snapshot to the additional device in response to the request.

In Example 75, the subject matter of any one or more of Examples 69-74 optionally include wherein the message further indicates a type of the operation and a position within the distributed data structure associated with the operation, and wherein the first notification is generated to indicate the type and the position.

In Example 76, the subject matter of Example 75 optionally includes wherein the message further indicates a distributed data structure data value associated with the operation, and wherein the first notifications are generated to indicate the data value.

In Example 77, the subject matter of any one or more of Examples 69-76 optionally include wherein the second notification indicates the determination to the plurality of devices of the determination by transmitting, to each of the plurality of devices, the assigned sequence number in a field of a message, the field of the message predetermined to indicate a maximum sequence number acknowledged by the plurality of devices.

Example 78 is a method, comprising: establishing a collaboration session with a plurality of devices, the collaboration session providing collaborative access to a distributed data structure; receiving, from a device included in the plurality of devices, a message indicating a request to assign a sequence number to an operation on the distributed data structure; in response to the request, assigning a sequence number to the operation; transmitting to each of the plurality of devices, a first notification indicating the operation and the assigned sequence number; determining an acknowledgment of the first notification is received from each of the plurality of devices; and in response to the determining, transmitting to each of the plurality of devices, a second notification indicating the determination.

In Example 79, the subject matter of Example 78 optionally includes wherein the message indicates a version number of the distributed data structure associated with the operation, and the method further includes generating the first notification to further indicate the version and the assigned sequence number.

In Example 80, the subject matter of Example 79 optionally includes receiving from the device, a second message indicating a request to assign a second sequence number to a second operation, the message further indicating a second version of the distributed data structure associated with the second operation; assigning a second sequence number to the second operation in response to the request; determining a number of operations by the device having unassigned sequence numbers; adjusting, based on the number of operations, the second version; and notifying each of the plurality of devices of the second operation, the assigned second sequence number, and the adjusted second version.

In Example 81, the subject matter of any one or more of Examples 78-80 optionally include first determining that a sequence number field of the message stores a predetermined value, and second determining, based on the first determining, the message indicates the request.

In Example 82, the subject matter of any one or more of Examples 78-81 optionally include the operations further comprising: receiving from the device, a first plurality of requests to assign sequence numbers to a corresponding first plurality of operations; receiving, interleaved with the first plurality of requests, a second plurality of requests to assign sequence numbers to a corresponding second plurality of operations; and assigning sequence numbers to the first and second plurality of operations in an order of the interleaving of the second plurality of operations with the first plurality of operations.

In Example 83, the subject matter of Example 82 optionally includes generating, based on the first plurality of operations and the second plurality of operations, a snapshot of the distributed data structure; receiving a request to join the collaboration session from an additional device; and transmitting the snapshot to the additional device in response to the request.

In Example 84, the subject matter of any one or more of Examples 78-83 optionally include wherein the message further indicates a type of the operation and a position within the distributed data structure associated with the operation, and wherein the first notification is generated to indicate the type and the position.

In Example 85, the subject matter of Example 84 optionally includes wherein the message further indicates a distributed data structure data value associated with the operation, and wherein the first notifications are generated to indicate the data value.

In Example 86, the subject matter of any one or more of Examples 78-85 optionally include wherein the second notification indicates the determination to the plurality of devices of the determination by transmitting, to each of the plurality of devices, the assigned sequence number in a field of a message, the field of the message predetermined to indicate a maximum sequence number acknowledged by the plurality of devices.

Example 87 is a system, comprising: hardware processing circuitry; one or more electronic hardware memories storing instructions that when executed configure the hardware processing circuitry to perform operations comprising: establishing a collaboration session with a plurality of devices, the collaboration session providing collaborative access to a distributed data structure; receiving, from a device included in the plurality of devices, a message indicating a request to assign a sequence number to an operation on the distributed data structure; in response to the request, assigning a sequence number to the operation; transmitting to each of the plurality of devices, a first notification indicating the operation and the assigned sequence number; determining an acknowledgment of the first notification is received from each of the plurality of devices; and in response to the determining, transmitting to each of the plurality of devices, a second notification indicating the determination.

In Example 88, the subject matter of Example 87 optionally includes wherein the message indicates a version number of the distributed data structure associated with the operation, and the method further includes generating the first notification to further indicate the version and the assigned sequence number.

In Example 89, the subject matter of Example 88 optionally includes receiving from the device, a second message indicating a request to assign a second sequence number to a second operation, the message further indicating a second version of the distributed data structure associated with the second operation; assigning a second sequence number to the second operation in response to the request; determining a number of operations by the device having unassigned sequence numbers; adjusting, based on the number of operations, the second version; and notifying each of the plurality of devices of the second operation, the assigned second sequence number, and the adjusted second version.

In Example 90, the subject matter of any one or more of Examples 87-89 optionally include first determining that a sequence number field of the message stores a predetermined value, and second determining, based on the first determining, the message indicates the request.

In Example 91, the subject matter of any one or more of Examples 87-90 optionally include the operations further comprising: receiving from the device, a first plurality of requests to assign sequence numbers to a corresponding first plurality of operations; receiving, interleaved with the first plurality of requests, a second plurality of requests to assign sequence numbers to a corresponding second plurality of operations; and assigning sequence numbers to the first and second plurality of operations in an order of the interleaving of the second plurality of operations with the first plurality of operations.

In Example 92, the subject matter of Example 91 optionally includes generating, based on the first plurality of operations and the second plurality of operations, a snapshot of the distributed data structure; receiving a request to join the collaboration session from an additional device; and transmitting the snapshot to the additional device in response to the request.

In Example 93, the subject matter of any one or more of Examples 87-92 optionally include wherein the message further indicates a type of the operation and a position within the distributed data structure associated with the operation, and wherein the first notification is generated to indicate the type and the position.

In Example 94, the subject matter of Example 93 optionally includes wherein the message further indicates a distributed data structure data value associated with the operation, and wherein the first notifications are generated to indicate the data value.

In Example 95, the subject matter of any one or more of Examples 87-94 optionally include wherein the second notification indicates the determination to the plurality of devices of the determination by transmitting, to each of the plurality of devices, the assigned sequence number in a field of a message, the field of the message predetermined to indicate a maximum sequence number acknowledged by the plurality of devices.

Example 96 is an apparatus, comprising: means for establishing a collaboration session with a plurality of devices, the collaboration session providing collaborative access to a distributed data structure; means for receiving, from a device included in the plurality of devices, a message indicating a request to assign a sequence number to an operation on the distributed data structure; means for assigning a sequence number to the operation in response to the request; means for transmitting to each of the plurality of devices, a first notification indicating the operation and the assigned sequence number; means for determining an acknowledgment of the first notification is received from each of the plurality of devices; and means for transmitting, in response to the determining, to each of the plurality of devices, a second notification indicating the determination.

In Example 97, the subject matter of Example 96 optionally includes wherein the message indicates a version number of the distributed data structure associated with the operation, and the method further includes generating the first notification to further indicate the version and the assigned sequence number.

In Example 98, the subject matter of Example 97 optionally includes means for receiving from the device, a second message indicating a request to assign a second sequence number to a second operation, the message further indicating a second version of the distributed data structure associated with the second operation; means for assigning a second sequence number to the second operation in response to the request; means for determining a number of operations by the device having unassigned sequence numbers; means for adjusting, based on the number of operations, the second version; and means for notifying each of the plurality of devices of the second operation, the assigned second sequence number, and the adjusted second version.

In Example 99, the subject matter of any one or more of Examples 96-98 optionally include first determining that a sequence number field of the message stores a predetermined value, and second determining, based on the first determining, the message indicates the request.

In Example 100, the subject matter of any one or more of Examples 96-99 optionally include the operations further comprising: means for receiving from the device, a first plurality of requests to assign sequence numbers to a corresponding first plurality of operations; means for receiving, interleaved with the first plurality of requests, a second plurality of requests to assign sequence numbers to a corresponding second plurality of operations; and means for assigning sequence numbers to the first and second plurality of operations in an order of the interleaving of the second plurality of operations with the first plurality of operations.

In Example 101, the subject matter of Example 100 optionally includes means for generating, based on the first plurality of operations and the second plurality of operations, a snapshot of the distributed data structure; means for receiving a request to join the collaboration session from an additional device; and means for transmitting the snapshot to the additional device in response to the request.

In Example 102, the subject matter of any one or more of Examples 96-101 optionally include wherein the message further indicates a type of the operation and a position within the distributed data structure associated with the operation, and wherein the first notification is generated to indicate the type and the position.

In Example 103, the subject matter of Example 102 optionally includes wherein the message further indicates a distributed data structure data value associated with the operation, and wherein the first notifications are generated to indicate the data value.

In Example 104, the subject matter of any one or more of Examples 96-103 optionally include wherein the second notification indicates the determination to the plurality of devices of the determination by transmitting, to each of the plurality of devices, the assigned sequence number in a field of a message, the field of the message predetermined to indicate a maximum sequence number acknowledged by the plurality of devices.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory; etc.

We claim:

1. A method, comprising:
    establishing, with a plurality of client devices, a collaborative editing session on a distributed data structure;
    receive, from one of the plurality of client devices, an indication of a modification of the distributed data structure;
    assign a sequence number to the modification;
    distribute information defining the modification and the assigned sequence number to each of the plurality of client devices;
    receive, from each of the plurality of client devices, a confirmation that they have applied the modification to local copies of the distributed data structure; and
    in response to receiving confirmations from each of the plurality of client devices participating in the collaboration editing session, notifying each of the plurality of client devices that the modification has been acknowledged by each of the participating devices.

2. The method of claim 1, wherein the distributing of information defining the modification includes distributing information defining an indicator of whether the modification is an insert or a delete operation.

3. The method of claim 1, wherein the distributing of information defining the modification includes distributing information defining a range of data within the distributed data structure to which the modification is applied.

4. The method of claim 1, further comprising: receiving, from the one of the plurality of client devices, a message indicating the modification, the message further indicating a version of the distributed data structure to which the modification is applied.

5. The method of claim 4, wherein the distributing of information defining the modification includes distributing the version of the distributed data structure to which the modification is applied.

6. The method of claim 4, wherein the assigning of the sequence number to the modification is in response to a sequence number field of the message being a predefined value.

7. The method of claim 1, wherein notifying each of the plurality of client devices comprising indicating, to each of the plurality of client devices, that a version of the distributed data structure identified via the assigned sequence number has been acknowledged by each of the participating devices.

8. A system, comprising:
hardware processing circuitry;
one or more hardware memories storing instructions that when executed configure the hardware processing circuitry to perform one or more operating comprising:
establishing, with a plurality of client devices, a collaborative editing session on a distributed data structure;
receive, from one of the plurality of client devices, an indication of a modification of the distributed data structure;
assign a sequence number to the modification;
distribute information defining the modification and the assigned sequence number to each of the plurality of client devices;
receive, from each of the plurality of client devices, a confirmation that they have applied the modification to local copies of the distributed data structure; and
in response to receiving confirmations from each of the plurality of client devices participating in the collaboration editing session, notifying each of the plurality of client devices that the modification has been acknowledged by each of the participating devices.

9. The system of claim 8, wherein the distributing of information defining the modification includes distributing information defining an indicator of whether the modification is an insert or a delete operation.

10. The system of claim 8, wherein the distributing of information defining the modification includes distributing information defining a range of data within the distributed data structure to which the modification is applied.

11. The system of claim 8, the operations further comprising: receiving, from the one of the plurality of client devices, a message indicating the modification, the message further indicating a version of the distributed data structure to which the modification is applied.

12. The system of claim 11, wherein the distributing of information defining the modification includes distributing the version of the distributed data structure to which the modification is applied.

13. The system of claim 11, wherein the assigning of the sequence number to the modification is in response to a sequence number field of the message being a predefined value.

14. The system of claim 8, wherein notifying each of the plurality of client devices comprising indicating, to each of the plurality of client devices, that a version of the distributed data structure identified via the assigned sequence number has been acknowledged by each of the participating devices.

15. A non-transitory computer readable storage medium comprising instructions that when executed configure hardware processing circuitry to perform operations comprising:
establishing, with a plurality of client devices, a collaborative editing session on a distributed data structure;
receive, from one of the plurality of client devices, an indication of a modification of the distributed data structure;
assign a sequence number to the modification;
distribute information defining the modification and the assigned sequence number to each of the plurality of client devices;
receive, from each of the plurality of client devices, a confirmation that they have applied the modification to local copies of the distributed data structure; and
in response to receiving confirmations from each of the plurality of client devices participating in the collaboration editing session, notifying each of the plurality of client devices that the modification has been acknowledged by each of the participating devices.

16. The non-transitory computer readable storage medium of claim 15, wherein the distributing of information defining the modification includes distributing information defining an indicator of whether the modification is an insert or a delete operation.

17. The non-transitory computer readable storage medium of claim 15, further comprising: receiving, from the one of the plurality of client devices, a message indicating the modification, the message further indicating a version of the distributed data structure to which the modification is applied.

18. The non-transitory computer readable storage medium of claim 17, wherein the distributing of information defining the modification includes distributing the version of the distributed data structure to which the modification is applied.

19. The non-transitory computer readable storage medium of claim 17, wherein the assigning of the sequence number to the modification is in response to a sequence number field of the message being a predefined value.

20. The non-transitory computer readable storage medium of claim 15, wherein notifying each of the plurality of client devices comprising indicating, to each of the plurality of client devices, that a version of the distributed data structure identified via the assigned sequence number has been acknowledged by each of the participating devices.

* * * * *